United States Patent
Yamamoto et al.

(10) Patent No.: US 6,418,098 B1
(45) Date of Patent: Jul. 9, 2002

(54) OPTICAL HEAD APPARATUS FOR REPRODUCING INFORMATION FROM AN OPTICAL RECORDING MEDIUM

(75) Inventors: Yuichiro Yamamoto, Tokyo; Masahiko Tanaka, Kanagawa-ken; Katsuo Iwata, Tokyo, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/323,047

(22) Filed: Jun. 1, 1999

(30) Foreign Application Priority Data

Sep. 3, 1998 (JP) ............................................ 10-154505

(51) Int. Cl.[7] ................................................. G11B 7/00
(52) U.S. Cl. ................................. 369/44.41; 369/112.03
(58) Field of Search ........................... 369/44.23, 44.41, 369/103, 112.03, 112.04, 112.05, 112.06, 112.07, 112.09, 112.1, 112.11, 112.12, 112.15, 120

(56) References Cited

U.S. PATENT DOCUMENTS

| | | | | |
|---|---|---|---|---|
| 5,353,267 A | * | 10/1994 | Katayama | 369/112.12 |
| 5,404,344 A | * | 4/1995 | Imada et al. | 369/112.12 |
| 5,493,555 A | * | 2/1996 | Kimura et al. | 369/112.12 |
| 5,532,987 A | | 7/1996 | Fujita et al. | 369/44.24 |
| 5,615,200 A | | 3/1997 | Hoshino et al. | |
| 5,627,812 A | * | 5/1997 | Yamamoto et al. | 369/112.12 |
| 5,748,599 A | | 5/1998 | Yamamoto et al. | 369/103 |
| 5,757,754 A | | 5/1998 | Yamamoto et al. | 369/103 |
| 5,946,137 A | * | 8/1999 | Momoo et al. | 369/112.12 |
| 6,125,057 A | * | 9/2000 | Onishi et al. | 369/112.12 |

FOREIGN PATENT DOCUMENTS

| | | |
|---|---|---|
| EP | 0 372 629 | 6/1990 |
| EP | 0 617 415 | 9/1994 |
| EP | 0 740 295 | 10/1996 |
| EP | 0 949 610 | 10/1998 |
| JP | 8-77578 | 3/1996 |

OTHER PUBLICATIONS

Hoshino et al., "Optical Head With An HOE And A Visible Laser Diode", *The Japan Society Of Applied Physics)*, vol. 11(1):69–75, (1993).

* cited by examiner

*Primary Examiner*—Paul W. Huber
(74) *Attorney, Agent, or Firm*—Foley & Lardner

(57) ABSTRACT

An optical head apparatus includes an objective lens which receives a light beam from a light source and condenses the light beam onto the optical recording medium. A photo-detector has plurality of photo-detecting planes disposed orthogonal to an optical axis of the reflected light beam and symmetrical with respect to the optical axis, and detects the light beam reflected by the optical recording medium. Each of the photo-detecting plane is divided into a plurality of divided areas by a plurality of dividing lines which are symmetrically divide the photo-detecting planes with respect to the optical axis. A diffractive optical element is disposed upstream to the photo-detector for diffracting the reflected light beam to diffract the reflected light beam such that the reflected light beam is divided at least in a direction parallel to a track of the optical recording medium, and a +Nth order diffracted light beam and a –Nth order diffracted light beam (N is 1 or an integer more than 1) in the photo-detecting plane are independently received by the divided areas which are disposed in positions symmetrically opposite with respect to the optical axis respectively. An arithmetic circuit calculates an error signal with respect to a position of the objective lens along the optical axis, by using outputs from the photo-detector of both the +Nth order diffracted light beam and the –Nth order diffracted light beam. A driver generates a signal for controlling the position of the objective lens based on an output from the arithmetic circuit.

14 Claims, 26 Drawing Sheets

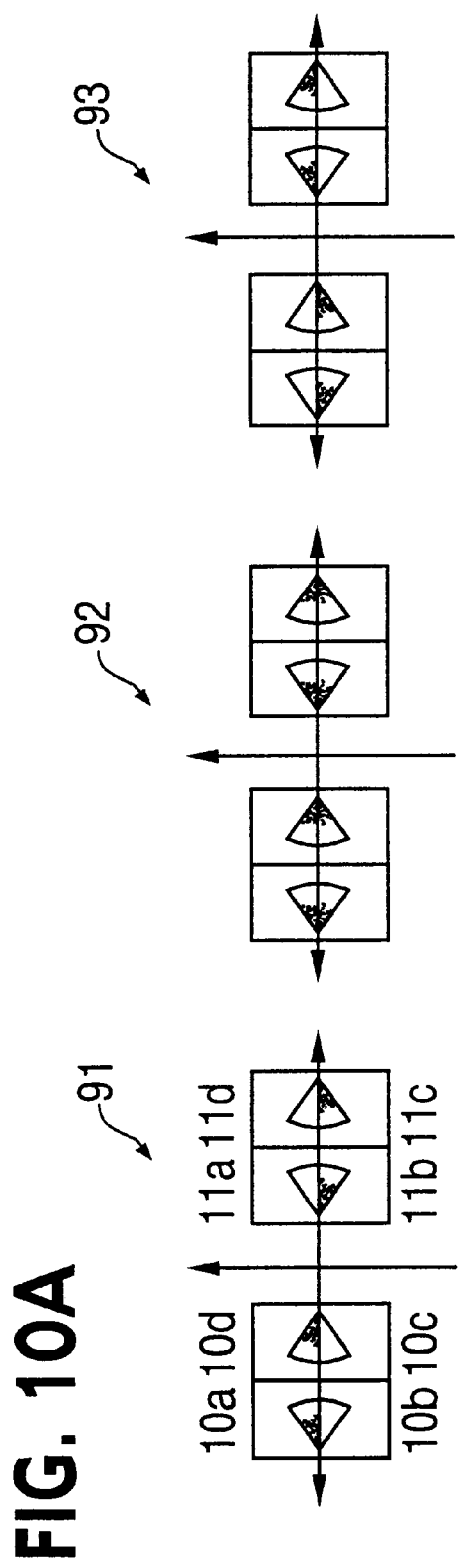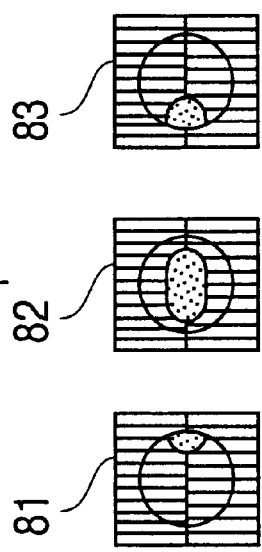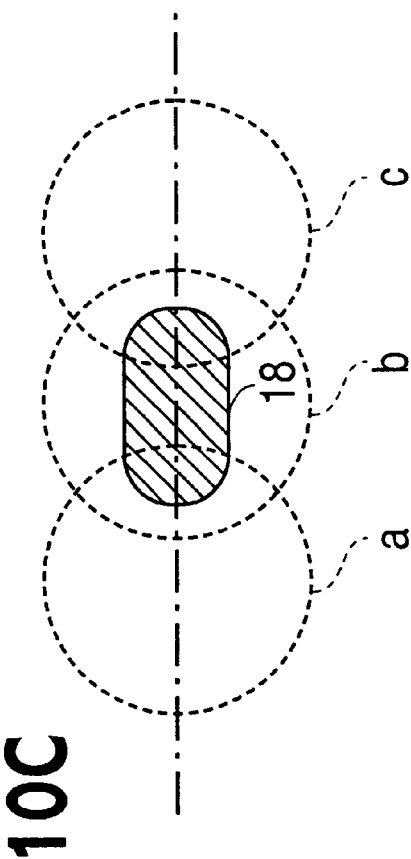
FIG. 10A
FIG. 10B
FIG. 10C

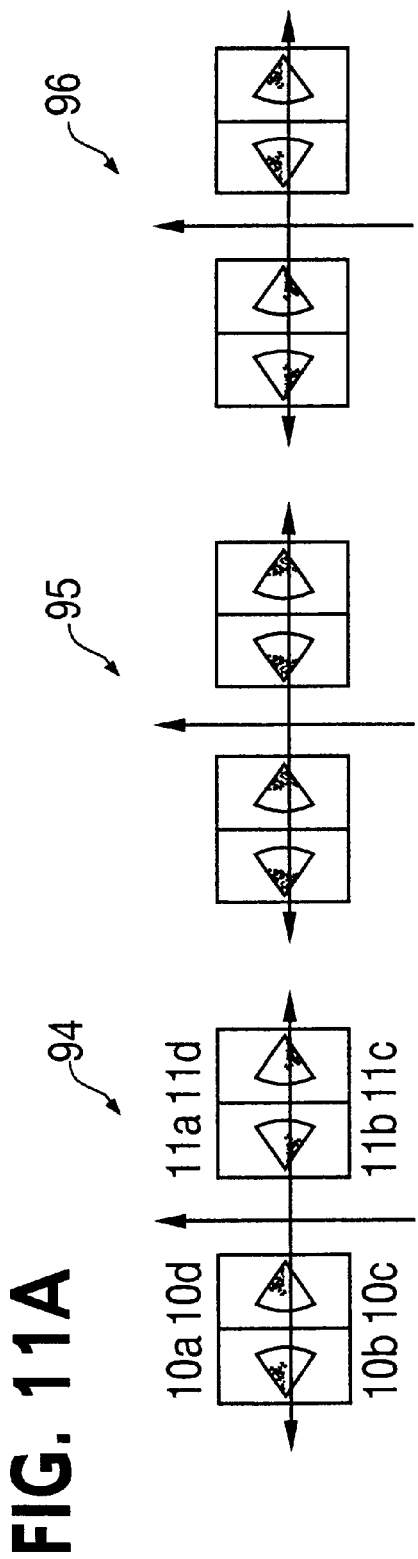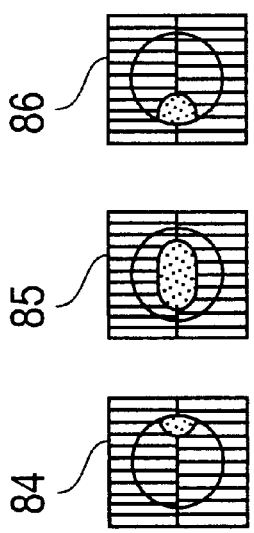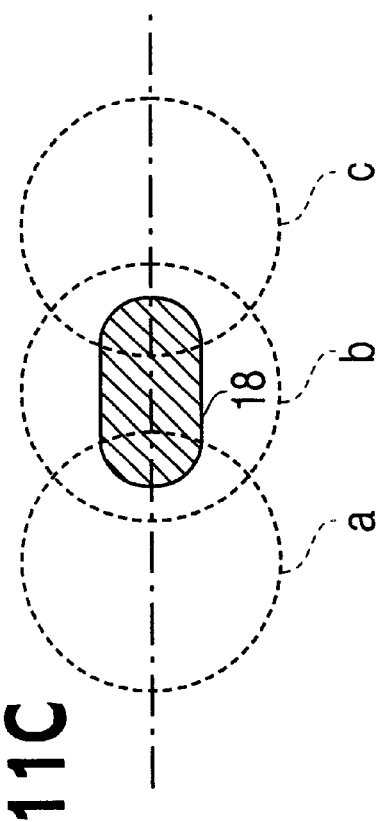
FIG. 11A
FIG. 11B
FIG. 11C

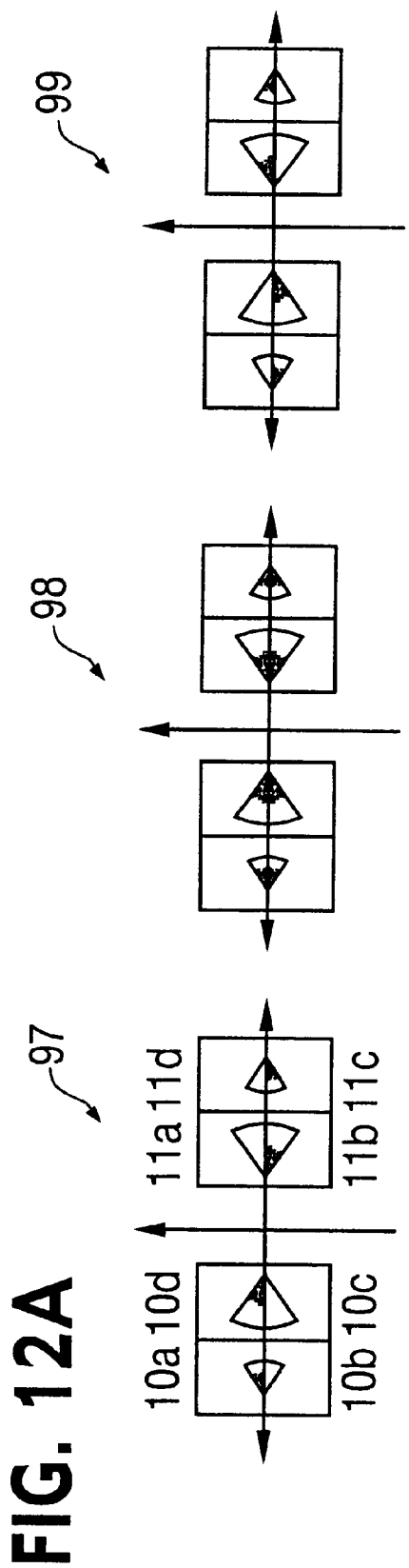
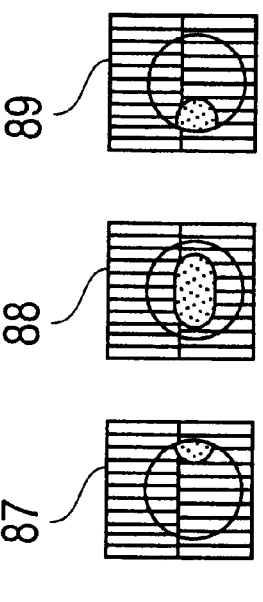
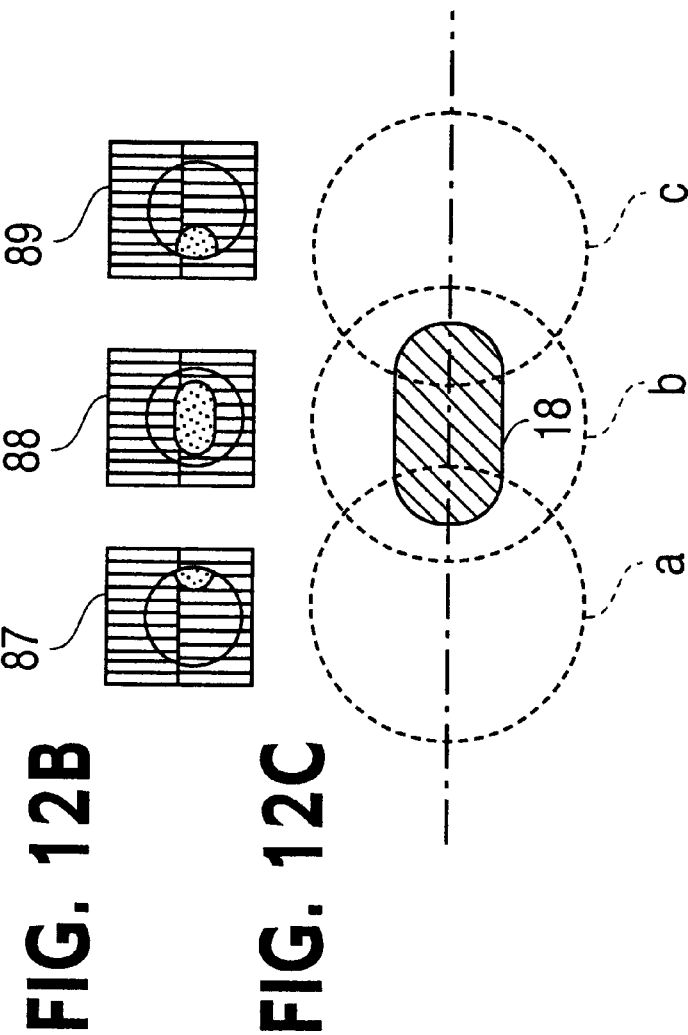
FIG. 12A
FIG. 12B
FIG. 12C

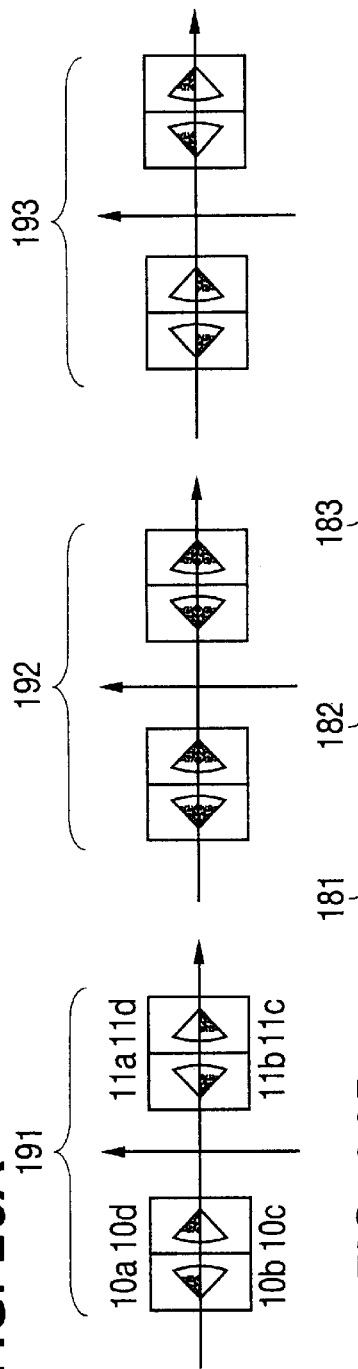
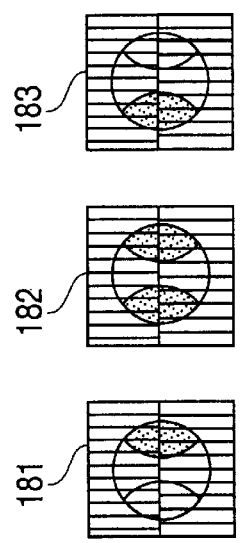
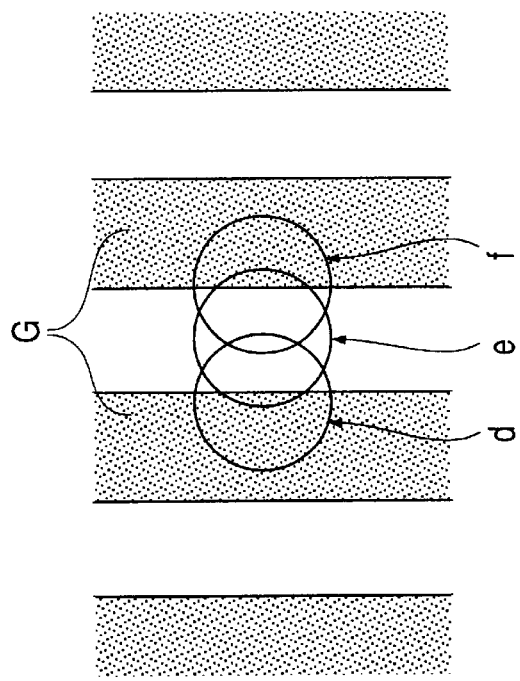
FIG. 26A
FIG. 26B
FIG. 26C

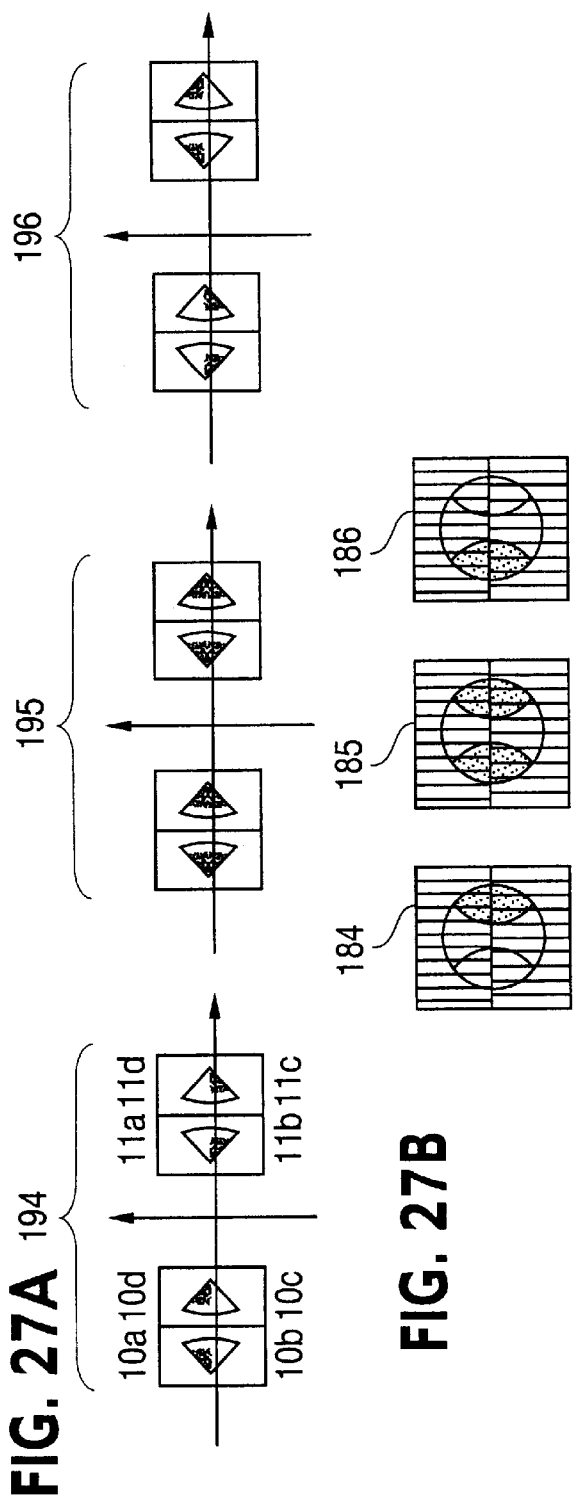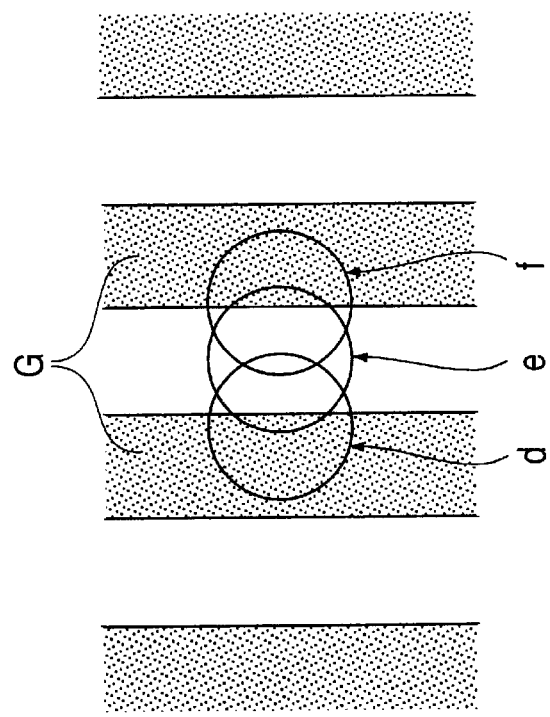
FIG. 27A
FIG. 27B
FIG. 27C

OPTICAL HEAD APPARATUS FOR REPRODUCING INFORMATION FROM AN OPTICAL RECORDING MEDIUM

BACKGROUND OF THE INVENTION

1. Field of the Invention

The present invention relates to an optical head apparatus for recording/reproducing information by irradiating a light beam onto an optical recording medium such as an optical disk and an optical card and the like, and more particularly to an optical head apparatus which is capable of detecting a focus error without being influenced by noise, caused by diffraction from pits or recorded marks on a recording plane of the recording medium, or caused by diffraction from grooves on the recording plane of the recording medium while a light beam crosses across tracks thereof, thereby achieving a high utilization efficiency in detecting a focus error of the light beam.

2. Description of the Related Art

It is important, in an optical head apparatus for recording/reproducing information by using an optical disk, to coincide a focus position of an objective lens with a recording surface of the optical disk, so as to irradiate a light beam from a light source onto the recording surface. Therefore, detecting a focus error of the objective lens against the recording surface and thereby adjusting the objective lens along a beam axial direction of the objective lens is required as a control method called "focusing servo". There are many known ways of detecting the focus error, however, an astigmatic method is well known as one of the conventional ways thereof.

FIG. 1 is a diagram showing the system of detecting the focus error using the astigmatic method, as explained in Japanese Patent Disclosure No. H04-364231. The light beam generated from the light source 1 is condensed to the optical disk 6, through a collimator lens 2, a beam shaping prism 3, a beam splitter 4 and the objective lens 5. The reflected beam from the optical disk 6 is guided to a cylindrical lens 14 to give astigmatism, then the reflected beam is further guided to a four-divided photo-detector 15. The four-divided photo-detector 15 is arranged in a position where the section of the reflected beam becomes circular in an in-focus condition, that is, the condition when the focus position of the objective lens 5 coincides with the recording surface of the optical disk 6. The output from the four-divided photo-detector 15 is input to an arithmetic circuit 13 through a current-voltage convert amplifier array 12, and a calculation, such as (A+C)−(B+D), concerning each output of the four-divided photo-detector 15 is carried out in an arithmetic circuit 13, thereby obtaining a signal of the focus error.

In the focus error detecting system using the conventional astigmatism method, the focus error signal in the in-focus condition is always calculated to be zero, if the optical system is an ideal system and there is no misalignment between each optical element. However, the optical elements can not be disposed into the optical head apparatus without any misalignment. In case when there is misalignment of the optical element, the focus error signal in the in-focus condition is not calculated to be zero, under the influence of diffraction caused by pit or recorded mark, thereby making it difficult to realize a stable focusing servo.

FIG. 2A is a diagram showing the intensity distribution of the light beam on the four-divide photo-detector 15, and FIG. 2B is a diagram showing the movement of a light spot on the optical disk 6. Each figure is illustrated in case when the four-divided photo-detector 15 is disposed with misalignment. Here, each reference number 151 to 153 in FIG. 2A indicates the detecting surface of the four-divided photo-detector 15, and each circle thereof schematically shows the light beam entered at the four-divided photo-detector 15, and each dark portion thereof schematically shows the diffracted images generated by the pits or the recorded marks on the optical disk 6 respectively. Additionally, each circle 171 to 173 illustrated by short dashes of line shows the optical spot and the reference number 16 indicates the pit or the recorded mark on the optical disk 6.

As the optical beam, which is condensed by the objective lens 5, scans along the pits or recorded marks 16 on the optical disk 6 like spots 171, 172 and 173, as shown in FIG. 2B, the intensity distribution on the four-divided photo-detector 15 changes 151, 152 and 153 as shown in FIG. 2A. Here, the dark portions in the figure correspond to shade portions by the influence of diffraction caused by the pits or the recorded marks 16.

As shown in FIGS. 2A and 2B, when the four-divided photo-detector 15 has misalignment, the focus error signal F (=−(A+C)−(B+D)) on the four-divided photo-detector 15 becomes positive in the intensity distribution on the receiving plane 151, or becomes zero in the intensity distribution on the receiving plane 152, or becomes negative in the intensity distribution on the receiving plane 153. Therefore, it is difficult to realize an accurate focusing control.

Further, there is another case in which the influence of the diffraction caused by grooves on the optical disk exists, other than those caused by the pits and recorded marks.

That is, in the focus error detecting system in the conventional astigmatism method, the focus error signal becomes zero all the time in the in-focus condition. However, the optical elements in the optical head apparatus can not be fixed without misalignment. In the case where such misalignment exits, the focus error signal does not become zero, by influence of the diffraction caused by the grooves, thereby making it difficult to realize the stable focusing servo.

FIG. 3A is a diagram showing the intensity distribution of the light beam on the four-divide photo-detector 15, and FIG. 3B is a diagram showing the movement of a light spot on the optical disk 6. Each figure is illustrated for the case when the four-divided photo-detector 15 is disposed with misalignment, similar to FIGS. 2A and 2B. Here, each reference number 251 to 253 in FIG. 3A indicates the detecting surface of the four-divided photo-detector 15, and each circle thereof schematically shows the light beam entered at the four-divided photo-detector 15, and each dark portion thereof schematically shows the diffracted images generated by the pits or the recorded marks on the optical disk 6 respectively. Additionally, each circle d to f shows the optical spot and the reference number 116 indicates the grooves on the optical disk 6.

The intensity distribution on the four-divided photo-detector 15 changes as reference numbers 251 to 253 as shown in FIG. 3A by scanning the beam spot, condensed by the objective lens 5, as d, e, and f on the grooves 116 in FIG. 3B. Here, the dark portions thereof show the diffracted images generated by the grooves 116.

As shown in FIGS. 3A and 3B, when the four-divided photo-detector 15 has misalignment, the focus error signal F (=(A+C)−(B+D)) on the four-divided photo-detector 15 becomes positive in the intensity distribution on the receiving plane 151, or becomes zero in the intensity distribution on the receiving plane 152, or becomes negative in the intensity distribution on the receiving plane 153. Therefore, it is difficult to realize an accurate focusing control.

SUMMARY OF THE INVENTION

The present invention has been made in view of the above-mentioned circumstances and is intended to solve the above-mentioned problems. In particular, one purpose of the present invention is to provide an optical head apparatus in which the focus error signal thereof is less influenced by diffraction caused by the pits or the recorded marks, or caused by the grooves, on the optical disk, even though the optical elements have misalignment.

The present invention provides an optical head apparatus that is capable of reproducing information from an optical recording medium, including: an objective lens that receives a light beam from a light source and condenses the light beam onto the optical recording medium; a photo-detector that has plurality of photo-detecting planes disposed orthogonal to an optical axis of the reflected light beam and symmetrical with respect to the optical axis, and detects the light beam reflected by the optical recording medium, wherein each of the photo-detecting planes is divided into a plurality of divided areas by a plurality of dividing lines which symmetrically divide the photo-detecting planes with respect to the optical axis; a diffractive optical element that is disposed upstream to the photo-detector for diffractive the reflected light beam, wherein the diffracting optical element diffracts the reflected light beam such that the reflected light beam is divided at least in a direction parallel to a track of the optical recording medium, and a +Nth order diffracted light beam and –Nth order diffracted light beam (N is an integer greater than or equal to 1) in the photo-detecting plane are independently received by the divided areas which are disposed in positions symmetrically opposite with respect to the optical axis respectively; an arithmetic circuit that calculates an error signal with respect to a position of the objective lens along the optical axis, by using outputs from the photo-detector concerning both the +Nth order diffracted light beam and –Nth order diffracted light beam; and a driver that generates a signal for controlling the position of the objective lens based on an output from the arithmetic circuit.

The diffracting optical element may diffract the reflected light beam such that the reflected light beam is further divided in a direction orthogonal to the track of the optical recording medium.

The dividing lines of the photo-detecting plane may include at least one dividing line which extends in a direction parallel to the track of the optical recording medium. Here, the dividing lines of the photo-detecting plane may further include another dividing line which extends in a direction parallel to the track of the optical recording medium, and the dividing lines of the photo-detecting plane may further include another dividing line which extends in a direction orthogonal to the track of the optical recording medium.

The track on the optical recording medium may include a plurality of pits.

The optical head apparatus may further include: a beam splitter that guides the light beam to the objective lens when the light beam enters from the light source through a first optical path, and guides the light beam to the photo-detector when the light beam enters from the objective lens through a second optical path; and a beam shaping prism that is disposed in one of the first and the second optical paths, for modifying the sectional shape of the light beam.

The present invention further provides an optical head apparatus that is capable of reproducing information from an optical recording medium, including: an objective lens that receives a light beam from a light source and condenses the light beam onto the optical recording medium; a photo-detector that has a plurality of photo-detecting planes disposed orthogonal to an optical axis of the reflected light beam and symmetrical with respect to the optical axis, and detects the light beam reflected by the optical recording medium, wherein each of the photo-detecting plane is divided into a plurality of divided areas by a plurality of dividing lines which symmetrically divide the photo-detecting planes with respect to the optical axis; a diffractive optical element that is disposed upstream to the photo-detector for diffracting the reflected light beam, wherein the diffracting optical element diffracts the reflected light beam such that the reflected light beam is divided at least in a direction orthogonal to a track of the optical recording medium, and an +Nth order diffracted light beam and –Nth order diffracted light beam (N is an integer more than 1) in the photo-detecting plane are independently received by the divided areas which are disposed in positions symmetrically opposite with respect to the optical axis respectively; an arithmetic circuit that calculates an error signal with respect to a position of the objective lens along the optical axis, by using outputs from the photo-detector concerning both the +Nth order diffracted light beam and –Nth order diffracted light beam; and a driver that generates a signal for controlling the position of the objective lens based on an output from the arithmetic circuit.

The diffracting optical element may diffract the reflected light beam such that the reflected light beam is further divided in a direction parallel to the track of the optical recording medium.

The dividing lines of the photo-detecting plane may include at least one dividing line which extends in a direction orthogonal to the track of the optical recording medium. Here, the dividing lines of the photo-detecting plane may further include another dividing line which extends in a direction orthogonal to the track of the optical recording medium, and the dividing lines of the photo-detecting plane may further include another dividing line which extends in a direction parallel to the track of the optical recording medium.

The track on the optical recording medium may include a groove.

The optical head apparatus may further include: a beam splitter that guides the light beam to the objective lens when the light beam enters from the light source through a first optical path, and guides the light beam to the photo-detector when the light beam enters from the objective lens through a second optical path; and a beam shaping prism that is disposed one of the first and the second optical paths, for modifying the sectional shape of the light beam.

The present invention still further provides an optical head apparatus that is capable of reproducing information from an optical recording medium, including: a light source that emits a light beam; an objective lens that receives a light beam from a light source and condenses the light beam onto the optical recording medium; a photo-detector that detects the light beam reflected by the optical recording medium; a beam splitter that guides the light beam to the objective lens when the light beam enters from the light source through a first optical path, and guides the light beam to the photo-detector when the light beam enters from the objective lens through a second optical path; and a beam shaping prism that is disposed in one of the first and the second optical paths, for modifying the sectional shape of the light beam.

The optical head apparatus may further include a diffracting optical element that is disposed upstream to the photo-detector for diffracting the reflected light beam. Here, the diffracting optical element may be disposed between the objective lens and the beam shaping prism.

BRIEF DESCRIPTION OF THE DRAWINGS

The accompanying drawings, which are incorporated in and constitute a part of this specification, illustrate several preferred embodiments of the invention and, together with the description, serve to explain the principles of the invention.

FIG. 10A is a diagram showing the intensity distribution of the light beam on the photo-detecting planes of the photo-detector 9 in an in-focus condition after being diffracted by the diffractive optical element 8.

FIG. 10B is a diagram showing the intensity distribution of the light beam entering the diffractive optical element 8 in the in-focus condition.

FIG. 10C is a diagram showing the beam spot of the light beam on the optical disk 6.

FIG. 11A is a diagram showing the intensity distribution of the light beam on the photo-detecting planes of the photo-detector 9 in the in-focus condition after being diffracted by the diffractive optical element 8.

FIG. 11B is a diagram showing the intensity distribution of the light beam entering the diffractive optical element 8 in the in-focus condition.

FIG. 11C is a diagram showing the beam spot of the light beam on the optical disk 6.

FIG. 12A is a diagram showing the intensity distribution of the light beam on the photo-detecting planes of the photo-detector 9 in the in-focus condition after being diffracted by the diffractive optical element 8.

FIG. 12B is a diagram showing the intensity distribution of the light beam entering the diffractive optical element 8 in the in-focus condition.

FIG. 12C is a diagram showing the beam spot of the light beam on the optical disk 6.

FIG. 26A is a diagram showing the intensity distribution of the light beam on the photo-detecting planes of the photo-detector 9 in the in-focus condition after being diffracted by the diffractive optical element 8.

FIG. 26B is a diagram showing the intensity distribution of the light beam entering the diffractive optical element 8 in the in-focus condition.

FIG. 26C is a diagram showing the beam spot of the light beam on the optical disk 6.

FIG. 27A is a diagram showing the intensity distribution of the light beam on the photo-detecting planes of the photo-detector 9 in the in-focus condition after being diffracted by the diffractive optical element 8.

FIG. 27B is a diagram showing the intensity distribution of the light beam entering the diffractive optical element 8 in the in-focus condition.

FIG. 27C is a diagram showing the beam spot of the light beam on the optical disk 6.

DETAILED DESCRIPTION OF THE PREFERRED EMBODIMENT

Preferred embodiments of an optical head apparatus of the present invention will now be specifically described in more detail with reference to the accompanying drawings. Wherever possible, the same reference numbers will be used throughout the drawings to refer to the same or like parts.

First Embodiment

Figure 4:
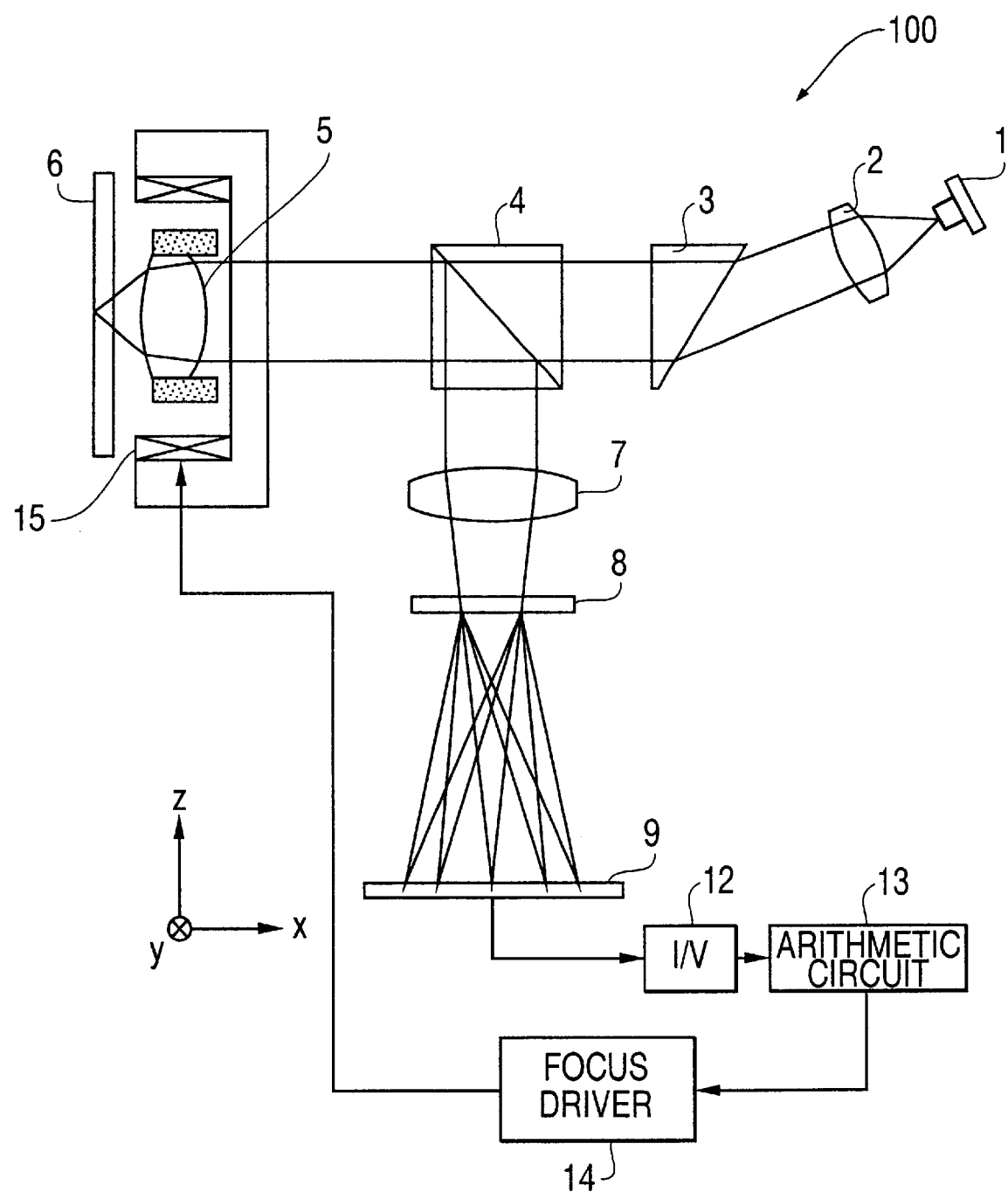
FIG. 4 is a diagram showing the main part of an optical head apparatus according to a first embodiment of the present invention.

FIG. 4 is a diagram showing the main part of an optical head apparatus according to a first embodiment of the present invention. The optical head apparatus 100 of the present invention includes a light source 1, a collimator lens 2, a beam shaping prism 3, a beam splitter 4, an objective lens 5, a condenser lens 7, a diffractive optical element 8, a photo-detector 9, an amplifier array 12 capable of converting current to voltage, and an arithmetic circuit 13.

The output signal from the arithmetic circuit 13 is provided to a focus driver 14, and the output thereof excites a focusing coil 15 which is capable of driving the objective lens 5 in the direction of its optical axis. The current of the focus coil 15 and the magnetic flux of focus magnets 16 generate electromagnetic force, thereby moving the objective lens 5 in a suitable distance in the direction of the optical axis.

The light source 1, such as a semiconductor laser, irradiates light beam and the light beam is transformed into parallel optical flux by the collimator lens 2. The cross section of the light beam output from the collimator lens 2 is shaped by the beam shaping prism 3, and the light beam is then input to the beam splitter 4. The light beam that has passed through the beam splitter 4 is focused and condensed onto the optical disk 6, such as a CD-ROM or a DVD (Digital Versatile Disk), as a minute spot by the objective lens 5.

The light beam reflected from the optical disk 6 is guided to the direction opposite to the incident light beam to the optical disk 6, and enters the beam splitter 4 passing through the objective lens. The reflected light beam from the optical disk 6 entering the beam splitter 4 is reflected by the beam splitter 4, and is then condensed by the condenser lens 7 so as to be input to the diffractive optical element 8.

Figure 5B:
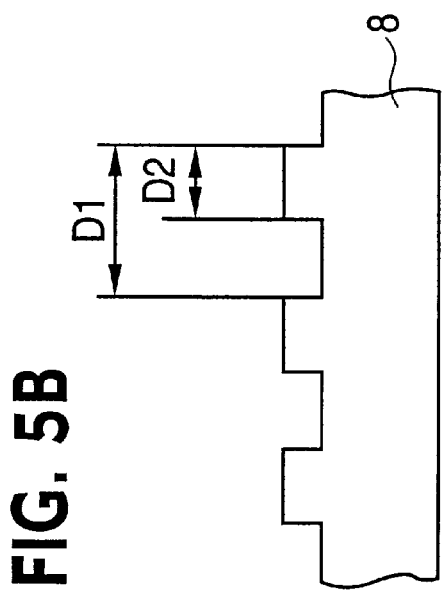
FIGS. 5A and 5B are diagrams showing an exemplary structure of the diffractive optical element 8.
Figure 5A:
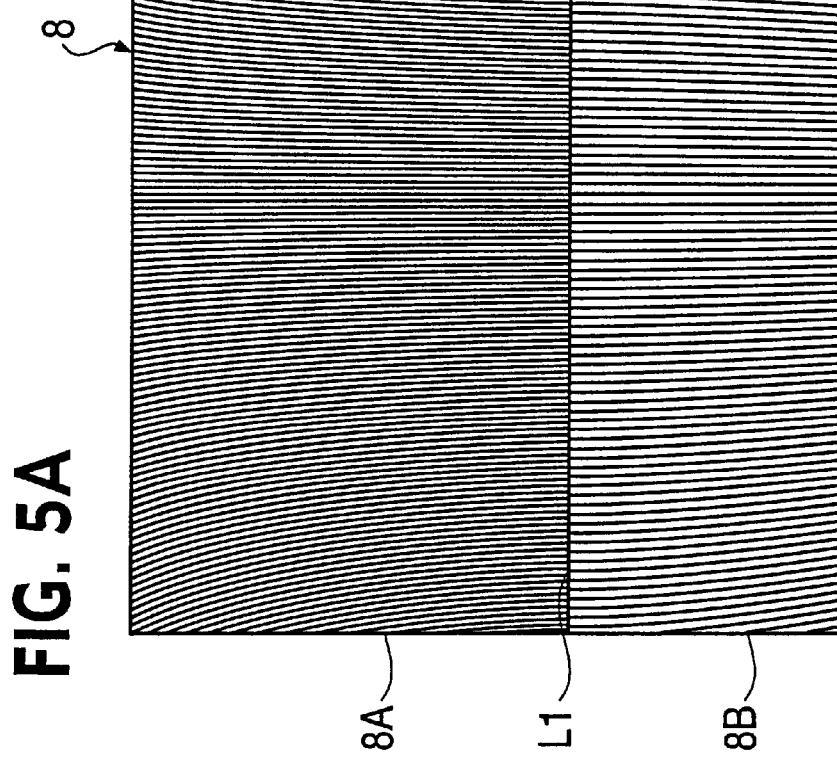

FIGS. 5A and 5B are diagrams showing an exemplary structure of the diffractive optical element 8. As shown in FIGS. 5A and 5B, the diffractive optical element 8 has two diffracting areas 8A and 8B constituted of groups of curves. Specifically, the diffracting area 8A is constituted of bobbin-shape-curved diffraction gratings and the diffracting area 8B is constituted of barrel-shape-curved diffraction gratings. These diffracting areas 8A and 8B are separated from each other by a straight line L1, which intersects the beam axis of the reflected light beam (corresponds to Z-axis in FIG. 4A) and is parallel to tracks on the optical disk 6 (corresponds to X-axis in FIG. 4A). The diffracting areas 8A and 8B diffract the reflected light beam from the optical disk 6 into zero order, +1st order and −1st order diffracted light beam, respectively. The pitch of the diffraction gratings of the diffracting areas 8A and 8B has a spatial frequency necessary for separately detecting the zero order diffracted light beam, the +1st order diffracted light beam and the −1st order diffracted light beam in the vicinity of the focal plane of the condenser lens 7, and are given a spatial change for deforming the +1st order diffracted light beam and the −1st order diffracted light beam into a spot shape necessary for implementing the focus error detection in the vicinity of the focal plane of the condenser lens 7.

The pattern shape of the diffraction grating of the diffractive optical element 8 shown in FIG. 5A is one example designed so that a distance between the zero order diffracted light beam and the +1st order diffracted light beams from the diffracting area 8A of the diffractive optical element 8 corresponds to 0.6 mm, and a distance between the zero order diffracted light beam and the +1st order diffracted light beams from the diffracting area 8B of the diffractive optical element 8 corresponds to 0.4 mm, when a distance between the diffractive optical element 8 and the photo-detector 9 is 20 mm and a diameter of the beam on the diffractive optical element 8 is 2 mm. Further, in order to allocate the 1st order diffracted light beam equally as positive and negative, it is desirable to form the cross sections of the diffracting areas 8A and 8B so that their profile turns has a stepped phase grating in which the ratio of the width of the grating D2 to the pitch of the grating D1 is ½ as shown in FIG. 5B. The photo-detector 9 is disposed so as to detect the diffracted light beam from the diffractive optical element 8.

Figure 6:
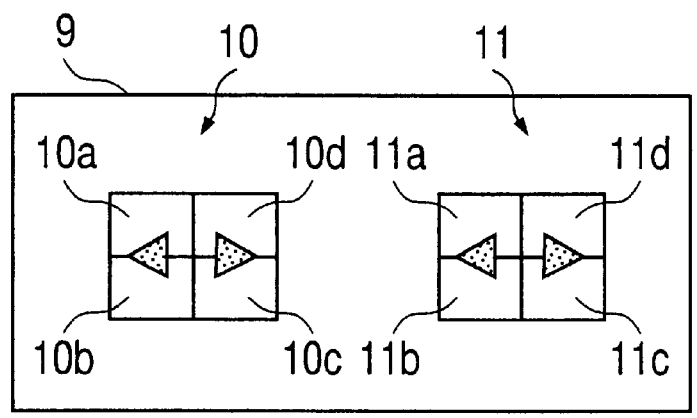
FIG. 6 is a diagram showing an exemplary structure of the photo-detector 9.
Figure 7:
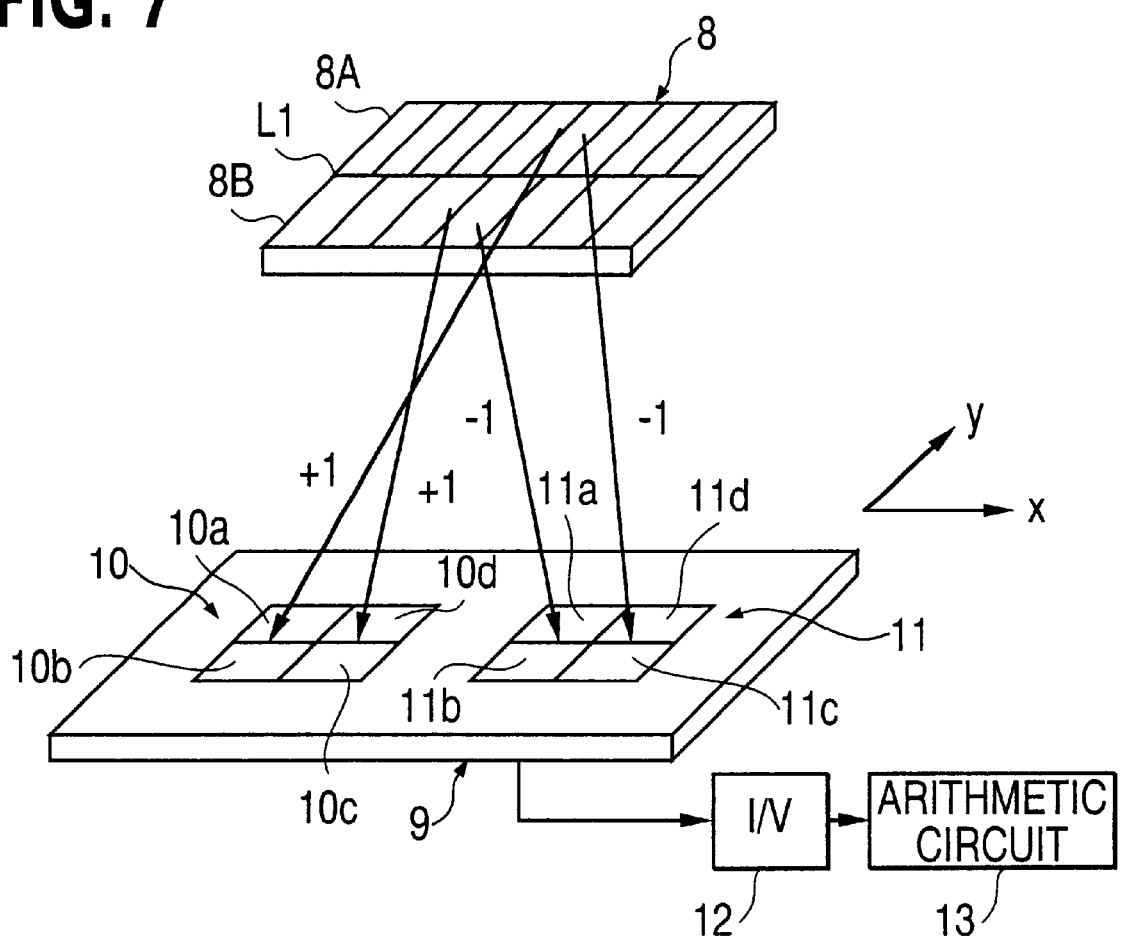
FIG. 7 is a diagrams showing an exemplary structure of the photo-detector 9.

FIGS. 6 and 7 are diagrams showing an exemplary structure of the photo-detector 9. The photo-detector 9 has first and second photo-detecting planes 10 and 11 and each of them is quadrisected (four-divided). The first photo-detecting plane 10 is divided into four divisional areas 10a to 10d by a first dividing line in the same direction as an image of the area dividing line L1 of the diffractive optical element 8, and a second dividing line is orthogonal to the first dividing line. Similarly, the second photo-detecting plane 11 is divided into four divisional areas 11a to 11d by the first dividing line in the same direction as the image of the area dividing line L1 of the diffractive optical element 8, and the second dividing line is orthogonal to the first dividing line.

As shown in FIG. 7, the divisional areas 10a and 10b receive the +1st order diffracted light beam from the diffracting area 8A of the diffractive optical element 8, and the divisional areas 10c and 10d receive the +1st order diffracted light beam from the diffracting area 8B of the diffractive optical element 8. The divisional areas 11c and 11d receive the −1st order diffracted light beam from the diffracting area 8A of the diffractive optical element 8, and the divisional areas 11a and 11b receive the −1st order diffracted light beam from the diffracting area 8B of the diffractive optical element 8. Signal currents corresponding to the respective divisional areas 10a to 10d and 11a to 11d of the photo-detecting planes 10 and 11 of the photo-detector 9 are converted to respective voltage signals, and are amplified to an adequate level by the current-voltage convert amplifier array 12 thereby being input to the arithmetic circuit 13.

The arithmetic circuit 13 generates the focus error signal F by using the following Equation (1):

$$F=(S_{10a}+S_{10c})-(S_{10b}+S_{10d})+(S_{11b}+S_{11d})-(S_{11a}+S_{11c}) \quad (1)$$

where $S_{10a}$, $S_{10b}$, $S_{10c}$ and $S_{10d}$ represent the signals corresponding respectively to the divisional areas 10a, 10b, 10c and 10d among the output signals corresponding to the photo-detecting plane 10, and $S_{11a}$, $S^{11b}$, $S_{11c}$ and $S_{11d}$ represent the signals corresponding respectively to the divisional areas 11a, 11b, 11c and 1d among the output signals corresponding to the photo-detecting plane 11.

That is, in the arithmetic circuit 13, a sum signal ($S_{10a}+S_{10c}$) derived from outputs of the two divisional areas 10a and 10c in a diagonal relation, and a sum signal ($S_{10b}+S_{10d}$) derived from outputs of the two divisional areas 10b and 10d in the diagonal relation are used to generate a difference signal ($S_{10a}+S_{10c}$)−($S_{10b}+S_{10d}$), concerning the output from the photo-detecting plane 10 of the photo-detector. Similarly, a sum signal ($S_{11a}+S_{11c}$) derived from outputs of the two divisional areas 11a and 11c in the diagonal relation, and a sum signal ($S_{11b}+S_{11d}$) derived from outputs of the two divisional areas 11b and 11d in the diagonal relation are used to generate a difference signal ($S_{11a}+S_{11c}$)−($S_{11b}+S_{11d}$), concerning the output from the photo-detecting plane 10 of the photo-detector. Deriving these two difference signals makes it possible to generate the focus error signal.

FIGS. 8A to 8E are diagrams showing changes of the spot shape of the light beam, which is diffracted by the diffractive optical element 8, on the detecting surface of the photo-detector 9, when the relative position between the objective lens 6 and the optical disk 6 is changed. In the figures, the spot of the light beam is represented by an aggregation of dots.

Figure 8A:
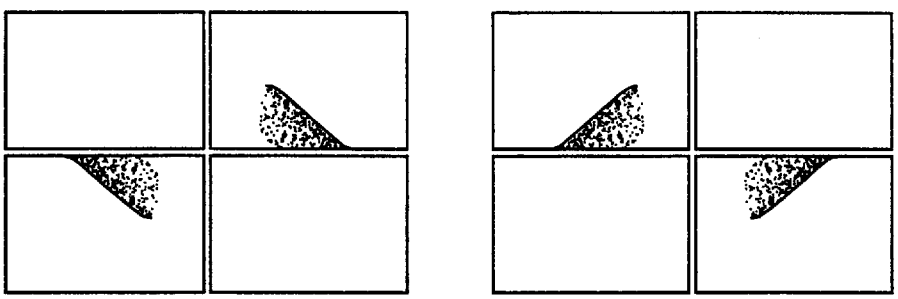
FIGS. 8A to 8E are diagrams showing changes of the spot shape of the light beam, which is diffracted by the diffractive optical element 8, on the detecting surface of the photo-detector 9, when the relative position between the objective lens 6 and the optical disk 6 is changed.

FIG. 8A shows a condition where the objective lens 5 is close to the optical disk 6.

Figure 8B:
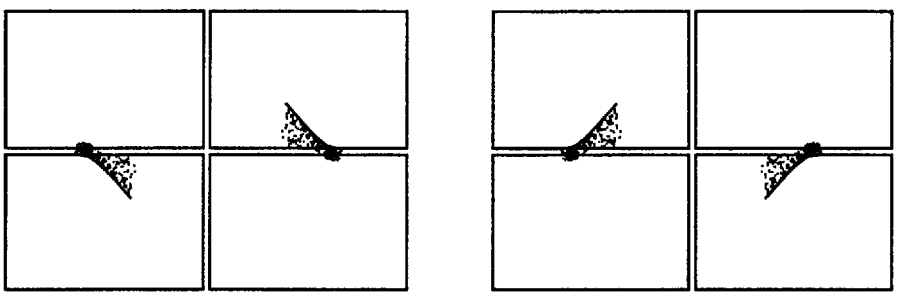
Figure 8C:
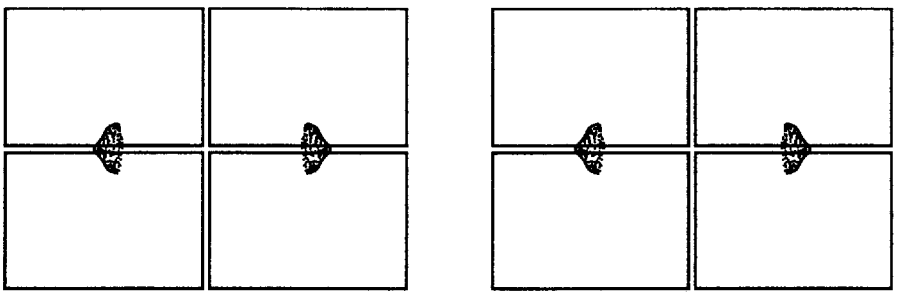

FIG. 8C shows the in-focus condition where the focal point of the objective lens 5 is located on the surface of the optical disk 6, and the spot of the light beam presents almost a line-symmetrical shape.

Figure 8D:
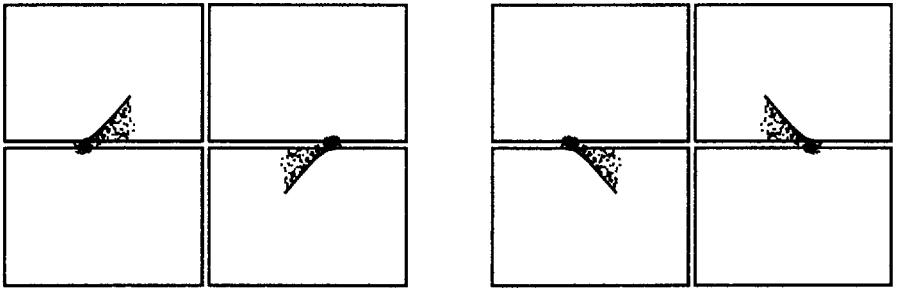
Figure 8E:
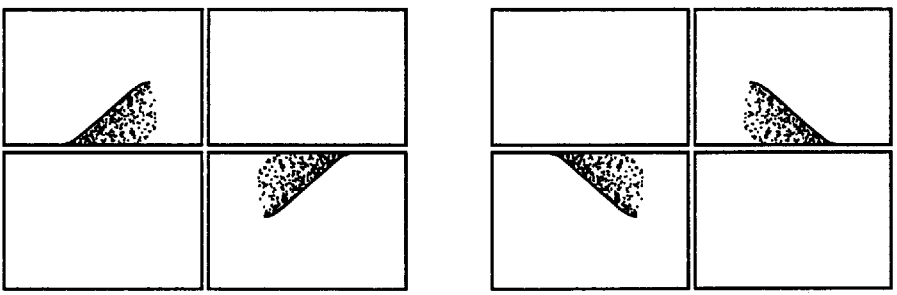

FIG. 8E shows a condition where objective lens 5 is apart from the optical disk 6, and the changes of the spot shape of the light beam are also opposite, in contrary to the condition shown in FIG. 8A.

FIGS. 8B and 8D show transitional conditions from FIG. 8C to FIG. 8A and FIG. 8C to FIG. 8E, respectively.

Figure 9:
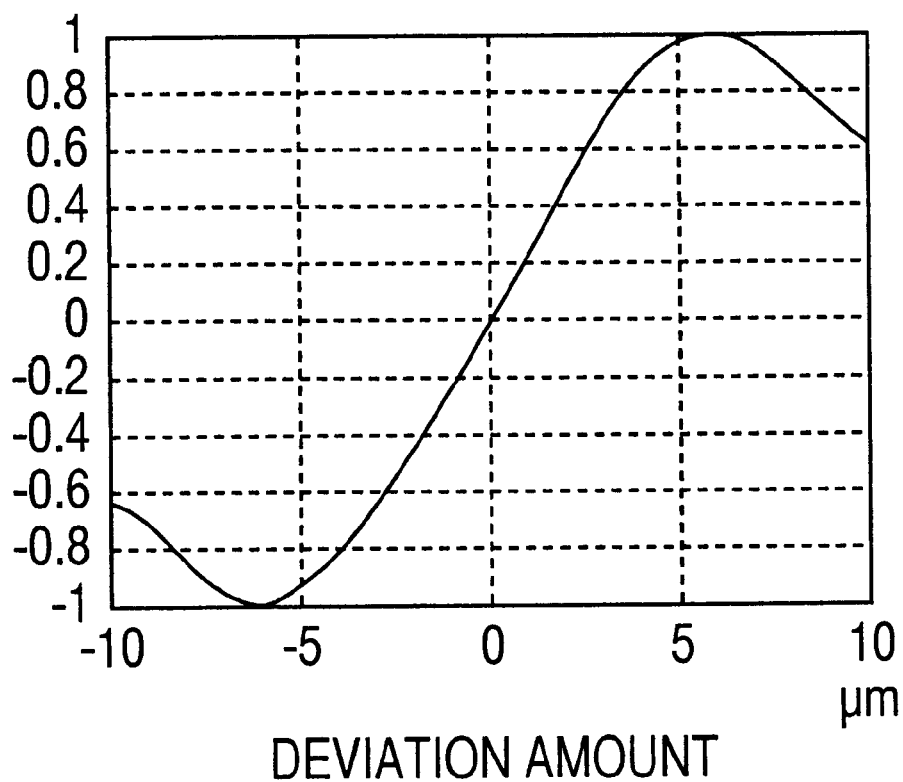
FIG. 9 is a diagram showing a relationship of the focus error signal F with respect to the misalignment amount of the focus error.

Therefore, by using Equation (1) in the arithmetic circuit 13 as mentioned above, the focus error signal, which becomes zero at the in-focus condition as shown in FIG. 8C and the magnitude and the polarity thereof change corresponding to the amount and the direction of misalignment from the focal point of the objective lens 5, can be obtained. FIG. 9 is a diagram showing relationship of the focus error signal F with respect to the misalignment amount of the focus error.

According to the present embodiment, the fluctuation of the focus error signal which occurs noticeably in detecting the focus error by means of the conventional astigmatic method can be reduced even though the misalignment of the diffractive optical element 8, the photo-detector 9 or the like takes place due to an error in assembling the optical head apparatus and an aged deterioration, for example. Such effect of the present invention will be explained in detail by referring to FIGS. 10 to 12.

FIGS. 10A, 11A and 12A are diagrams showing intensity distribution of the light beam on the photo-detecting planes of the photo-detector 9 in the in-focus condition after being diffracted by the diffractive optical element 8, and FIGS. 10B, 11B and 12B are diagrams showing the intensity distribution of the light beam entering the diffractive optical element 8 in the in-focus condition, and FIGS. 10C, 11C and 12C are diagrams showing the beam spot of the light beam on the optical disk 6. The following explanation will be made, by referring to FIGS. 10 to 12, for three cases: (1) when there is no misalignment between the diffractive optical element 8 and the photo-detector 9, (2) when there is misalignment on the photo-detector 9, and (3) when there is misalignment on the diffractive optical element 8, respectively.

(1) No Misalignment Between the Diffractive Optical Element 8 and the Photo-detector 9:

FIGS. 10A, 10B and 10C are diagrams showing, when there is no misalignment between the diffractive optical element 8 and the photo-detector 9, and intensity distribution of the ideal optical system in the in-focus condition. The reference numbers 91 to 93 in FIG. 10A represent the photo-detecting planes of the photo-detector 9, and dark portions thereof diagrammatically represent diffraction images of the pits or the recorded marks on the optical disk 6. The reference numbers 81 to 83 in FIG. 10B represent the surfaces of the diffractive optical element 8, and circles thereof diagrammatically represent the light beam entering the diffractive optical element 8, and dark portions thereof diagrammatically represent diffraction images of the pits or the recorded marks, respectively. Circles 191 to 193 illustrated by short dashed lines in FIG. 10C represent spots of the light beam on the optical disk 6, and the reference number 18 thereof represents the pits or the recorded marks on the optical disk 6.

As the light beam condensed by the objective lens 5 scans on the pits or recorded marks 18 on the optical disk as symbols a, b and c shown in FIG. 10C, the intensity distribution of the incident light beam onto the diffractive optical element 8 changes as reference numbers 81, 82 and 83 shown in FIG. 10B, due to the influence of diffraction caused by the pits or the recorded marks 18. At this time, the intensity distributions of the +1st order diffracted light beam and the −1st order diffracted light beam from the diffractive optical element 8 on the photo-detecting plane of the photo-detector 9 change as reference numbers 91, 92 and 93 shown in FIG. 10A, and the intensity distribution of the +1st order diffracted light beam and that of the −1st order diffracted light beam become symmetrical with respect to an origin, which corresponds to the intersection of the optical axis with the photo-detecting plane. Accordingly, when the focus error signal F is calculated, based on Equation (1), the F becomes always zero, since both terms ($S_{10a}+S_{10c}$)−($S_{10b}+S_{10d}$) and ($S_{11b}+S_{11d}$)−($S_{11a}+S_{11c}$) thereof become zero, although the intensity distribution on each photo-detecting plane of the photo-detector 9 changes even at the in-focus time when the pits or the recorded marks 18 on the optical disk 6 are scanned by the light beam as shown in FIG. 10.

(2) Misalignment on the Photo-detector 9:

FIGS. 11A, 11B and 11C are diagrams showing the intensity distribution, when there is misalignment on the photo-detector 9 along the direction orthogonal to the image of the area dividing line L1 of the diffractive optical element 8. Similar to FIGS. 10A, 10B and 10C, the reference numbers 94, 95 and 96 in FIG. 11A represent the photo-detecting planes of the photo-detector 9, and dark portions thereof diagrammatically represent the diffraction images of the pits or the recorded marks. The reference numbers 84, 85 and 86 in FIG. 11B represent the surfaces of the diffractive optical element 8, and circles thereof diagrammatically represent the light beam entering the diffractive optical element 8, and dark portions thereof diagrammatically represent diffraction images of the pits or the recorded marks, respectively. Circles 191,192 and 193 illustrated by short dashed lines in FIG. 11C represent the spots of the light beam on the optical disk 6, and the reference number 18 thereof represents the pits or the recorded marks on the optical disk 6.

When the pits or the recorded marks 18 on the optical disk 6 are scanned by the light beam, the intensity of the received light beam on each photo-detecting plane of the photo-detector 9 changes. However, the anomaly of the amount of light beam on the photo-detector 9 can be canceled by calculating the focus error signal F based on Equation (1), and the fluctuation of the focus error signal F which has occurred noticeably in the conventional astigmatic method can be reduced even when the pits or the recorded marks 18 are scanned by the light beam. That is, similarly to the case of (1), the focus error signal F becomes always zero since both terms $(S_{10a}+S_{10c})-(S_{10b}+S_{10d})$ and $(S_{11b}+S_{11d})-(S_{11a}+S_{11c})$ thereof also become zero in this case.

(3) Misalignment on the Diffractive Optical Element 8:

The present embodiment also makes it possible to reduce the fluctuation of the focus error signal even though there is misalignment on the diffractive optical element 8. FIGS. 12A, 12B and 12C are diagrams showing the intensity distribution, when there is misalignment on the diffractive optical element 8 along the direction orthogonal to the area dividing line L1 of the diffractive optical element 8. Similar to those of FIGS. 10A, 10B, 10C, 11A, 11B and 11C, the reference numbers 97, 98 and 99 in FIG. 12A represent the photo-detecting planes of the photo-detector 9, and dark portions thereof diagrammatically represent the diffraction images of the pits or the recorded marks. The reference numbers 87, 88 and 89 in FIG. 12B represent the surfaces of the diffractive optical element 8, and circles thereof diagrammatically represent the light beam entering the diffractive optical element 8, and dark portions thereof diagrammatically represent diffraction images of the pits or the recorded marks, respectively. Circles 191,192 and 193 illustrated by short dashed lines in FIG. 12C represent the spots of the light beam on the optical disk 6, and the reference number 18 thereof represents the pits or the recorded marks on the optical disk 6.

In this case, because the amount of light beam entering, both of the diffracting areas 8A and 8B of the diffractive optical element 8 are different, the size of the light beam on the photo-detector 9 becomes imbalanced. However, the anomaly of the amount of light beam on the photo-detector 9 can be canceled by calculating the focus error signal F based on Equation (1), and the fluctuation of the focus error signal F which has occurred noticeably in the conventional astigmatic method can be reduced even when the pits or the recorded marks 18 are scanned by the light beam.

That is, although the two difference signals of $(S_{10a}+S_{10c})-(S_{10b}+S_{10d})$ and $(S_{11b}+S_{11d})-(S_{11a}+S_{11c})$ in Equation (1) have certain values in this case, these difference signals are canceled by calculating Equation (1) because they have the same magnitude and have the polarities opposite to each other. Eventually, the focus error signal F always becomes zero.

As is explained above, according to the present embodiment, the focus error signals can be detected properly without the influence of misalignment on the diffractive optical element 8 or the photo-detector 9, even though there is misalignment thereof.

As a modification of the present embodiment, the focus error signal F can be carried out by using the following Equations (2) or (3), instead of Equation (1):

$$F=(S_{10d}-S_{10a})+(S_{11c}-S_{11b}) \quad (2)$$

$$F=(S_{10c}-S_{10b})+(S_{11d}-S_{11a}) \quad (3)$$

That is, according to the Equation (2), the focus error signal F is generated by carrying out a difference signal $(S_{10d}-S_{10a})$ of signals corresponding to the two divisional areas 10d and 10a which are adjacent to each other in the direction of the area dividing line L1 (in the direction parallel to the tracks on the optical disk 6) for the output signals corresponding to the photo-detecting plane 10 from the photo-detector 9, by carrying out a difference signal $(S_{11c}-S_{11b})$ corresponding to the two divisional areas 11c and 11b which are adjacent to each other in the direction of the area dividing line L1, and whose positions are different from the divisional areas 10d and 10a in the direction orthogonal to the area dividing line L1 for the output signals corresponding to the photo-detecting plane 11 from the photo-detector 9 and by carrying out a sum signal of those two difference signals $(S_{10d}-S_{10a})$ and $(S_{11c}-S_{11b})$.

Similarly, the focus error signal F is generated by Equation (3) by carrying out a difference signal $(S_{10c}-S_{10b})$ of signals corresponding to the two divisional areas 10c and 10b which are adjacent to each other in the direction of the area dividing line L1 for the output signals corresponding to the photo-detecting plane 10 from the photo-detector 9, by carrying out a difference signal $(S_{11d}-S_{11a})$ corresponding to the divisional areas 11d and 11a which are adjacent to each other in the direction of the area dividing line L1 and whose positions are different from the divisional areas 10c and 10b in the direction orthogonal to the area dividing line L1 for the output signals corresponding to the photo-detecting plane 11 from the photo-detector 9, and by carrying out a sum signal of those two difference signals $(S_{10c}-S_{10b})$ and $(S_{11d}-S_{11a})$.

As it is apparent, from the intensity distributions of the light beam among the photo-detecting planes 94, 95 and 96 shown in FIG. 11A, using the focus error signal F generated according to Equation (2) or Equation (3) can cancel the anomaly in the amount of the light beam on the photo-detector 9, and the fluctuation of the focus error signal F which has occurred noticeably in the conventional astigmatic method can be reduced.

Further, as it is apparent from the intensity distributions of the light beam among the photo-detecting planes 97, 98 and 99 shown in FIG. 12B, using the focus error signal F generated according to Equation (2) or Equation (3) can cancel the anomaly in the amount of the light beam on the photo-detector 9, and the fluctuation of the focus error signal F which has occurred noticeably in the conventional astigmatic method can be reduced.

Additionally, in the optical head apparatus of the present embodiment, a tracking error signal T, as well as the focusing error signal F, can be obtained simultaneously, by using the output signal from the photo-detector. For example, it can be realized by using a push-pull method to obtain the tracking error signal from the irregularity or the like representing continuous tracks such as grooves on the optical disk 6, and by using a differential phase detection method to obtain a tracking error signal from a continuous pit arrays recorded on the optical disk 6.

In the push-pull method, although the calculation by using the photo-detector 9 is different, whether the dividing line of the diffractive optical element 8 extends in the tangential direction of the optical disk 6 or the radial direction thereof as shown in FIG. 5A, the calculation may be carried out by considering that the light beam is divided in the tangential direction of the optical disk 6.

For example, the tracking error signal T can be calculated according to any one of the following Equations (4), (5) and (6), when the direction of the dividing line extends in the tangential direction of the optical disk 6:

$$T=(S_{10a}+S_{10b})-(S_{10c}+S_{10d}) \quad (4)$$

$$T=(S_{11c}+S_{11d})-(S_{11a}+S_{11b}) \quad (5)$$

$$T=(S_{10a}+S_{10b})-(S_{10c}+S_{10d})+(S_{11c}+S_{11d})-(S_{11a}+S_{11b}) \quad (6)$$

That is, the tracking error signal T based on the push-pull method can be carried out by using any one of these Equations (4), (5) and (6) as described above.

Meanwhile, in the differential phase detection method, the photo-detecting planes of the photo-detector 9 are disposed so that the beam spot of the light beam reflected from the optical disk 6 is divided by axes in the tangential direction and the radial directions of the optical disk 6. For example, the tracking error signal T based on the differential phase detection method can be derived by detecting a differential phase detection between signals T1 and T2 obtained from the following Equations (7) and (8):

$$T1=S_{10a}+S_{10c} \quad (7)$$

$$T2=S_{10b}+S_{10d} \quad (8)$$

Similarly to that, another method of deriving the tracking error signal T based on the differential phase detection method is to detect a differential phase detection between signals T3 and T4 obtained from the following Equations (9) and (10):

$$T3=S_{11a}+S_{11c} \quad (9)$$

$$T4=S_{11b}+S_{11d} \quad (10)$$

Moreover, still other method of deriving the tracking error signal T based on the differential phase detection method is to detect a differential phase detection between signals T5 and T6 obtained from the following Equations (11) and (12):

$$T5=S_{10a}+S_{10c}+S_{11a}+S_{11c} \quad (11)$$

$$T6=S_{10b}+S_{10d}+S_{11b}+S_{11d} \quad (12)$$

The same result can be obtained by using any one of the above-mentioned three tracking error detecting methods in the present embodiment.

The principle for detecting the focus error in the present invention will be explained below in detail by referring to FIG. 13. It is noted that the principle will be explained based on the structure of the first embodiment, and the principle is also applied to the following embodiments.

Figure 13:
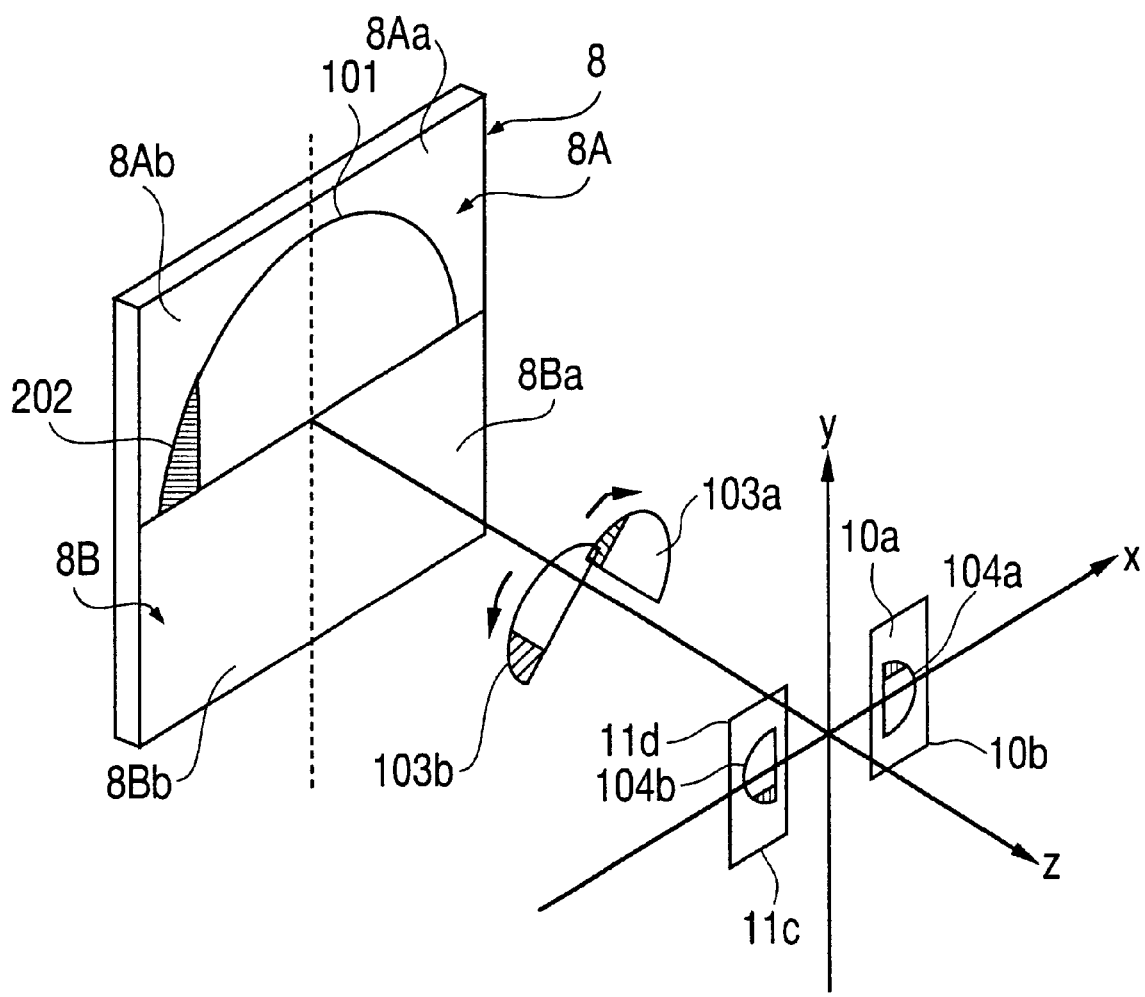
FIG. 13 is a diagram explaining the optical relationship between the diffractive optical element 8 and the photo-detector 9 as shown in FIG. 7.

FIG. 13 is a diagram explaining the optical relationship between the diffractive optical element 8 and the photo-detector 9 as shown in FIG. 7. To make the following explanation easier, only elements such as a semi-circular reflected light beam 101 which is divided along the direction parallel to the tracks of the optical disk 6, the divided areas 10a and 10b of the first photo-detecting plane 10 and the divided areas 11a and 11b of the second photo-detecting plane 11 of the photo-detector 9 in which the diffracting light beam enters and is generated when the reflected light beam 101 is diffracted by the diffracting areas 8A (8Aa and 8Ab) of the diffractive optical element 8, are illustrated.

As shown in FIG. 13, the semi-circular reflected light beam 101 is diffracted by the diffracting areas 8A of the diffractive optical element 8 thereby generating +1st order diffracted light beams 103a and 104a and −1st order diffracted light beams 103b and 104b. Here, the diffracted light beams 103a and 103b are illustrated to explain diffracting light beams at about an intermediate position between the diffractive optical element 8 and the photo-detector 9. Diffracting light beams 104a and 104b are illustrated to explain diffracting light beams on the photo-detector 9, and the beam shapes thereof are illustrated based on when the focus position of the objective lens 5 coincides with the surface of the optical disk 6. Further, in order to detect the focus error signal in FIG. 13, the pattern of the grating of the diffractive optical element 8 is designed so that the +1st order diffracted light beam from diffracting areas 8Aa and 8Ab of the diffractive optical element 8 reaches on the divided areas 10b and 10a of the photo-detector 9, and the −1st order diffracted light beam from diffracting areas 8Aa and 8Ab of the diffractive optical element 8 reaches on the divided areas 11d and 11c of the photo-detector 9, respectively.

That is, the +1st order diffracted light beams and −1st order diffracted light beams of partial reflected light beams are generated from the reflected light beam 101 dividing into four beams by the lines parallel to the tracks on the optical disk 6 (Y-axis) and orthogonal thereto (X-axis). The diffracted light beam from the diffracting area 8Aa is one example of the partial reflected light beam. The +1st order diffracted light beams and −1st order diffracted light beams are received by partial areas of the photo-detecting planes of the photo-detector 9, which are disposed symmetrically with respect to the optical axis Z of the reflected light beams 101. The divided areas 10b and 11d of the photo-detector 9 are examples of the partial areas. Accordingly, the +Nth order diffracted light beam and −Nth order diffracted light beam of partial reflected light beams adjacent to each other with Y-axis are received by the partial areas adjacent to each other with the X-axis, such as the divided areas 10b and 10a or divided areas 11d and 11c. The diffractive optical element 8 is designed by the above-mentioned concept.

As seen from the sectional shapes of the reflected light beams 103a and 103b looking from the diffractive optical element 8 to the photo-detector 9, the pattern of the grating of the diffractive optical element 8 is designed so that the +1st order diffracted light beam in a X-Y plane goes forward along a The Z-axis with a counterclockwise rotation, while the −1st order diffracted light beam in the X-Y plane goes forward along the Z-axis with a clockwise rotation.

Under the in-focus condition, the sectional beam shape of the +1st order diffracted light beam 104a on the divided areas 10a and 10b, and the sectional beam shape of the −1st order diffracted light beam 104b on the divided areas 10d and 10c, become symmetric to each other with respect to the X-axis.

On the other hand, when the focus misalignment of the objective lens 5 against the optical disk 6 occurs, the symmetricalness of the sectional beam shape with respect to the X-axis on the photo-detector 9 is lost, similar to as shown in FIGS. 8A to 8E. Therefore, the focus error signal F can be obtained by calculations in the arithmetic circuit 13 based on Equation (1), (2) or (3).

Even though misalignment exists on the photo-detector 9 or the diffractive optical element 8, as explained in above paragraphs (1) and (2), the fluctuation of the focus error signal caused by the misalignment can be decreased, because a diffracting image 202 of the pit on the optical disk 6 appears on the partial areas arranged symmetrically with respect to the Z-axis on the photo-detector 9, as shown in FIG. 13.

That is, by detecting the focus error signal using the outputs of the photo-detector 9 concerning the +1st order diffracted light beam and −1st order diffracted light beam of the reflected light beam, it is possible to reduce the fluctuation of the focus error signal F influenced by the diffracted images from the pits and the like.

It is noted that the sectional shape of the light beam on the photo-detector 9 in FIG. 8 is different from that in FIG. 13. The reason for this is that, although FIG. 8 shows a design of the diffractive optical element 8 so as to reduce the reflected light along the X-axis direction, which is independent of the focus error detection, FIG. 13 shows a case when the diffractive optical element 8 is not designed like that of FIG. 8 to simplify the explanation.

The pattern of the grating of the diffractive optical element 8 in FIG. 13 is designed so that the +1st order diffracted light beams from the diffracting areas 8Aa and 8Ab of the diffractive optical element 8 reach the divided areas 10b and 10a of the photo-detector 9, respectively. However, on the contrary, it is possible to design so that the +1st order diffracted light beams from the diffracting areas 8Aa and 8Ab reach the divided areas 10a and 10b of the photo-detector 9, respectively. In this case, because the −1st order diffracted light beams from the diffracting areas 8Aa and 8Ab of the diffractive optical element 8 are conjugate to the +1st order diffracted light beams, these diffracting light beams reach the divided areas 11c and 11d of the photo-detector 9, respectively, thereby bringing about the same effect as with the case described above.

In the case when the distance between the diffractive optical element 8 and the photo-detector 9 becomes short, and the pattern of the grating of the diffractive optical element 8 is designed so as to be optimized only to the +1st order diffracted light, the −1st order diffracted light beam is distorted and the effect of reducing the fluctuation of the focus error signal F influenced by the diffraction images of the pits and the like is weakened. Therefore, it is also desirable to design the pattern of the grating of the diffractive optical element 8 so as to be optimized to the ±1st order diffracted light beams. Specifically, it is preferable to design the pattern of the grating of the diffractive optical element 8 so that the +1st order diffracted light beams from the diffracting areas 8Aa and 8Ab of the diffractive optical element 8 reach the divided areas 10b and 10a of the photo-detector 9, respectively, and so that the −1st order diffracted light beams from the diffracting areas 8Aa and 8Ab of the diffractive optical element 8 reach the divided areas 11d and 11c of the photo-detector 9, respectively, for example.

The detection of tracking error may be performed, in the conventional differential phase detection method, by quadrisecting the reflected light beam from the optical disk 6. However, in the present invention, the reflected light beam is quadrisected by the diffractive optical element 8 and the photo-detector 9 at the in-focus condition, so that the point in the divided areas on the photo-detector 9, where the diffracted light beams reach, moves depending on the rotational direction of the diffracted light beams from the diffractive optical element 8. The tracking error signal based on the differential phase detection method may be obtained basically from the signals which are detected from diagonal light beams centering on the optical axis of the light beam quadrisected in the tangential and radial directions of the optical disk 6 as described before, and may be obtained, for example, by using Equations (7) to (12) in the present embodiment.

It is noted that the present embodiment shows only the case of using ±1st order diffracted light beams, however, the present invention is not limited to that, and the same effect can be achieved also by using ±Nth order diffracted light beams. (Here, N is 1 or an arbitrary integer more than 1.)

Second Embodiment

Figure 14:
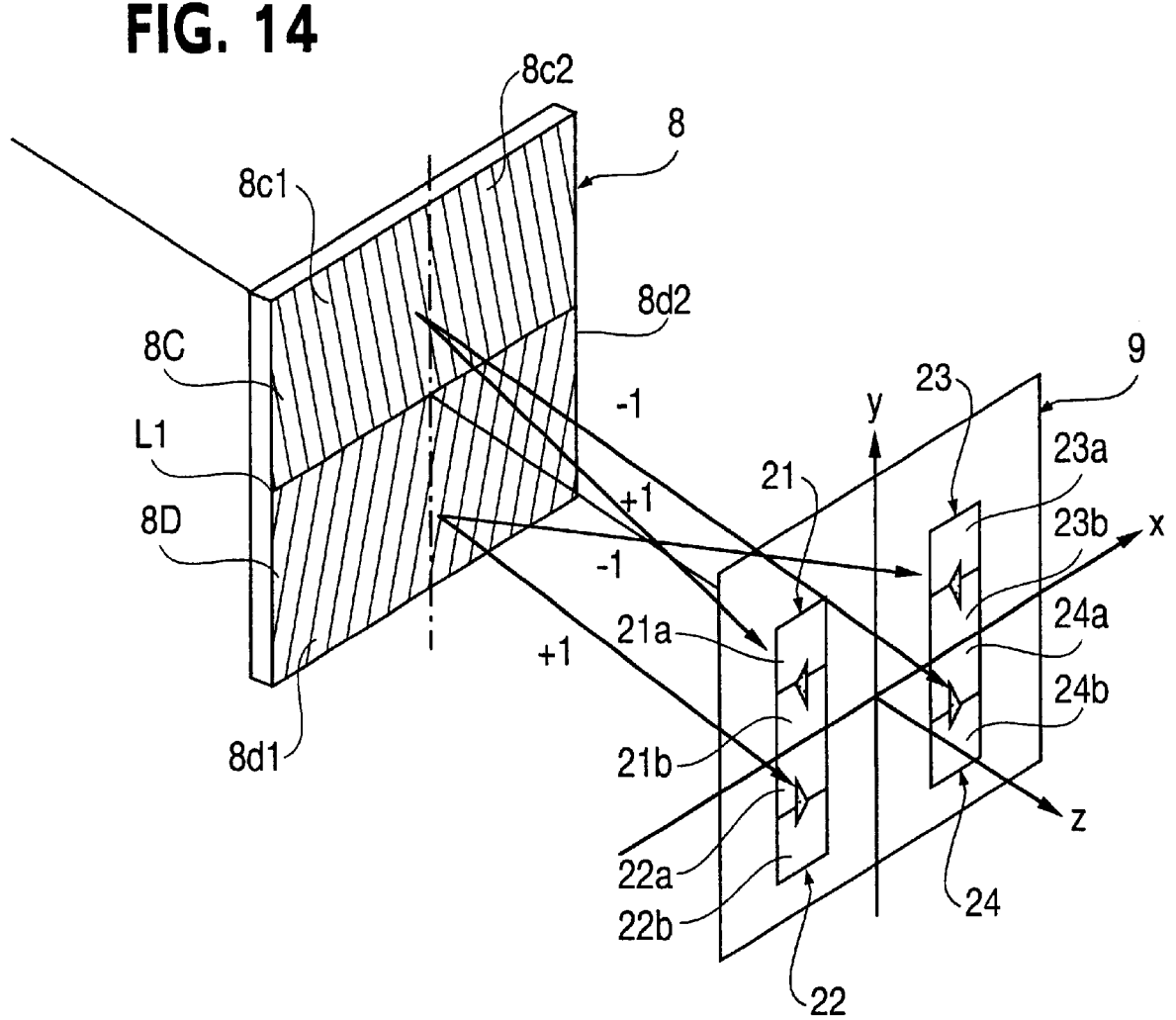
FIG. 14 is a diagram showing the relationship of the optical system between the diffractive optical element 8 and the photo-detector 9 according to the second and thirteenth embodiments of the present invention.

FIG. 14 is a diagram showing relationship of the optical system between the diffractive optical element 8 and the photo-detector 9 of a second embodiment of the present invention. Similarly to the first embodiment, the diffractive optical element 8 has two diffracting areas 8C and 8D. These diffracting areas 8C and 8D are divided by a divisional line L1, which passes through the optical axis of the condenser lens 7 and is parallel to the tracks on the optical disk 6. The diffracting areas 8C and 8D can diffract the reflected light beam from the optical disk 6 into +1st order diffracted light beams.

The photo-detector 9 has four photo-detecting planes 21, 22, 23 and 24 which are further bisected, respectively, and each bisected area 21a, 21b, 22a, 22b, 23a, 23b, 24a and 24b of the respective photo-detecting planes 21, 22, 23 and 24 is disposed so that the paired bisected areas are positioned at the point-symmetrical positions with respect to The Z-axis which is the optical axis of the reflected light beam. In other words, the photo-detector 9 is disposed so that the parting lines of the photo-detecting planes 21, 22, 23 and 24 are parallel to the X-axis and the two bisected photo-detecting planes 21 and 24 and 22 and 23 corresponding respectively to the +1st order diffracted light beams are located at the point-symmetrical positions with respect to The Z-axis.

Basically, the pattern of the diffractive optical element 8 is designed, while the condenser lens 7 is in the in-focus condition, the diffracted light beam is rotated to reach specific area such as: the +1st order diffracted light beam from an area 8c1 of the diffractive optical element 8 reaches an area 21b of the photo-detector 9, and the −1st order diffracted light beam reaches an area 24a of the photo-detector 9, respectively; the +1st order diffracted light beam from an area 8c2 of the diffractive optical element 8 reaches an area 21a of the photo-detector 9, and the −1st order diffracted light beam reaches an area 24b of the photo-detector 9, respectively; the +1st order diffracted light beam from an area 8d1 of the diffractive optical element 8 reaches area 22a of the photo-detector 9, and the −1st order diffracted light beam reaches an area 23b of the photo-detector 9, respectively ; and the +1st order diffracted light beam of an area 8d2 of the diffractive optical element 8 reaches an area 22b of the photo-detector 9, and the −1st order diffracted light beam reaches an area 23a of the photo-detector 9, respectively. Further, the pattern of the diffractive optical element 8 is designed so that a center axis, in which the intensity distributions of the light spot on the photo-detector 9 are symmetrical when the condenser lens 7 is in in-focus condition, coincides with the respective divided lines of the four photo-detecting planes 21, 22, 23 and 24.

By such an arrangement as described above, the photo-detecting plane 21 receives the +1st order diffracted light beam from the area 8C of the diffractive optical element 8, the photo-detecting plane 22 receives the +1st order diffracted light beam from the area 8D of the diffractive optical element 8, the photo-detecting plane 23 receives the −1st order diffracted light beam from the area 8D of the diffractive optical element 8, and the photo-detecting plane 24 receives the −1st order diffracted light beam from the area 8C of the diffractive optical element 8, respectively.

That is, in the first embodiment, the divided areas 10a and 10b which receive the +1st order diffracted light beams from the area 8A of the diffractive optical element 8, and the divided areas 10c and 10d which receive the +1st order diffracted light beams from the area 8B of the diffractive optical element 8, are disposed along the X-axis direction, and the divided areas 11c and 11d which receive the −1st order diffracted light beams from the area 8A of the diffractive optical element 8, and the divided areas 10a and 10b which receive the −1st order diffracted light beams from the area 8B of the diffractive optical element 8, are disposed along the X-axis direction.

The present embodiment, however, is different from the first embodiment in that the divided areas 21a and 21b which receive the +1st order diffracted light beam from the area 8C of the diffractive optical element 8, and the divided areas 22a and 22b which receive the +1st order diffracted light beam from the area 8D of the diffractive optical element 8, are disposed along the Y-axis direction, and the divided areas 23a and 23b which receive the −1st order diffracted light beam from the area 8D of the diffractive optical element 8, and the divided areas 24a and 24b which receive the −1st order diffracted light beam from the area 8E of the diffractive optical element 8, are disposed along the Y-axis direction.

Signal currents corresponding to the respective divided areas of the respective photo-detecting planes 21, 22, 23 and 24 of the photo-detector 9 are transformed into voltage signals by the current-voltage transforming amplifier array 12 as shown in FIG. 4. They are then input to the arithmetic circuit 13 after being amplified to an appropriate level. The arithmetic circuit 13 calculates the focus error signal F by calculating Equations (1a), (2a) or (3a) as explained below, similar to Equation (1), (2) or (3) of the first embodiment, thereby reducing the influence of diffraction caused by the pits or the recorded marks on the optical disk 6:

$$F=(S_{21a}+S_{22b})-(S_{21b}+S_{22a})+(S_{23b}+S_{24a})-(S_{23a}+S_{24b}) \quad (1a)$$

$$F=(S_{22a}-S_{21a})+(S_{24b}-S_{23b}) \quad (2a)$$

$$F=(S_{22b}-S_{21b})+(S_{24a}-S_{23a}) \quad (3a)$$

Here, the signals corresponding to $S_{10a}$, $S_{10b}$, $S_{10c}$, $S_{10d}$, $S_{11a}$, $S_{11b}$, $S_{11c}$ and $S_{11d}$ are replaced by signals $S_{21a}$, $S_{21b}$, $S_{22b}$, $S_{22a}$, $S_{23a}$, $S_{23b}$, $S_{24b}$ and $S_{24a}$, each corresponding to the respective divided areas 21a, 21b, 22a, 22b, 23a, 23b, 24b and 24a. That is, the arithmetic circuit 13 generates the focus error signal F by calculating the sum signals and difference signals corresponding to the bisected areas which are line-symmetrical with respect to the X-axis, and further calculating a sum signals of those two difference signals for the output signals corresponding to the first and second photo-detecting planes 21 and 22 from the photo-detector 9 and for the output signals corresponding to the second photo-detecting planes 23 and 24.

The tracking error signal T can be also calculated, similarly to the first embodiment, by any one of the following Equations (4a), (5a) and (6a), or by detecting a differential phase detection between signals T1 and T2 obtained by the following Equations (7a) and (8a), or a differential phase detection between signals T3 and T4 obtained by the following Equations (9a) and (10a), or a differential phase detection between signals T5 and T6 obtained by the following Equations (11a) and (12a):

$$T=(S_{21a}+S_{21b})-(S_{22b}+S_{22a}) \quad (4a)$$

$$T=(S_{24b}+S_{24a})-(S_{23a}+S_{23b}) \quad (5a)$$

$$T=(S_{21a}+S_{21b})-(S_{22b}+S_{22a})+(S_{24a}+S_{24b})-(S_{23a}+S_{23b}) \quad (6a)$$

$$T1=S_{21a}+S_{22b} \quad (7a)$$

$$T2=S_{21b}+S_{22a} \quad (8a)$$

$$T3=S_{23a}+S_{24b} \quad (9a)$$

$$T4=S_{23b}+S_{24a} \quad (10a)$$

$$T5=S_{21a}+S_{22b}+S_{23a}+S_{24b} \quad (11a)$$

$$T6=S_{21b}+S_{22a}+S_{23b}+S_{24a} \quad (12a)$$

It is noted that the four bisected photo-detecting planes 21, 22, 23 and 24 of the present embodiment can be disposed at any position as long as the position is symmetrical with respect to the optical axis by two each. Further, although the two photo-detecting planes 21 and 22 and the photo-detecting planes 23 and 24 as shown in FIG. 14 are located in contact with each other above and below the X-axis, they may be separated from each other.

Third Embodiment

Figure 15:
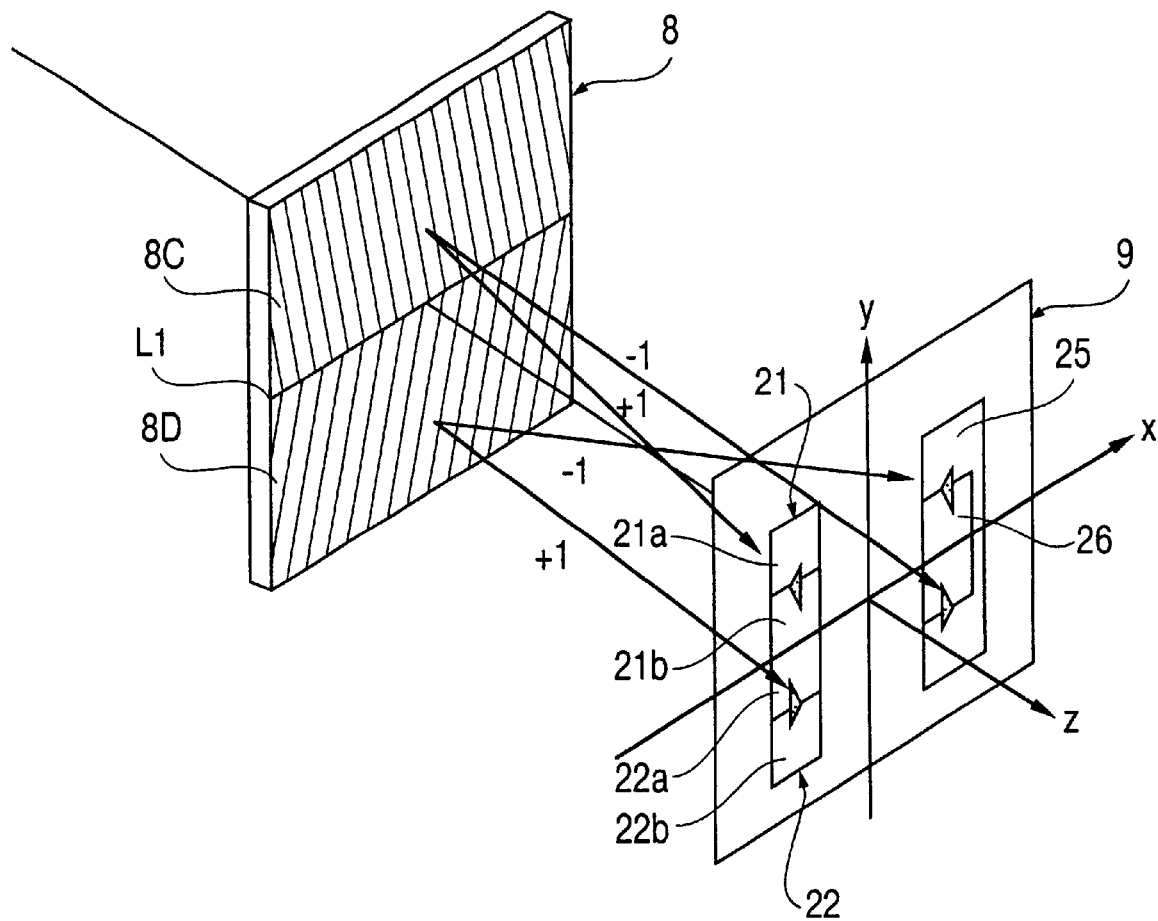
FIG. 15 is a diagram showing the relationship of the optical system between the diffractive optical element 8 and the photo-detector 9 in the third and fourteenth embodiments of the present invention.

FIG. 15 is a diagram showing the relationship of the optical system between the diffractive optical element 8 and the photo-detector 9 of a third embodiment of the present invention, in which the photo-detector 9 in the second embodiment is modified so as to perform part of the arithmetic for calculating the focus error signal F on the photo-detector 9. In this case, new photo-detecting planes 25 and 26 are created by connecting the divided areas of the respective sides of the photo-detecting planes, for example, the photo-detecting planes 23 and 24 receiving the −1st order diffracted light beam, among the photo-detecting planes of the photo-detector 9 receiving either the +1st order diffracted light beam or the −1st order diffracted light beam from the areas 8C and 8D of the diffractive optical element 8 in FIG. 14, such as the divisional areas 23a and 24b, and 23b and 24a.

A sum of the output signals ($S_{23a}+S_{24b}$) corresponding to the divisional areas 23a and 24b in FIG. 14 can be obtained as an output signal corresponding to the photo-detecting plane 25, and a sum of the output signals ($S_{23b}+S_{24a}$) corresponding to the divisional areas 23b and 24a in FIG. 14 can be obtained as an output signal corresponding to the photo-detecting plane 26. That is, because the calculation of ($S_{23b}+S_{24a}$) and ($S_{23a}+S_{24b}$) in Equation (1a) is carried out in the photo-detector 9, the calculation is simplified and the number of photo-detecting planes can be reduced.

The respective ones of the divided areas of the photo-detecting planes 21 and 22 which receive the +1st order diffracted light beam from the areas 8C and 8D of the diffractive optical element 8 in FIG. 13, such as the divided areas 21a and 22b, and 21b and 22a, can be also connected. In this case, the calculation of ($S_{23b}+S_{24a}$) and ($S_{23a}+S_{24b}$) in Equation (1a) is carried out in the photo-detector 9.

In such a case, the tracking error signal T can be obtained by using only the output signals corresponding to the photo-detecting planes of the photo-detector 9 in which no calculation is carried out, for example, output signals $S_{21a}$, $S_{21b}$, $S_{22a}$ and $S_{22b}$ corresponding to the photo-detecting planes 21 and 22, according to Equation (4a), or by detecting the phase difference between the signals T1 and T2 obtained from Equation (7a) and (8a) in FIG. 15.

Further, in the case when it is arranged so as to calculate $(S_{21a}+S_{22b})$ and $(S_{21b}+S_{22a})$ in Equation (1a) on the photo-detector 9 by combining respective ones of the divided areas 21a and 22b, and 21b and 22a of the photo-detecting planes 21 and 22 which receive the +1st order diffracted light beams from the areas 8C and 8D of the diffractive optical element 8 in FIG. 14, the tracking error signal T can be obtained by using only the output signals $S_{23a}$, $S_{23b}$, $S_{24a}$ and $S_{24b}$ corresponding to the photo-detecting planes 23 and 24, according to Equation (5a), or by detecting the phase difference between the signals T3 and T4 obtained from Equations (9a) and (10a) for example.

Fourth Embodiment

Figure 16:
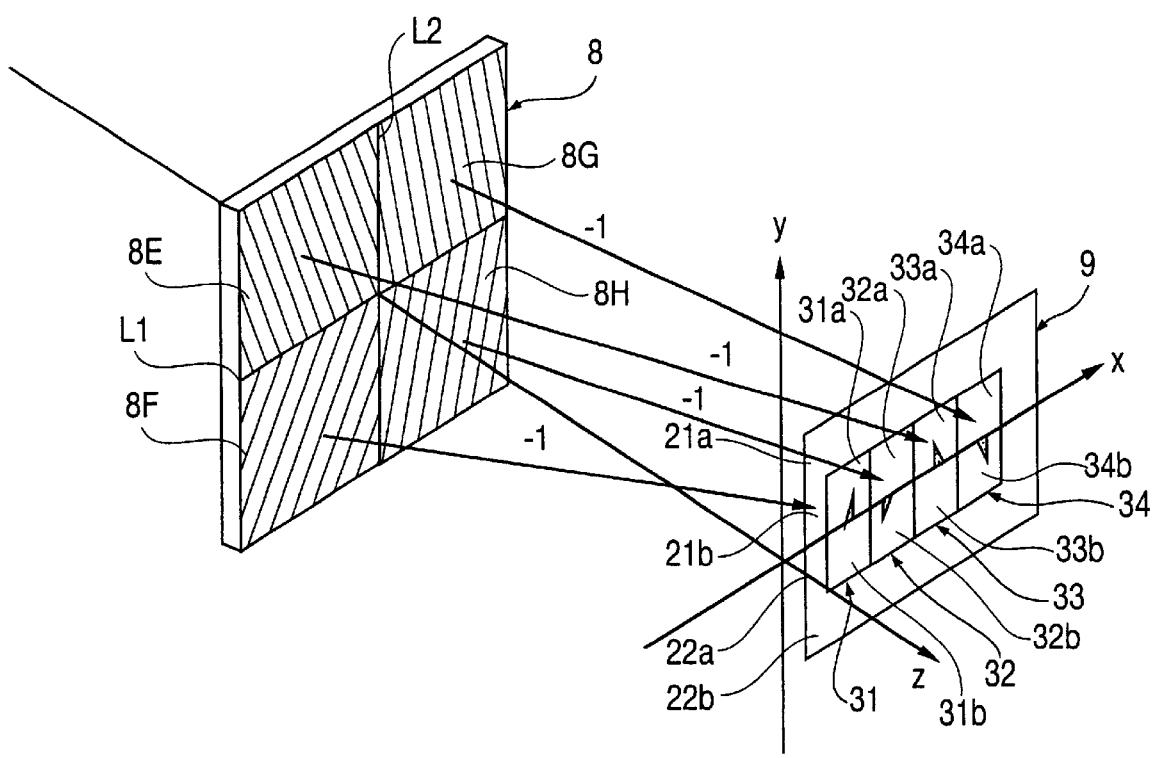
FIG. 16 is a diagram showing the relationship of the optical system between the diffractive optical element 8 and the photo-detector 9 in the fourth and fifteenth embodiments of the present invention.

FIG. 16 is a diagram showing the relationship of the optical system between the diffractive optical element 8 and the photo-detector 9 of a fourth embodiment of the present invention. The present embodiment is arranged so as to generate the focus error signal F by detecting only one of the ±1st order diffracted light beams, for example, the −1st order diffracted light beam, caused by the diffractive optical element 8. The diffractive optical element 8 having four diffracting areas 8E, 8F, 8G and 8H, and the photo-detector 9 having four bisected photo-detecting planes, are equipped in the present embodiment. Such structure is advantageous in detecting a tracking error by means of the differential phase detecting method.

To detect the tracking error signal, it is necessary to quadrisect the reflected light beam precisely. The conventional structure of detecting the focus error signal has a problem such that a small light beam on the photo-detector is quadrisected, and therefore, the center line of the intensity distribution of the light beam must be adjusted precisely with the divided line of the photo-detecting planes of the photo-detector, thereby taking much time and labor for the adjustment. In the present embodiment, on the contrary, the reflected light beam from the optical disk 6 is quadrisected by the large light beam on the diffractive optical element 8, so that the high accuracy of the adjustment is not required and the adjustment can be simplified.

In FIG. 16, the diffractive optical element 8 has the four diffracting areas 8E, 8F, 8G and 8H, divided by the area dividing line L1 which is parallel to the tracks on the optical disk 6 and an area dividing line L2 which is orthogonal thereto. The patterns of the gratings of these diffracting areas 8E, 8F, 8G and 8H have spatial frequencies required for separating and detecting the zero order diffracted light beam, the +1st order diffracted light beam and the −1st order diffracted light beam in the vicinity of the focal plane of the condenser lens 7, and are given spatial changes for forming the +1st order diffracted light beam and the −1st order diffracted light beam into the spot shape necessary for detecting the focus error in the vicinity of the focal plane of the condenser lens 7.

In this case, the pattern of the diffractive optical element 8 is designed such that the −1st order diffracted light beam from the area 8E of the diffractive optical element 8 reaches the area 33a of the photo-detector 9, the −1st order diffracted light beam from the area 8F of the diffractive optical element 8 reaches the area 31a of the photo-detector 9, the −1st order diffracted light beam from the area 8H of the diffractive optical element 8 reaches the area 33a of the photo-detector 9, and the −1st order diffracted light beam from the area 8G of the diffractive optical element 8 reaches the area 34b of the photo-detector 9, respectively, when the condenser lens 7 is in the in-focus condition. The present embodiment is designed such that the diffracted light beams from the areas of the diffractive optical element 8 adjacent along the direction parallel to the tracks on the optical disk 6 reach the divided areas positioned on the opposite side from each other about the X-axis.

The photo-detector 9 is disposed so as to detect the −1st order diffracted light beam from the diffractive optical element 8, and has four bisected photo-detecting planes 31, 32, 33 and 34, respectively. These photo-detecting planes 31, 32, 33 and 34 receive the −1st order diffracted light beams from the diffracting areas 8F, 8H, 8E and 8G of the diffractive optical element 8, respectively. When output signals of the photo-detector 9 corresponding to the respective two divided areas 31a, 31b, 32a, 32b, 33a, 33b, 34a and 34b of the photo-detecting planes 31, 32, 33 and 34 are denoted as $S_{31a}$, $S_{31b}$, $S_{32a}$, $S_{32b}$, $S_{33a}$, $S_{33b}$, $S_{34a}$ and $S_{34b}$, the arithmetic circuit 13 shown in FIG. 4 generates the focus error signal F by using following equation:

$$F=(S_{31a}+S_{32a}+S_{33b}+S_{34b})-(S_{31b}+S_{32b}+S_{33a}+S_{34a}) \tag{13}$$

That is, in the present embodiment, the arithmetic circuit 13 generates the focus error signal F by carrying out a difference signal between a sum signal $(S_{31a}+S_{32a}+S_{33b}+S_{34b})$ of signals corresponding to either ones of the divided areas 31a, 32a, 33b and 34b, and a sum signal $(S_{31b}+S_{32b}+S_{33a}+S_{34a})$ of signals corresponding to the other divided areas 31b, 32b, 33a and 34a for output signals corresponding to the first to fourth photo-detecting planes 31, 32, 33 and 34 from the photo-detector 9.

Figure 17A:
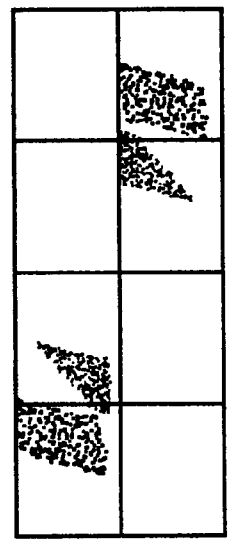
FIGS. 17A, 17B and 17C are spot diagrams showing the changes in the sectional shape of the light beam diffracted by the diffractive optical element 8 on the photo-detecting planes of the photo-detector 9, when the relative position between the objective lens 5 and the optical disk 6 is changed.
Figure 17B:
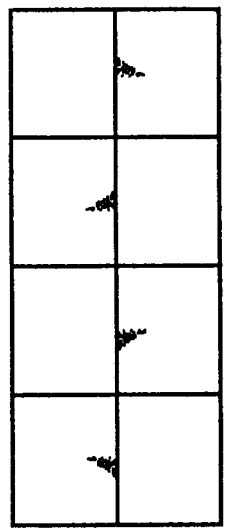
Figure 17C:
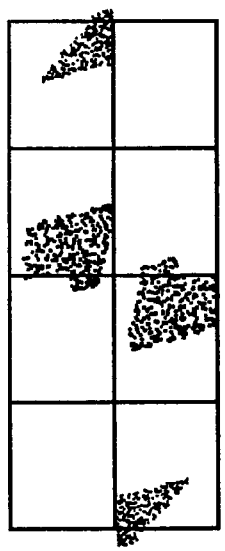

FIGS. 17A, 17B and 17C are spot diagrams showing changes in the sectional shape of the light beam diffracted by the diffractive optical element 8 on the photo-detecting planes of the photo-detector 9, when the relative position between the objective lens 5 and the optical disk 6 is changed.

FIG. 17A shows a condition where the objective lens 5 is close to the optical disk 6.

FIG. 17B shows the in-focus condition when the focal point of the objective lens 5 is located on the surface of the optical disk, and the spots of the light beam are located only on respective one areas of the bisected photo-detecting planes 31, 32, 33 and 34.

FIG. 17C shows a condition in which the objective lens 5 is apart from the optical disk 6, in contrary to the condition shown in FIG. 17A. The change of sectional shape of the light beam is also reversed of that shown in FIG. 17A.

Accordingly, the focus error signal F, which becomes zero in the in-focus condition shown in FIG. 17B and the magnitude and polarity thereof change corresponding to the amount and the direction of misalignment of the condenser lens 7 from the focal point, can be obtained by using Equation (11).

As for the tracking error signal T, the push-pull method for obtaining a tracking error signal from irregularity and the like indicative of continuous tracks such as grooves on an optical disk, and the differential phase detection method for obtaining the tracking error signal from continuous pit arrays recorded on an optical disk, are available to generate the tracking error signal T.

In the push-pull method, although the calculation on the photo-detector 9 is different depending on when the dividing line in the X-axis direction of the diffractive optical element 8 shown in FIG. 16 extends in the tangential direction or in the radial direction of the optical disk 6, the calculation can be performed for the output signals corresponding to the respective photo-detecting planes in FIG. 16 so that the light beam is bisected basically in the tangential direction of the optical disk 6.

For example, the tracking error signal T is obtained by calculating the following Equation (14), when the dividing line in the X-axis direction of the diffractive optical element 8 extends in the tangential direction of the optical disk 6:

$$T=(S_{31a}+S_{31b}+S_{32a}+S_{32b})-(S_{33a}+S_{33b}+S_{34a}+S_{34b}) \quad (14)$$

The diffractive optical element 8 is disposed so that the light beam reflected by the optical disk 6 is divided by the axes in the tangential and radial directions of the optical disk 6, the tracking error signal T by means of the differential phase detection method can be obtained by detecting a differential phase detection of signals obtained from the following two equations:

$$T7=S_{31a}+S_{31b}+S_{34a}+S_{34b} \quad (15)$$

$$T8=S_{32a}+S_{32b}+S_{33a}+S_{33b} \quad (16)$$

It is noted that only the −1st order diffracted light beam from the diffractive optical element 8 has been input to the photo-detector 9 in the present embodiment, it is possible to input only the +1st order diffracted light beam to the photo-detector 9, thereby generating the focus error signal F and the tracking error signal T by calculating in the same manner by the arithmetic circuit 13.

Fifth Embodiment

Figure 18:
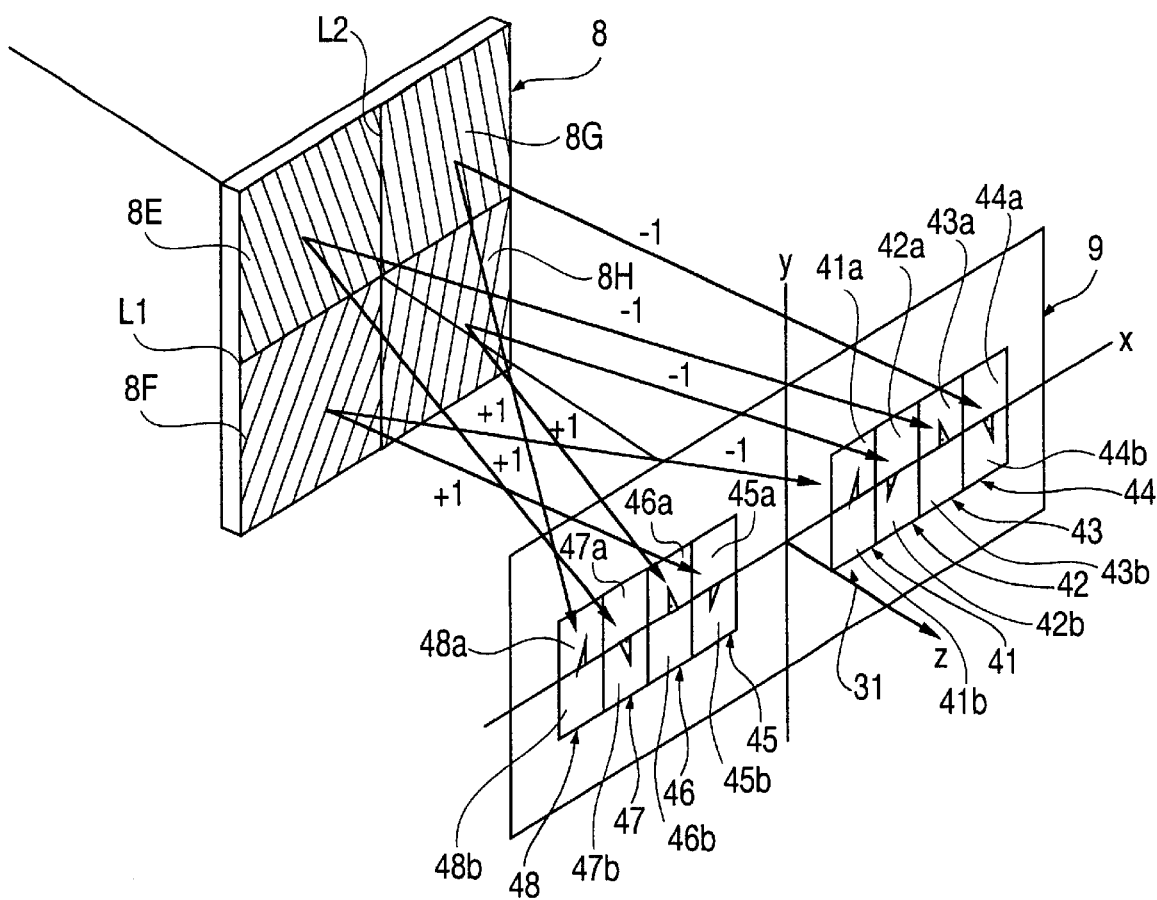
FIG. 18 is a diagram showing the relationship of the optical system between the diffractive optical element 8 and the photo-detector 9 in the fifth and sixteenth embodiments of the present invention.

FIG. 18 is a diagram showing the relationship of the optical system between the diffractive optical element 8 and the photo-detector 9 of a fifth embodiment of the present invention. Similar to the fourth embodiment shown in FIG. 16, the diffractive optical element 8 has the four diffracting areas 8E, 8F, 8G and 8H, and the patterns of the gratings thereof have spatial frequencies required for separating and detecting the zero order diffracted light beam, the +1st order diffracted light beam and the −1st order diffracted light beam in the vicinity of the focal plane of the condenser lens 7, and are given spatial changes for forming the +1st order diffracted light beam and the −1st order diffracted light beam into the spot shape necessary for detecting the focus error in the vicinity of the focal plane of the condenser lens 7.

Meanwhile, the photo-detector 9 having eight bisected photo-detecting planes 41 to 48 is disposed so that the dividing lines of these photo-detecting planes 41 to 48 coincide with the X-axis, and is disposed so that the eight photo-detecting planes 41 to 48 are positioned point-symmetrically by two each with respect to the Z-axis.

The method of detecting the focus error signal is partially similar to those of the fourth embodiment, however, detecting both the +1st order diffracted light beam and the −1st order diffracted light beam by the photo-detector 9, as explained in the first embodiment, is different from the fourth embodiment. Therefore, in the present embodiment, the influence of the diffraction caused by the pits and the recorded marks on the optical disk 6 can be reduced, because the focus error signal F is calculated from signals of the ±1st order diffracted light beams.

In this case, the pattern of the diffractive optical element 8 is designed such that the +1st order diffracted light beam and the −1st order diffracted light beam from the area 8E and the diffractive optical element 8 reach the area 47b and 43a of the photo-detector 9, the +1st order diffracted light beam and the −1st order diffracted light beam from the area 8F of the diffractive optical element 8 reach the area 45b and 41a of the photo-detector 9, the +1st order diffracted light beam and the −1st order diffracted light beam from the area 8H of the diffractive optical element 8 reach the area 46a and 42b of the photo-detector 9, and the +1st order diffracted light beam and the −1st order diffracted light beam from the area 8G of the diffractive optical element 8 reach the area 48a and 44b of the photo-detector 9, respectively, in the case when the condenser lens 7 is in in-focus condition. The present embodiment is designed such that the diffracted light beams from the areas of the diffractive optical element 8 adjacent along the direction parallel to the tracks on the optical disk 6 reach the divided areas positioned on the opposite side from each other about the X-axis.

Figure 1:
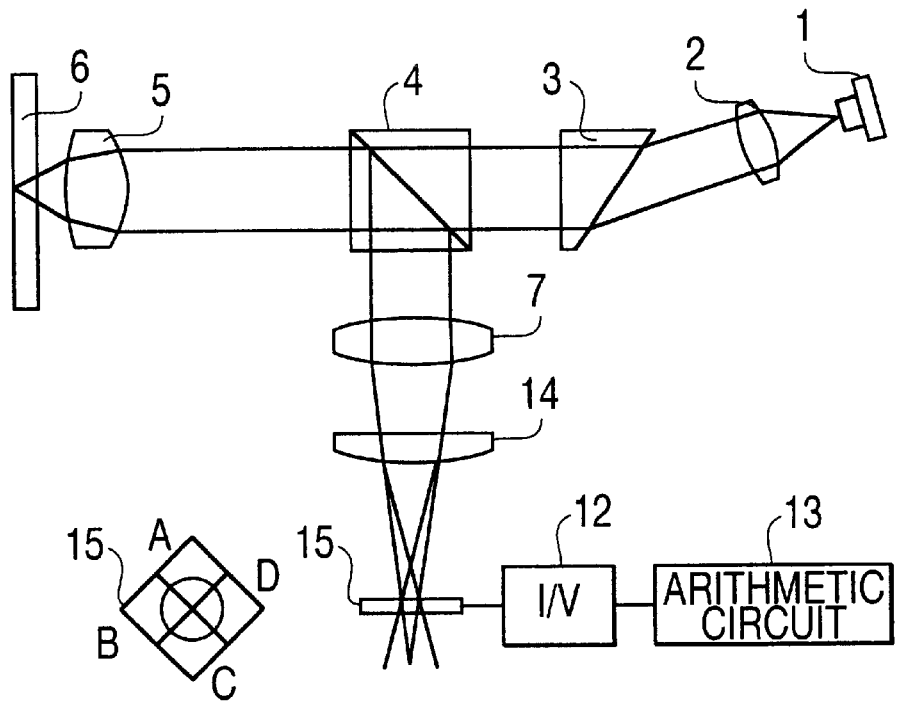
FIG. 1 is a diagram showing the system of detecting the focus error considering the astigmatic method.
Figure 2A:
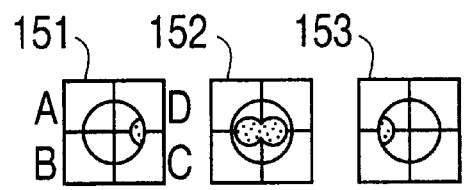
FIG. 2A is a diagram showing the intensity distribution of the light beam on the four-divide photo-detector 15.
Figure 2B:
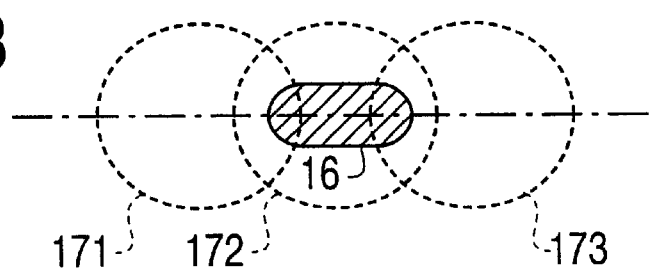
FIG. 2B is a diagram showing the movement of a light spot on the optical disk 6.
Figure 3A:
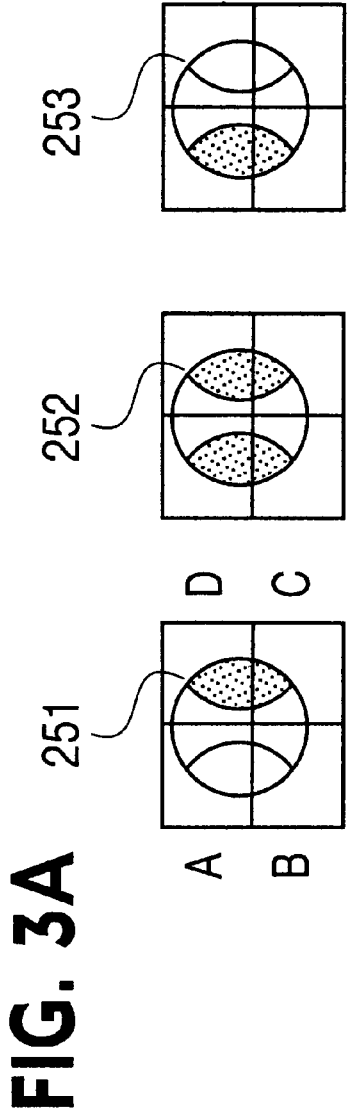
FIG. 3A is a diagram showing the intensity distribution of the light beam on the four-divide photo-detector 15.
Figure 3B:
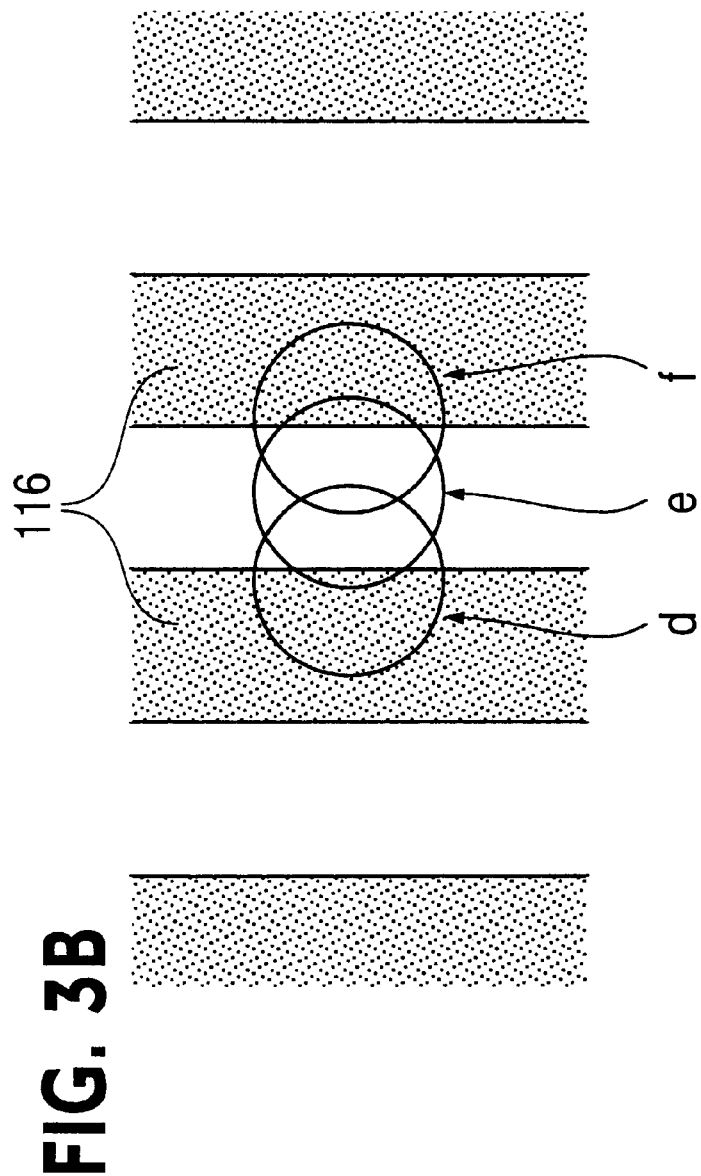
FIG. 3B is a diagram showing the movement of a light spot on the optical disk 6.

When output signals of the photo-detector 9 corresponding to the respective divided areas 41a, 41b, 42a, 42b, 43a, 43b, 44a, 44b, 45a, 45b, 46a, 46b, 47a, 47b, 48a and 48b of the photo-detecting planes 41, 42, 43, 44, 45, 46, 47 and 48 are represented as $S_{41a}$, $S_{41b}$, $S_{42a}$, $S_{42b}$, $S_{43a}$, $S_{43b}$, $S_{44a}$, $S_{44b}$, $S_{45a}$, $S_{45b}$, $S_{46a}$, $S_{46b}$, $S_{47a}$, $S_{47b}$, $S_{48a}$ and $S_{48b}$, respectively, the arithmetic circuit 13 in FIG. 3 generates the focus error signal F by using the following equation in the present embodiment:

$$F=[(S_{41a}+S_{42a}+S_{43b}+S_{44b})-(S_{41b}+S_{42b}+S_{43a}+S_{44a})]+[(S_{45a}+S_{46a}+S_{47b}+S_{48b})-(S_{45b}+S_{46b}+S_{47a}+S_{48a})] \quad (17)$$

That is, in the present embodiment, the arithmetic circuit 13 generates the focus error signal F by carrying out a difference signal between a sum signal $(S_{41a}+S_{42a}+S_{43b}+S_{44b})$ of signals corresponding to either ones of the divided areas 41a, 42a, 43b and 44b, and a sum signal $(S_{41b}+S_{42b}+S_{43a}+S_{44a})$ of signals corresponding to the other divided areas 41b, 42b, 43a and 44a for the output signals corresponding to the first to fourth photo-detecting planes 41, 42, 43 and 44 from the photo-detector 9. Furthermore, the arithmetic circuit 13 generates the focus error signal F by carrying out a difference signal between a sum signal $(S_{45a}+S_{46a}+S_{47b}+S_{48b})$ of signals corresponding to either ones of the divided areas 45a, 46a, 47b and 48b, and a sum signal $(S_{45b}+S_{46b}+S_{47a}+S_{48a})$ of signals corresponding to the other divided areas 45b, 46b, 47a and 48a for the output signals corresponding to the first to fourth photo-detecting planes 45, 46, 47 and 48 from the photo-detector 9.

Similar to the fourth embodiment, in detecting the tracking error, it is possible to use the signals corresponding only to either one of the +1st order diffracted light beam and the −1st order diffracted light beam. However, it is also possible to use the signals corresponding to all of the +1st order diffracted light beams similar to the first embodiment. At this time, the tracking error signal T obtained by means of the differential phase detection method can be derived by detecting a differential phase detection between signals T11 and T12 obtained by the following Equations (18) and (19):

$$T11=S_{41a}+S_{41b}+S_{44a}+S_{44b}+S_{45a}+S_{45b}+S_{48a}+S_{48b} \quad (18)$$

$$T12=S_{42a}+S_{42b}+S_{43a}+S_{43b}+S_{46a}+S_{46b}+S_{47a}+S_{47b} \quad (19)$$

Further, the tracking error signal T obtained by means of the push-pull method can be obtained by the following equation when the dividing line in the X-axis direction of the diffractive optical element 8 extends in the tangential direction of the optical disk 6:

$$T=(S_{41a}+S_{41b}+S_{42a}+S_{42b}+S_{45a}+S_{45b}+S_{46a}+S_{46b})-(S_{43a}+S_{43b}+S_{44a}+S_{44b}+S_{47a}+S_{47b}+S_{48a}+S_{48b}) \quad (20)$$

Sixth Embodiment

Figure 19:
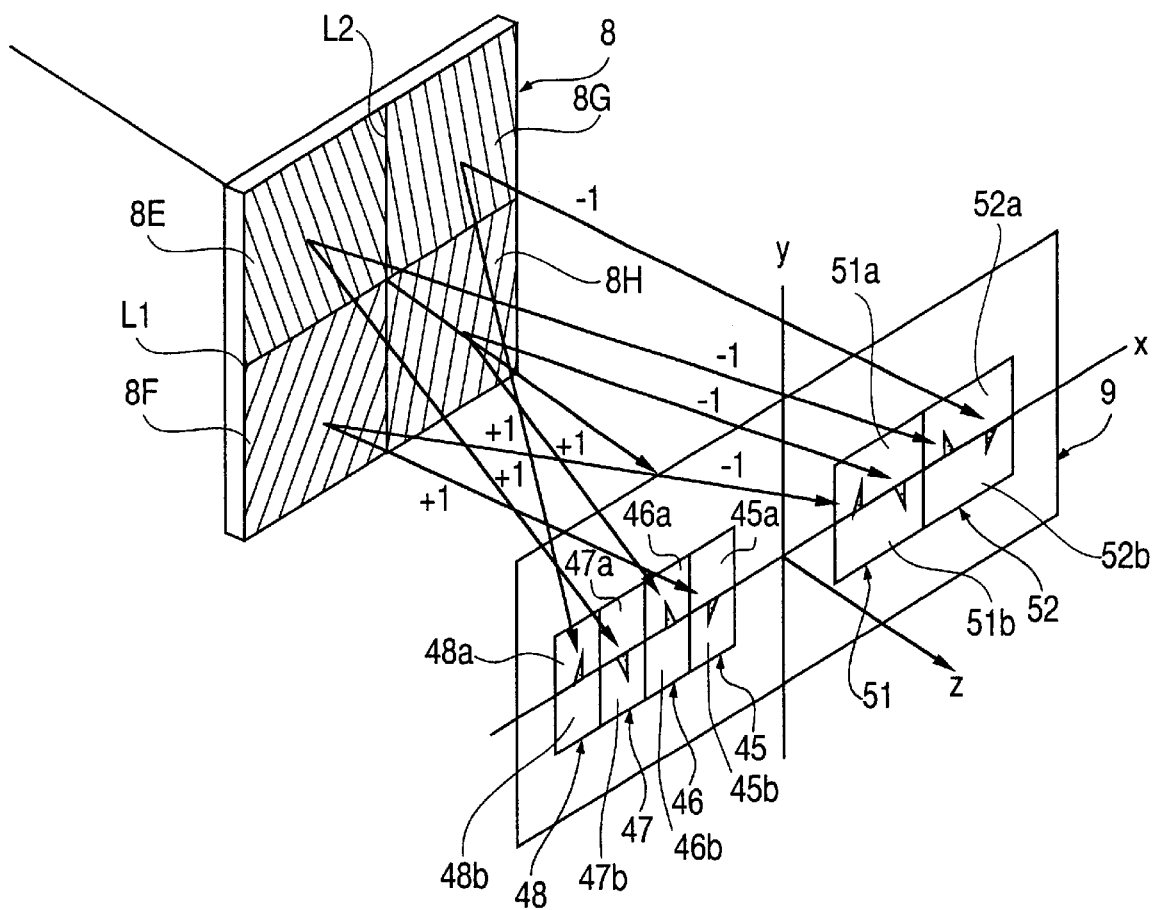
FIG. 19 is a diagram showing the relationship of the optical system between the diffractive optical element 8 and the photo-detector 9 in the sixth and seventeenth embodiments of the present invention.

FIG. 19 is a diagram showing the relationship of the optical system between the diffractive optical element 8 and the photo-detector 9 of a sixth embodiment of the present invention. It is arranged in this embodiment, by modifying the photo-detector 9 as shown in the fifth embodiment, such that a part of the arithmetic for calculating the focus error signal F is executed on the photo-detector 9. In this case, photo-detecting planes 51 and 52 are newly created by creating divided areas 51a, 51b, 52a and 52b, by combining the divided areas of the respective ones of the two adjacent photo-detecting planes 41 and 42, and 43 and 44, such as the divided areas 41a and 42a, 41b and 42b, 43a and 44a, and 43b and 44b, among the photo-detecting planes, such as the photo-detecting planes 41, 42, 43 and 44 which receive the −1st order diffracted light beam, among the photo-detecting, planes of the photo-detector 9 which receive either the +1st order diffracted light beam or the −1st order diffracted light beam from the areas 8E, 8F, 8G and 8H of the diffractive optical element 8 in FIG. 18.

Accordingly, a sum of signals ($S_{41a}+S_{42a}$) corresponding to the divided areas 41a and 42a in FIG. 18 and a sum of signals ($S_{41b}+S_{42b}$) corresponding to the divided areas 41b and 42b are obtained respectively as signals corresponding to the divided areas 51a and 51b of the photo-detecting plane 51. Further, a sum of signals ($S_{43a}+S_{44a}$) corresponding to the divided areas 43a and 44a in FIG. 18 and a sum of signals ($S_{43b}+S_{44b}$) corresponding to the divided areas 43b and 44b are obtained respectively as signals corresponding to the divided areas 52a and 52b of the photo-detecting plane 52, so that part of the calculation of Equation (17) is performed on the photo-detector 9, thereby simplifying the calculation and reducing the number of the photo-detecting planes.

Two photo-detecting planes can be newly created by combining the respective ones of the divided areas of the adjacent two photo-detecting planes 45 and 46, and 47 and 48 among the photo-detecting planes 45, 46, 47 and 48 which receive the +1st order diffracted light beam from the areas 8E, 8F, 8G and 8H of the diffractive optical element 8 in FIG. 17, such as the divided areas 45a and 46a, 45b and 46b, 47a and 48a, and 47b and 48b. The part of the calculation of Equation (17) is also carried out on the photo-detector 9.

In such a case, the tracking error signal T can be obtained by using only the output signals corresponding to the photo-detecting planes of the photo-detector 9 in which no calculation is carried out, such as output signals $S_{45a}$, $S_{45b}$, $S_{46a}$, $S_{46b}$, $S_{47a}$, $S_{47b}$, $S_{48a}$ and $S_{48b}$ of the photo-detector 9 corresponding to the divided areas 45a, 45b, 46a, 46b, 47a, 47b, 48a and 48b of the photo-detecting planes 45, 46, 47 and 48 in the example of FIG. 19, by detecting the phase difference between the signals T11 and T12 obtained by Equations (18) and (19), or by calculating Equation (20) for example.

Seventh Embodiment

Figure 20:
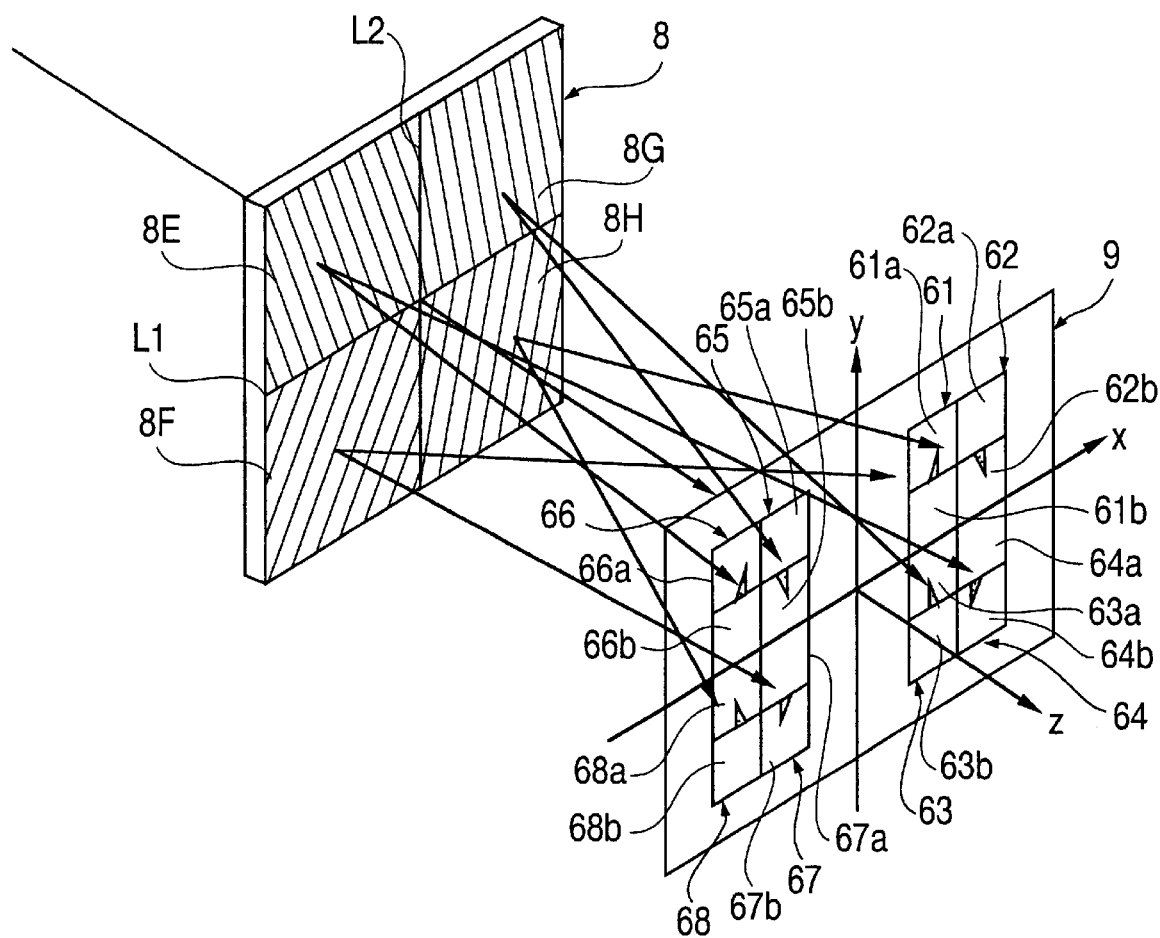
FIG. 20 is a diagram showing the relationship of the optical system between the diffractive optical element 8 and the photo-detector 9 in the seventh and eighteenth embodiments of the present invention.

FIG. 20 is a diagram showing the relationship of the optical system between the diffractive optical element 8 and the photo-detector 9 of a seventh embodiment of the present invention. The diffractive optical element 8 has the same structure as those in the fourth to sixth embodiments shown in FIGS. 16 to 19, and has the four diffracting areas 8E, 8F, 8G and 8H. The patterns of the gratings thereof have the spatial frequencies necessary for separating and detecting the zero order diffracted light beam, the +1st order diffracted light beam and the −1st order diffracted light beam in the vicinity of the focal plane of the condenser lens 7, and are given the spatial changes for forming the +1st order diffracted light beam and the −1st order diffracted light beam into the spot shape necessary for detecting the focus error in the vicinity of the focal plane of the condenser lens 7.

Meanwhile, the photo-detector 9 for detecting the diffracted light beam from the diffractive optical element 8 has eight bisected photo-detecting planes 61, 62, 63, 64, 65, 66, 67 and 68, however, different from the fifth embodiment, respective dividing lines of these photo-detecting planes 61, 62, 63, 64, 65, 66, 67 and 68 are not extended in the X-axis and are disposed at the point-symmetrical positions with respect to the Z-axis by a pair of two each. It is noted that each photo-detecting plane is disposed so that the dividing line thereof is parallel with the X-axis.

The focus error detecting method of the present embodiment is basically the same as that of the fifth embodiment, and because the focus error signal F is also carried out by calculating from the signals caused by the +1st order diffracted light beams in this case, the influence of diffraction of the pits and the recorded marks on the optical disk 6 can be reduced.

In the present embodiment, when the output signals of the photo-detector 9 corresponding to the respective divided areas 61a, 61b, 62a, 62b, 63a, 63b, 64a, 64b, 65a, 65b, 66a, 66b, 67a, 67b, 68a and 68b of the photo-detecting planes 61, 62, 63, 64, 65, 66, 67 and 68 are represented to $S_{61a}$, $S_{61b}$, $S_{62a}$, $S_{62b}$, $S_{63a}$, $S_{63b}$, $S_{64a}$, $S_{64b}$, $S_{65a}$, $S_{65b}$, $S_{66a}$, $S_{66b}$, $S_{67a}$, $S_{67b}$, $S_{68a}$ and $S_{68b}$, respectively, the arithmetic circuit 13 in FIG. 4 generates the focus error signal F by using the following equation:

$$F=[(S_{61a}+S_{62a})-(S_{65b}+S_{66b})]+[(S_{63b}+S_{64b})-(S_{67a}+S_{68a})][(S_{61b}+S_{62b})-(S_{65a}+S_{66a})][(S_{63a}+S_{64a})-(S_{67b}+S_{68b})] \quad (21)$$

The tracking error can be detected in the same manner as those of the fifth embodiment. That is, although it is possible to use the signal corresponding only to either one of the +1st order diffracted light beam and the −1st order diffracted light beam similarly to the fourth embodiment in detecting the tracking error, it is also possible to use the signals corresponding to all of the ±1st order diffracted light beams similarly to the first embodiment. The tracking error signal T obtained by means of the differential phase detection method at this time can be obtained by detecting a differential phase detection between signals T21 and T22 obtained by the following Equations (22) and (23):

$$T21=S_{61a}+S_{61b}+S_{63a}+S_{63b}+S_{65a}+S_{65b}+S_{67a}+S_{67b} \quad (22)$$

$$T22=S_{62a}+S_{62b}+S_{64a}+S_{64b}+S_{66a}+S_{66b}+S_{68a}+S_{68b} \quad (23)$$

The present embodiment is suitable particularly in detecting the tracking error by means of the differential phase detection method.

The tracking error signal T by means of the push-pull method can be obtained by calculating the following equation, in the case when the dividing line in the X-axis direction of the diffractive optical element 8 extends in the tangential direction of the optical disk 6.

$$T=(S_{61a}+S_{61b}+S_{62a}+S_{62b}+S_{67a}+S_{67b}+S_{68a}+S_{68b})(S_{63a}+S_{63b}+S_{64a}+S_{64b}+S_{65a}+S_{65b}+S_{66a}+S_{66b}) \quad (24)$$

Eighth Embodiment

Figure 21:
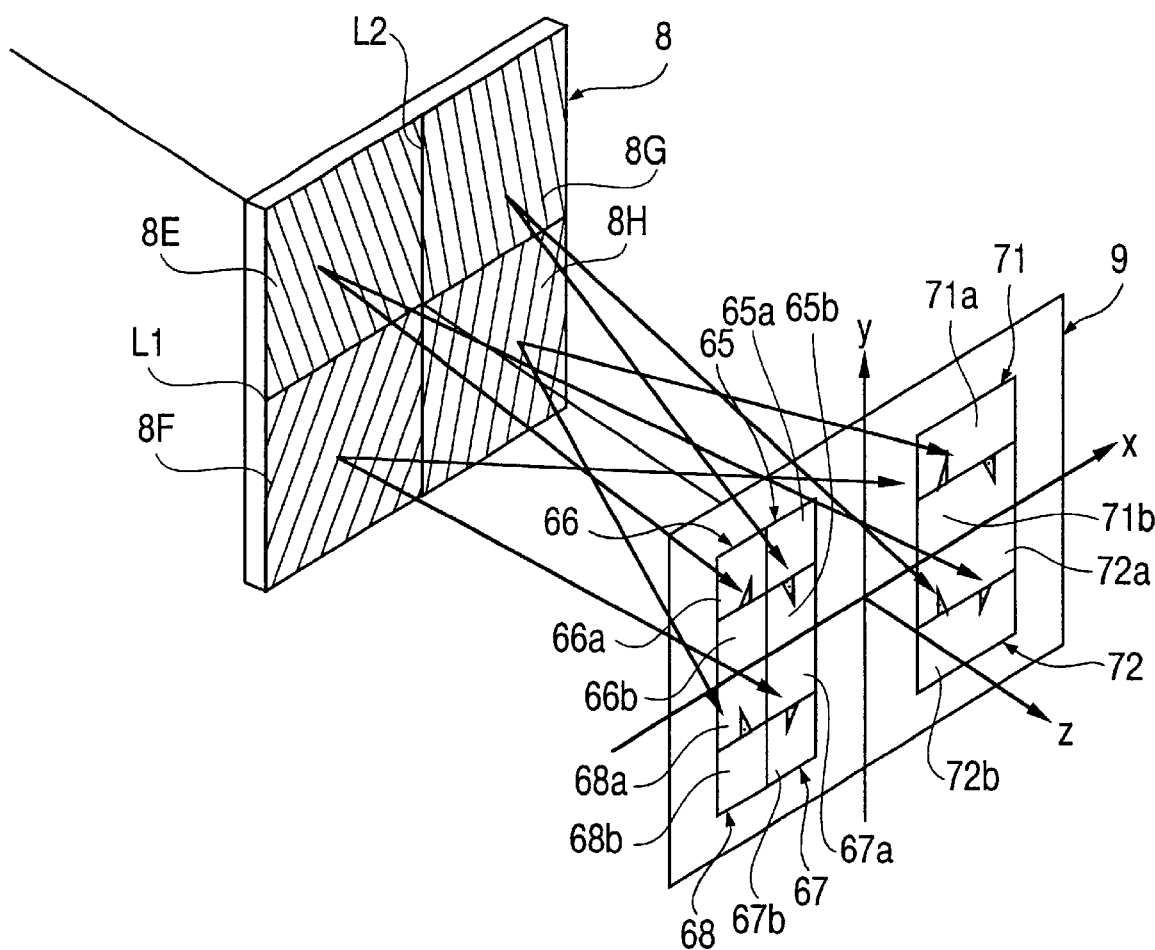
FIG. 21 is a diagram showing the relationship of the optical system between the diffractive optical element 8 and the photo-detector 9 in the eighth and nineteenth embodiments of the present invention.

FIG. 21 is a diagram showing the relationship of the optical system between the diffractive optical element 8 and the photo-detector 9 of an eighth embodiment of the present invention. It is arranged in this embodiment, by modifying the photo-detector 9 as shown in the seventh embodiment, such that a part of the arithmetic for calculating the focus error signal F is executed in the photo-detector 9. In this case, photo-detecting planes 71 and 72 are newly created by creating divided areas 71a, 71b, 72a and 72b, by combining the divided areas of the respective ones of the two adjacent photo-detecting planes 61 and 62, and 63 and 64, such as the divided areas 61a and 62a, 61b and 62b, 63a and 64a, and 63b and 64b, among the photo-detecting planes, such as the photo-detecting planes 61, 62, 63 and 64 which receive the −1st order diffracted light beam, receiving either one of the +1st order diffracted light beam and the −1st order diffracted light beam from the areas 8E, 8F, 8G and 8H of the diffractive optical element 8 in FIG. 20.

Accordingly, a sum of signals ($S_{61a}+S_{62a}$) corresponding to the divided areas 61a and 62a in FIG. 20 and a sum of signals ($S_{61b}+S_{62b}$) corresponding to the divided areas 61b and 62b are obtained respectively as signals corresponding to the divided areas 71a and 71b of the photo-detecting plane 71. Further, a sum of signals ($S_{63a}+S_{64a}$) corresponding to the divided areas 63a and 64a in FIG. 20 and a sum of signals ($S_{63b}+S_{64b}$) corresponding to the divided areas 63b and 64b are obtained respectively as signals corresponding to the divided areas 72a and 72b of the photo-detecting plane 72, so that part of the calculation of Equation (21) is performed on the photo-detector 9, thereby simplifying the calculation and reducing the number of the photo-detecting planes.

Two photo-detecting planes can be newly created by combining the respective ones of the divided areas of the adjacent two photo-detecting planes 65 and 66, and 67 and 68 among the photo-detecting planes 65, 66, 67 and 68 which receive the +1st order diffracted light beam from the areas 8E, 8F, 8G and 8H of the diffractive optical element 8 in FIG. 20, such as the divided areas 65a and 66a, 65b and 66b, 67a and 68a, and 67b and 68b. The part of the calculation of Equation (21) is also carried out in the photo-detector 9.

In such a case, the tracking error signal T can be obtained by using only the output signals corresponding to the photo-detecting planes of the photo-detector 9 in which no calculation is carried out, such as output signals $S_{65a}$, $S_{65b}$, $S_{66a}$, $S_{66b}$, $S_{67a}$, $S_{67b}$, $S_{68a}$ and $S_{68b}$ of the photo-detector 9 corresponding to the divided areas 65a, 65b, 66a, 66b, 67a, 67b, 68a and 68b of the photo-detecting planes 65, 66, 67 and 68 in the example of FIG. 21, by detecting the phase difference between the signals T21 and T22 obtained by Equations (22) and (23), or by calculating Equation (24) for example.

Ninth Embodiment

Figure 22:
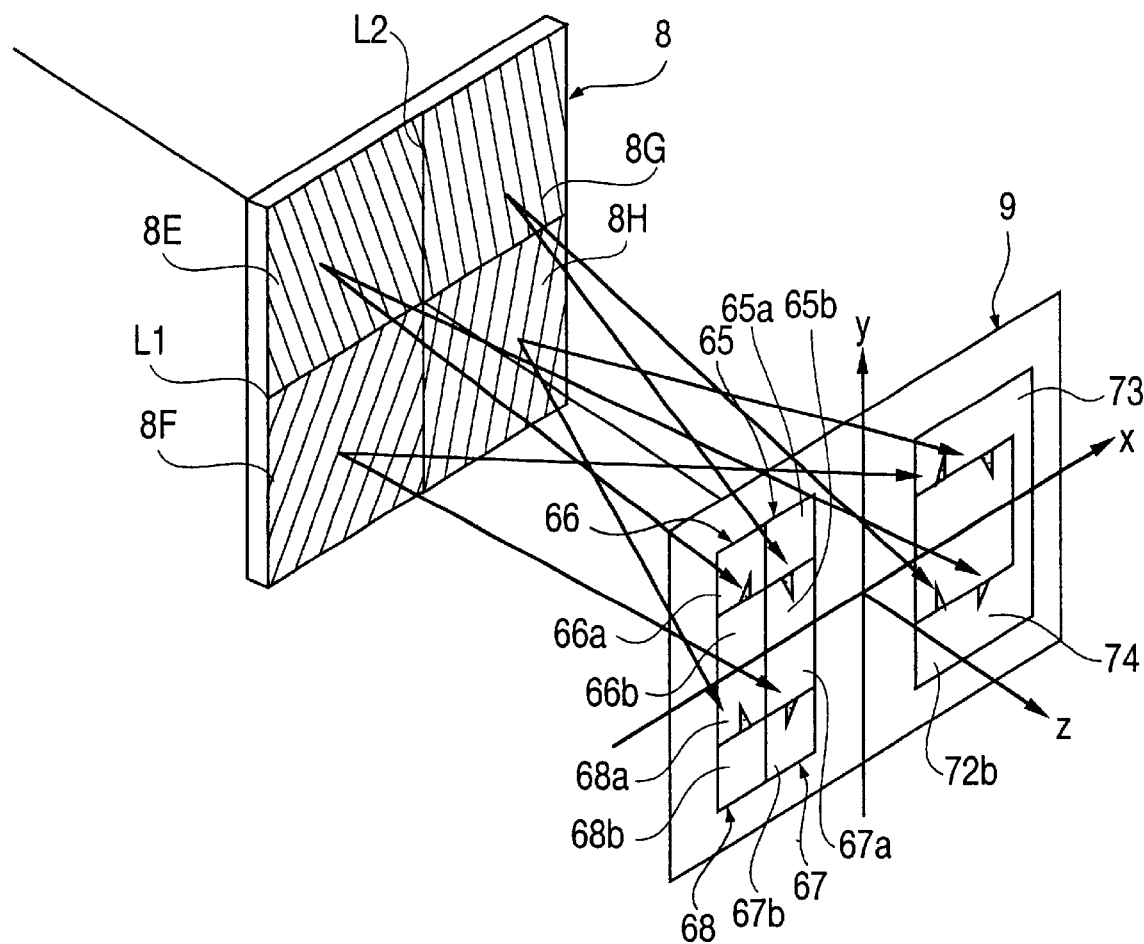
FIG. 22 is a diagram showing the relationship of the optical system between the diffractive optical element 8 and the photo-detector 9 in the ninth and twentieth embodiments of the present invention.

FIG. 22 is a diagram showing the relationship of the optical system between the diffractive optical element 8 and the photo-detector 9 of a ninth embodiment of the present invention. It is arranged in this embodiment, by modifying the photo-detector 9 as shown in the eighth embodiment, such that a part of the arithmetic for calculating the focus error signal F is executed in the photo-detector 9. In this case, photo-detecting planes 73 and 74 are newly created by combining the respective ones of the divided areas of the photo-detecting planes 71 and 72 in FIG. 21, such as the divided areas 71a and 72b, and 71b and 72a, respectively.

Accordingly, a sum of signals ($S_{61a}+S_{62a}+S_{63b}+S_{64b}$) corresponding to the divided areas 61a, 62a, 63a and 64a in FIG. 20 are obtained respectively as signals corresponding to the photo-detecting plane 73. Further, a sum of signals ($S_{61b}+S_{62b}+S_{63a}+S_{64a}$) corresponding to the divided areas 61b, 62b, 63a and 64a in FIG. 20 are obtained respectively as signals corresponding to the photo-detecting plane 74, so that part of the calculation of Equation (21) is performed in the photo-detector 9, thereby simplifying the calculation and reducing the number of the photo-detecting planes.

The tracking error signal T can be obtained, as well as those of the eighth embodiment, by using only the output signals corresponding to the photo-detecting planes of the photo-detector 9 in which no calculation is carried out, such as output signals $S_{65a}$, $S_{65b}$, $S_{66a}$, $S_{66b}$, $S_{67a}$, $S_{67b}$, $S_{68a}$ and $S_{68b}$ of the photo-detector 9 corresponding to the divided areas 65a, 65b, 66a, 66b, 67a, 67b, 68a and 68b of the photo-detecting planes 65, 66, 67 and 68 in the example of FIG. 22, by detecting the phase difference between the signals T21 and T22 obtained by Equations (22) and (23), or by calculating Equation (24), for example.

Tenth Embodiment

Figure 23:
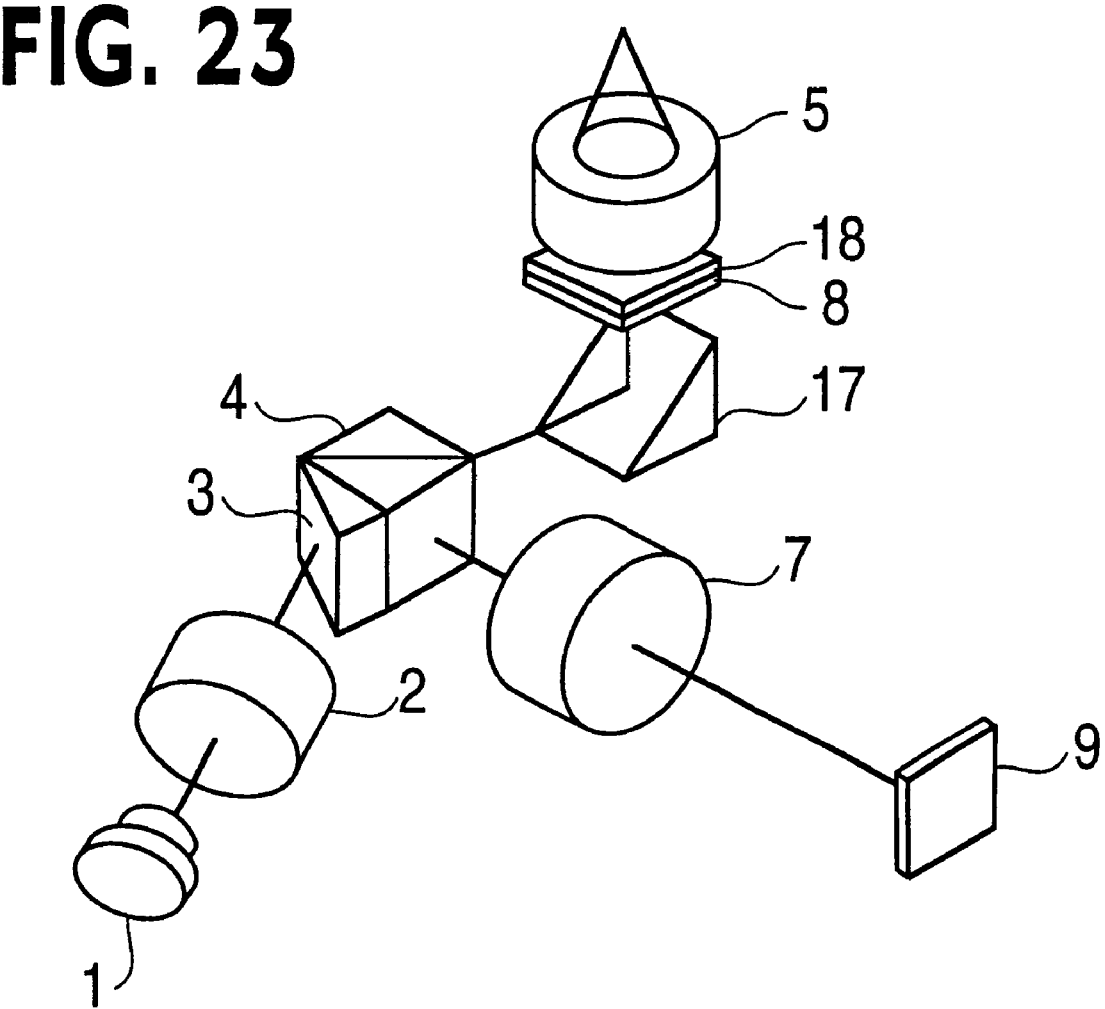
FIG. 23 is a schematic perspective view showing a structure of an optical system of the optical head apparatus in the tenth and twenty-first embodiments of the present invention.

FIG. 23 is a schematic perspective view showing a structure of an optical system of the optical head apparatus of a tenth embodiment of the present invention. The optical head apparatus includes the light source 1, the collimator lens 2, the beam shaping prism 3, the beam splitter 4, the objective lens 5, the diffractive optical element 8 and the photo-detector 9, a mirror 17 and a wavelength plate 18. It further includes the amplifier array (not shown) having a function of current-voltage transformation and the arithmetic circuit (not shown) similar to those shown in FIG. 4. The position where the diffractive optical element 8 is inserted is different from those shown in FIG. 4.

Light beam irradiated from the light source 1 is transformed into parallel optical flux by the collimator lens 2. The light beam output from the collimator lens 2 is shaped by the beam shaping prism 3, and is then input to the beam splitter 4. The light beam that has passed through the beam splitter 4 is changed its direction by reflection of the mirror 17. The light beam further passes through the diffractive optical element 8, and is focused and condensed onto the optical disk (not shown) as a minute spot by the objective lens 5 via the wavelength plate 18.

The reflected light beam from the optical disk then passes through the objective lens 5, and is diffracted by the diffractive optical element 8. This diffracted light beam is condensed on the photo-detector 9 by the condenser lens 7 via the mirror 17 and the beam splitter 4.

Differing from the optical system as shown in FIG. 4, the beam splitter 4 and the condenser lens 7 are disposed between the diffractive optical element 8 and the photo-detector 9 in the optical path of the optical system of the present embodiment. In this case, the same effect with the embodiments described above can be obtained by designing the pattern of the grating of the diffractive optical element 8 taking the beam splitter 4 and the condenser lens 7 into consideration, so that the condition of the light beam on the diffractive optical element 8 and the photo-detector 9 is realized similarly to the first to ninth embodiments. Although only the beam splitter 4 and the condenser lens 7 are disposed between the diffractive optical element 8 and the photo-detector 9 in the optical path, another optical element can be disposed to add another function, by designing the pattern of the diffractive optical element 8 taking the characteristics of such optical element into consideration.

When assuming a mechanical system which drives the objective lens for moving the light beam on the optical disk by using tracking control, there is a case when an offset on the tracking error signal is hardly generated, particularly it is obtained by the push-pull method, when the diffractive optical element 8 and wavelength plate 18 are moved together with the objective lens 5. That is, in an optical system, when the diffractive optical element 8 is fixed, moving the objective lens 5 for the tracking control causes the light beam to move on the photo-detector 9. Therefore, the offset occurs in the tracking error signal, particularly by means of push-pull, and the objective lens 5 cannot be moved so much for the tracking control.

In contrary to that, the light beam is hardly moved on the photo-detector 8 when the diffractive optical element 8 and the wavelength plate 18 are moved together with the objective lens 5. Further, the reflected light beam from the optical disk is bisected in the tangential direction on the diffractive optical element 8 and all of the bisected light beams are independently detected. Therefore, there is little inconvenience in detecting the light beam even though the light beam moves more or less. Accordingly, an accurate push-pull signal can be obtained even though the objective lens 5 moves largely in the tracking direction.

Here, the mechanical system for driving the objective lens 5 can be an electromagnetic driving system composed of a magnet and a coil, or any system basically as long as it can drive the diffractive optical element 8 and the wavelength plate 18 simultaneously in parallel with the radial direction of the optical disk 6.

The utilization efficiency of the light of the light source 1 can be enhanced when a polarized type is selected as the diffractive optical element 8, because the light beam irradiated initially from the light source 1 is not diffracted by the diffractive optical element 8 and only the reflected light beam from the optical disk is diffracted, by the function of the wavelength plate 18. The similar effect can be expected by using any type of diffractive optical element in detecting the focus error or the tracking error.

In the present embodiment, the beam splitter 4 is used to separate an outward optical path, from the light source 1 to the optical disk 6, and an inward optical path, from the optical disk 6 to the photo-detector 9. The reason for this is that the light source 1 and the photo-detector 9 are restrained in their location due to the designing in the downsized optical head apparatus. The sectional shape of the light beam being guided to the optical disk 6 becomes elliptic, in the case where the light source 1 and the photo-detector 9 cannot be disposed optically at 45 degrees to the reflecting surface of the beam splitter 4, in other words, when the light source 1 and the photo-detector 9 cannot be disposed optically at right angles to the beam splitter 4. The inward light path as shown in FIG. 22 is designed to have a certain inclination, in the present embodiment therefore, the beam shaping prism 3 is required to modify the sectional shape of the light beam from ellipse to circle. The beam shaping prism 3 may be disposed in one of the inward or outward light paths of the beam splitter 3.

Although the ±1st order diffracted light beams of the diffractive optical element 8 have been utilized to explain the embodiments described above, the present invention is not limited only to that, and the focus error can be detected by using ±Nth order diffracted light beams.

Eleventh Embodiment

Figure 24:
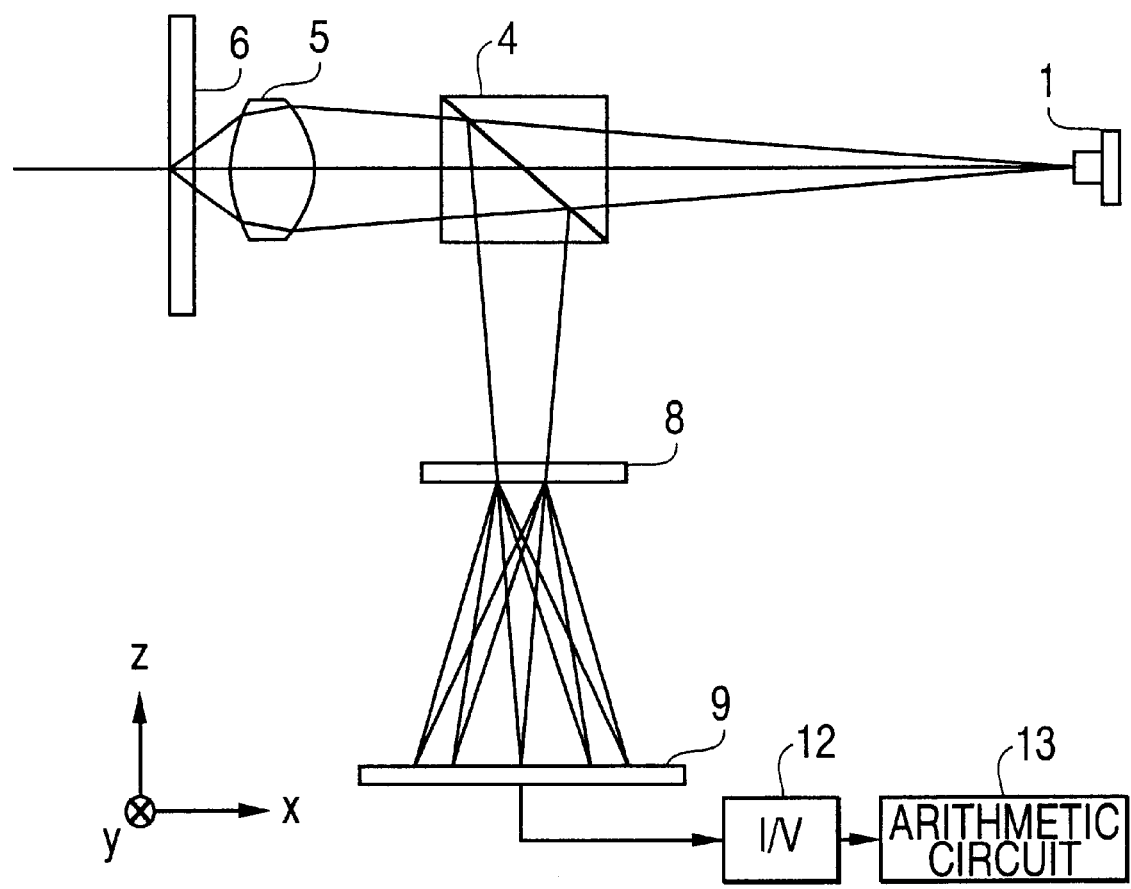
FIG. 24 is a diagram showing the main part of an optical head apparatus according to the eleventh and twenty-second embodiments of the present invention

FIG. 24 is a diagram showing a main part of an optical head apparatus according to an eleventh embodiment of the present invention. The structure thereof is the same as those in the embodiments described above except a finite system lens is used as the objective lens 5. In this case, the collimator lens 2, the beam shaping prism 3 and the condenser lens 7 of FIG. 4 are not required.

Figure 25:
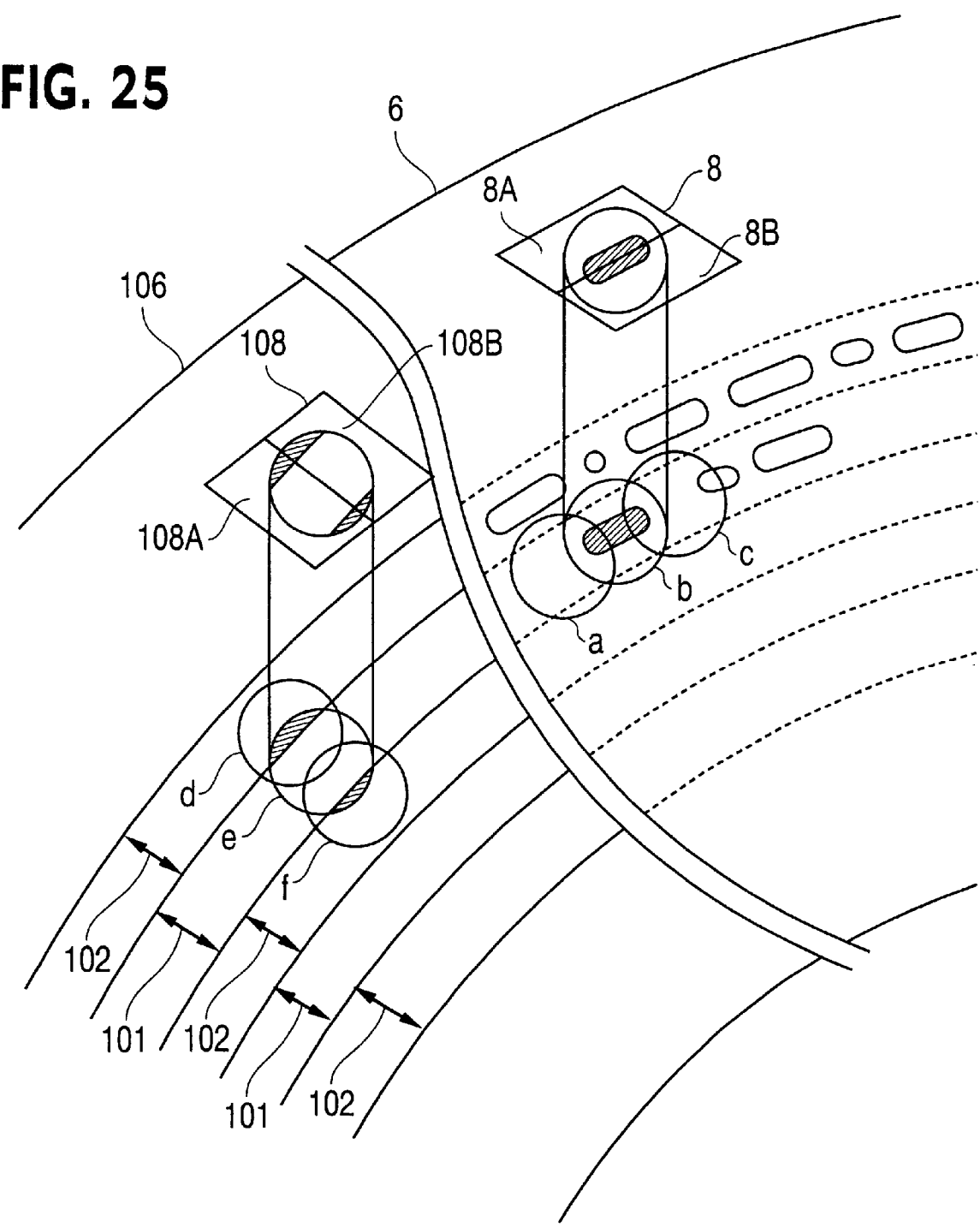
FIG. 25 is a diagram showing the two kinds of optical disks, one having pits or recorded marks on the recording surface thereof, and the other having lands and grooves on the recording surface thereof.

As partially illustrated in FIG. 25, the above-mentioned first to eleventh embodiments explain the optical head apparatus which realizes a stable focus control without involving any influence of the noise caused by diffraction from the pits and the recorded marks on the recording surface of the optical disk 6, by utilizing the diffractive optical element 8 having the diffracting areas 8A and 8B bisected by the dividing line extended in the direction parallel to the track direction. That is, these embodiments are suitable for applying to an optical recording medium in which the pits and the recorded marks are arranged continuously on the recording surface, such as a DVD-ROM.

In contrary to that, there is another way of realizing stable focus control without involving the influence of noise caused by diffraction from the grooves on the recording surface of the optical recording medium, by utilizing a diffractive optical element 108 having the diffracting areas 108A and 108B bisected by a dividing line extended in the direction orthogonal to the track direction. This is suitable for the case in which lands 101 and grooves 102 are arranged on the entire optical disk 106, such as a DVD-RAM as partially illustrated in FIG. 25, and the spot beam travels between the lands 101 and the grooves 102. Concerning the influence of the reflected light beam in the focus control, when using the optical disk 106 is greater than when using the optical disk 6. Therefore, the diffractive optical element 108 is equipped with two diffracting areas 108A and 108B bisected by a dividing line extended in the direction orthogonal to the track direction, in which the influence from the grooves is involved. The optical head apparatus having the diffractive optical element 108, suitable for the optical disk 106, is explained in the following twelfth to twenty-second embodiments.

Twelfth Embodiment

A twelfth embodiment is related to the case of using the diffractive optical element 108, having two diffracted areas 108A and 108B bisected by the dividing line extends in the direction orthogonal to the track direction. The other structures of the optical head apparatus of the present embodiment are basically the same as those shown in FIG. 4, so that the present embodiment is explained by referring to FIG. 4. In the following embodiments, the diffractive optical element 108 is explained as a reference number 8, and the diffracted areas 108A and 108B are explained as reference numbers 8A and 8B, respectively.

FIGS. 5A and 5B are diagrams showing an exemplary structure of the diffractive optical element 8. As shown in FIGS. 5A and 5B, the diffractive optical element 8 has two diffracting areas 8A and 8B constituted of groups of curves. Specifically, the diffracting area 8A is constituted of bobbin-shape-curved diffraction gratings and the diffracting area 8B is constituted of barrel-shape-curved diffraction gratings. These diffracting areas 8A and 8B are separated from each other by a straight line L1, which intersects the beam axis of the reflected light beam (corresponds to Z-axis in FIG. 4A) and is orthogonal to tracks on the optical disk 6 (corresponds to Y-axis in FIG. 4A). The diffracting areas 8A and 8B diffract the reflected light beam from the optical disk 6 into zero order, +1st order and −1st order diffracted light beams, respectively. The pitch of the diffraction gratings of the diffracting areas 8A and 8B has a spatial frequency necessary for separately detecting the zero order diffracted light beam, the +1st order diffracted light beam and the −1st order diffracted light beam in the vicinity of the focal plane of the condenser lens 7, and are given a spatial change for deforming the +1st order diffracted light beam and the −1st order diffracted light beam into a spot shape necessary for implementing the focus error detection in the vicinity of the focal plane of the condenser lens 7.

The pattern shape of the diffraction grating of the diffractive optical element 8 shown in FIG. 5A is one example designed so that a distance between the zero order diffracted light beam and the ±1st order diffracted light beams from the diffracting area 8A of the diffractive optical element 8 corresponds to 0.6 mm, and a distance between the zero order diffracted light beam and the ±1st order diffracted light beams from the diffracting area 8B of the diffractive optical element 8 corresponds to 0.4 mm, when a distance between the diffractive optical element 8 and the photo-detector 9 is 20 mm and a diameter of the beam on the diffractive optical element 8 is 2 mm. Further, in order to allocate the 1st order diffracted light beam equally as positive and negative, it is desirable to form the cross sections of the diffracting areas 8A and 8B so that their profile turns has a stepped phase grating in which the ratio of the width of the grating D2 to the pitch of the grating D1 is ½ as shown in FIG. 5B. The photo-detector 9 is disposed so as to detect the diffracted light beam from the diffractive optical element 8.

The photo-detector 9 is disposed in the focus position of the condenser lens 7. The photo-detector 9 is disposed in the focus position so that the optical energy of the light beam are not involved in the diffractive optical element 8, except the change of aberration components. Therefore, the error detecting optical system thereof can reduce the influence of the wavelength fluctuation of the light beam, thereby realizing stable detection of the error signals.

FIGS. 6 and 7 are diagrams showing an exemplary structure of the photo-detector 9. The photo-detector 9 has first and second photo-detecting planes 10 and 11 and each of them is quadrisected. The first photo-detecting plane 10 is divided into four divisional areas 10a to 10d by a first dividing line in the same direction as an image of the area dividing line L1 of the diffractive optical element 8, and a second dividing line is orthogonal to the first dividing line. Similarly, the second photo-detecting plane 11 is divided into four divisional areas 11a to 11d by the first dividing line in the same direction with the image of the area dividing line L1 of the diffractive optical element 8, and the second dividing line is orthogonal to the first dividing line.

The photo-detector 9, as shown in FIG. 6, has detecting areas that is point-symmetric with respect to the optical axis so that the symmetricalness thereof is improved. Note that the point-symmetrical structure thereof is not required all the time for the present embodiment.

As shown in FIG. 7, the divisional areas 10a and 10b receive the +1st order diffracted light beam from the diffracting area 8A of the diffractive optical element 8, and the divisional areas 10c and 10d receive the +1st order diffracted light beam from the diffracting area 8B of the diffractive optical element 8. The divisional areas 11c and 11d receive the −1st order diffracted light beam from the diffracting area 8A of the diffractive optical element 8, and the divisional areas 11a and 11b receive the −1st order diffracted light beam from the diffracting area 8B of the diffractive optical element 8. Signal currents corresponding to the respective divisional areas 10a to 10d and 11a to 11d of the photo-detecting planes 10 and 11 of the photo-detector 9 are converted to respective voltage signals, and are amplified to an adequate level by the current-voltage convert amplifier array 12 thereby being input to the arithmetic circuit 13.

The arithmetic circuit 13 generates the focus error signal F by using the following Equation (1):

$$F=(S_{10a}+S_{10c})-(S_{10b}+S_{10d})+(S_{11b}+S_{11d})-(S_{11a}+S_{11c}) \quad (1)$$

where $S_{10a}$, $S_{10b}$, $S_{10c}$ and $S_{10d}$ represent the signals corresponding respectively to the divisional areas 10a, 10b, 10c and 10d among the output signals corresponding to the photo-detecting plane 10, and $S_{11a}$, $S_{11b}$, $S_{11c}$ and $S_{11d}$ represent the signals corresponding respectively to the divisional areas 11a, 11b, 11c and 11d among the output signals corresponding to the photo-detecting plane 11.

That is, in the arithmetic circuit 13, a sum signal ($S_{10a}+S_{10c}$) derived from outputs of the two divisional areas 10a and 10c in a diagonal relation, and a sum signal ($S_{10b}+S_{10d}$) derived from outputs of the two divisional areas 10b and 10d in the diagonal relation are used to generate a difference signal ($S_{10a}+S_{10c}$)−($S_{10b}+S_{10d}$), concerning the output from the photo-detecting plane 10 of the photo-detector. Similarly, a sum signal ($S_{11a}+S_{11c}$) derived from outputs of the two divisional areas 11a and 11c in the diagonal relation, and a sum signal ($S_{11b}+S_{11d}$) derived from outputs of the two divisional areas 11b and 11d in the diagonal relation are used to generate a difference signal ($S_{11a}+S_{11c}$)−($S_{11b}+S_{11d}$), concerning the output from the photo-detecting plane 10 of the photo-detector. Deriving these two difference signals makes it possible to generate the focus error signal.

FIGS. 8A to 8E are diagrams showing changes of the spot shape of the light beam, which is diffracted by the diffractive optical element 8, on the detecting surface of the photo-detector 9, when the relative position between the objective lens 5 and the optical disk 6 is changed. In the figures, the spot of the light beam is represented by an aggregation of dots.

FIG. 8A shows a condition where the objective lens 5 is close to the optical disk 6.

FIG. 8C shows the in-focus condition where the focal point of the objective lens 5 is located on the surface of the optical disk 6, and the spot of the light beam presents almost a line-symmetrical shape.

FIG. 8E shows a condition where objective lens 5 is apart from the optical disk 6, and the changes of the spot shape of the light beam are also opposite, in contrary to the condition shown in FIG. 8A.

FIGS. 8B and 8D show transitional conditions from FIG. 8C to FIG. 8A and FIG. 8C to FIG. 8E, respectively.

Therefore, by using Equation (1) in the arithmetic circuit 13 as mentioned above, the focus error signal, which becomes zero at the in-focus condition as shown in FIG. 8C and the magnitude and the polarity thereof change corresponding to the amount and the direction of misalignment from the focal point of the objective lens 5, can be obtained. FIG. 9 is a diagram showing relationship of the focus error signal F with respect to the misalignment amount of the focus error.

According to the present embodiment, the fluctuation of the focus error signal which occurs noticeably in detecting the focus error by means of the conventional astigmatic method can be reduced even though the misalignment of the diffractive optical element 8, the photo-detector 9 or the like takes place due to an error in assembling the optical head apparatus and an aged deterioration, for example. Such effect of the present invention will be explained in detail by referring to FIGS. 26 to 28.

Figure 28A:
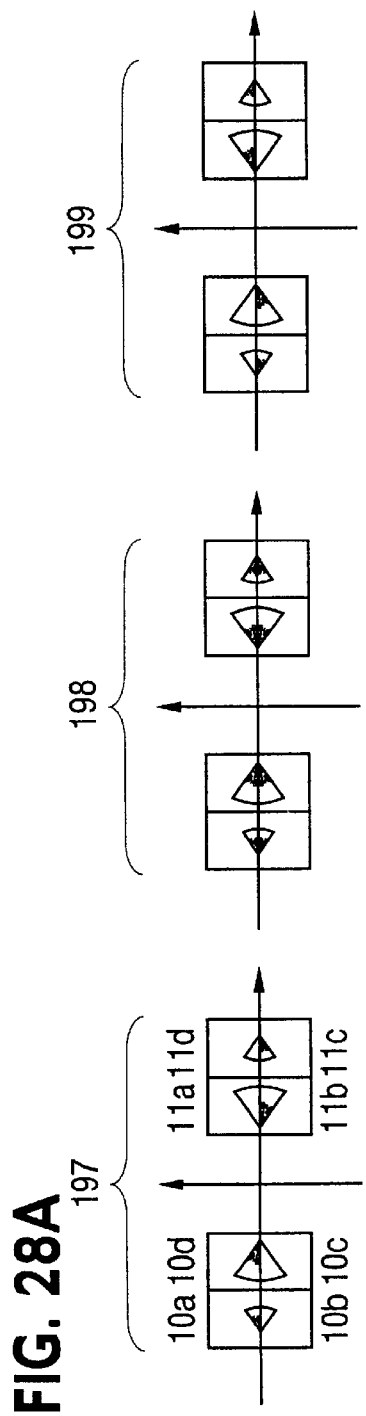
FIG. 28A is a diagram showing the intensity distribution of the light beam on the photo-detecting planes of the photo-detector 9 in the in-focus condition after being diffracted by the diffractive optical element 8.
Figure 28B:
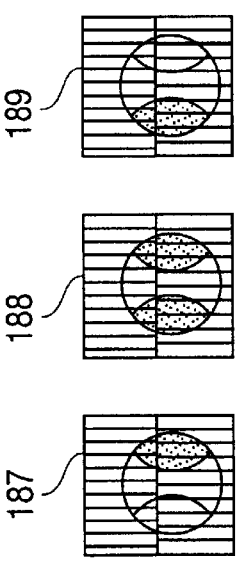
FIG. 28B is a diagram showing the intensity distribution of the light beam entering the diffractive optical element 8 in the in-focus condition.
Figure 28C:
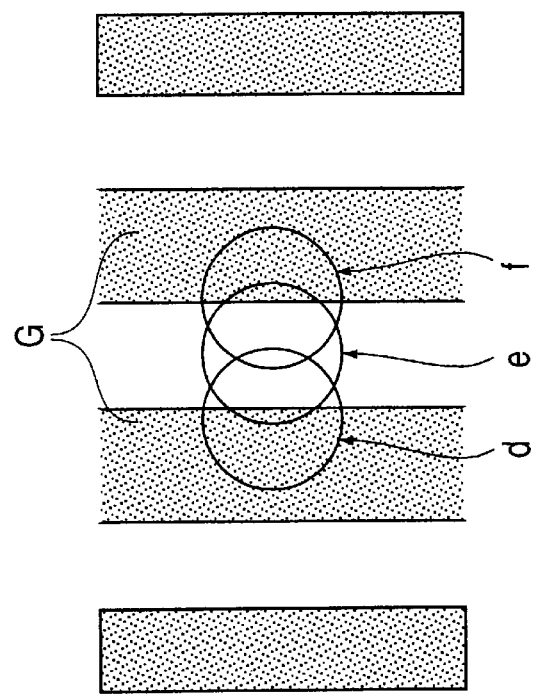
FIG. 28C is a diagram showing the beam spot of the light beam on the optical disk 6.

FIGS. 26A, 27A and 28A are diagrams showing intensity distribution of the light beam on the photo-detecting planes of the photo-detector 9 in the in-focus condition after being diffracted by the diffractive optical element 8, and FIGS. 26B, 27B and 28B are diagrams showing the intensity distribution of the light beam entering the diffractive optical element 8 in the in-focus condition, and FIGS. 26C, 27C and 28C are diagrams showing the beam spot of the light beam on the optical disk 6. The following explanation will be made, by referring to FIGS. 26 to 28, for three cases: (1) when there is no misalignment between the diffractive optical element 8 and the photo-detector 9, (2) when there is misalignment on the photo-detector 9, and (3) when there is misalignment on the diffractive optical element 8, respectively.

(1) No misalignment Between the Diffractive Optical Element 8 and the Photo-detector 9:

FIGS. 26A, 26B and 26C are diagrams showing, in the case when there is no misalignment between the diffractive optical element 8 and the photo-detector 9, and intensity distribution of the ideal optical system in the in-focus condition. The reference numbers 191 to 193 in FIG. 26A represent the photo-detecting planes of the photo-detector 9, and dark portions thereof diagrammatically represent diffraction images of the grooves on the optical disk 6. The reference numbers 181 to 183 in FIG. 26B represent the surfaces of the diffractive optical element 8, and circles thereof diagrammatically represent the light beam entering the diffractive optical element 8, and dark portions thereof diagrammatically represent diffraction images of the grooves, respectively. Circles d to f illustrated in FIG. 26C represent spots of the light beam on the optical disk 6, and the symbol G thereof represents the grooves on the optical disk 6.

As the light beam condensed by the objective lens 5 scans on the pits or recorded marks 18 on the optical disk as the symbols d, e and f shown in FIG. 26C, the intensity distribution of the incident light beam onto the diffractive optical element 8 changes as the reference numbers 181, 182 and 183 shown in FIG. 26B, due to the influence of diffraction caused by the grooves G. At this time, the intensity distributions of the +1st order diffracted light beam and the −1st order diffracted light beam from the diffractive optical element 8 on the photo-detecting plane of the photo-detector 9 change as the reference numbers 191, 192 and 193 shown in FIG. 26A, and the intensity distribution of the +1st order diffracted light beam and that of the −1st order diffracted light beam become symmetrical with respect to an origin, which corresponds to the intersection of the optical axis with the photo-detecting plane. Accordingly, when the focus error signal F is calculated, based on Equation (1), F always becomes zero, since both terms $(S_{10a}+S_{10c})-(S_{10b}+S_{10d})$ and $(S_{11b}+S_{11d})-(S_{11a}+S_{11c})$ thereof become zero, although the intensity distribution on each photo-detecting plane of the photo-detector 9 changes even at the in-focus time when the grooves G on the optical disk 6 are scanned by the light beam as shown in FIG. 26.

(2) Misalignment on the Photo-detector 9:

FIGS. 27A, 27B and 27C are diagrams showing the intensity distribution, when there is misalignment on the photo-detector 9 along the direction orthogonal to the image of the area dividing line L1 of the diffractive optical element 8. Similar to FIGS. 26A, 26B and 26C, the reference numbers 194, 195 and 196 in FIG. 27A represent the photo-detecting planes of the photo-detector 9, and dark portions thereof diagrammatically represent the diffraction images of the grooves G. The reference numbers 184, 185 and 186 in FIG. 27B represent the surfaces of the diffractive optical element 8, and circles thereof diagrammatically represent the light beam entering the diffractive optical element 8, and dark portions thereof diagrammatically represent diffraction images of the grooves G, respectively. Circles 191,192 and 193 illustrated by short dashed lines in FIG. 27C represent the spots of the light beam on the optical disk 6.

When the grooves G on the optical disk 6 are scanned by the light beam, the intensity of the received light beam on each photo-detecting plane of the photo-detector 9 changes. However, the anomaly of the amount of light beam on the photo-detector 9 can be canceled by calculating the focus error signal F based on Equation (1), and the fluctuation of the focus error signal F which has occurred noticeably in the conventional astigmatic method can be reduced even when the grooves G are scanned by the light beam. That is, similarly to the case of (1), the focus error signal F becomes always zero since both terms $(S_{10a}+S_{10c})-(S_{10b}+S_{10d})$ and $(S_{11b}+S_{11d})-(S_{11a}+S_{11c})$ thereof also become zero in this case.

(3) Misalignment on the Diffractive Optical Element 8:

The present embodiment also makes it possible to reduce the fluctuation of the focus error signal even though there is misalignment in the diffractive optical element 8. FIGS. 28A, 28B and 28C are diagrams showing the intensity distribution, when there is misalignment in the diffractive optical element 8 along the direction orthogonal to the area dividing line L1 of the diffractive optical element 8. Similar to those of FIGS. 26A, 26B, 26C, 27A, 27B and 27C, the reference numbers 197, 198 and 199 in FIG. 28A represent the photo-detecting planes of the photo-detector 9, and dark portions thereof diagrammatically represent the diffraction images of the grooves G. The reference numbers 187, 188 and 189 in FIG. 28B represent the surfaces of the diffractive optical element 8, and circles thereof diagrammatically represent the light beam entering the diffractive optical element 8, and dark portions thereof diagrammatically represent diffraction images of the grooves G, respectively. Circles d, e and f illustrated in FIG. 28C represent the spots of the light beam on the optical disk 6.

In this case, because the amount of light beam entering both of the diffracting areas 8A and 8B of the diffractive optical element 8 are different, the size of the light beam on the photo-detector 9 becomes unbalanced. However, the anomaly of the amount of light beam on the photo-detector 9 can be canceled by calculating the focus error signal F based on Equation (1), and the fluctuation of the focus error signal F which has occurred noticeably in the conventional astigmatic method can be reduced even when the grooves G are scanned by the light beam.

That is, although the two difference signals of $(S_{10a}+S_{10c})-(S_{10b}+S_{10d})$ and $(S_{11b}+S_{11d})-(S_{11a}+S_{11c})$ in Equation (1) have certain values in this case, these difference signals are canceled by calculating Equation (1) because they have the same magnitude and have the polarities opposite to each other. Eventually, the focus error signal F always becomes zero.

As is explained above, according to the present embodiment, the focus error signals can be detected properly without the influence of misalignment on the diffractive optical element 8 or the photo-detector 9, even though there is misalignment thereof.

As a modification of the present embodiment, the focus error signal F can be carried out by using following Equations (2) or (3), instead of Equation (1):

$$F=(S_{10d}-S_{10a})+(S_{11c}-S_{11b}) \qquad (2)$$

$$F=(S_{10c}-S_{10b})+(S_{11d}-S_{11a}) \qquad (3)$$

That is, according to the Equation (2), the focus error signal F is generated by carrying out a difference signal ($S_{10d}-S_{10a}$) of signals corresponding to the two divisional areas 10*d* and 10*a* which are adjacent to each other in the direction of the area dividing line L1 (in the direction parallel to the tracks on the optical disk 6) for the output signals corresponding to the photo-detecting plane 10 from the photo-detector 9, by carrying out a difference signal ($S_{11c}-S_{11b}$) corresponding to the two divisional areas 11*c* and 11*b* which are adjacent to each other in the direction of the area dividing line L1, and whose positions are different from the divisional areas 10*d* and 10*a* in the direction orthogonal to the area dividing line L1 for the output signals corresponding to the photo-detecting plane 11 from the photo-detector 9 and by carrying out a sum signal of those two difference signals ($S_{10d}-S_{10a}$) and ($S_{11c}-S_{11b}$).

Similarly, the focus error signal F is generated by Equation (3) by carrying out a difference signal ($S_{10c}-S_{10b}$) of signals corresponding to the two divisional areas 10*c* and 10*b* which are adjacent to each other in the direction of the area dividing line L1 for the output signals corresponding to the photo-detecting plane 10 from the photo-detector 9, by carrying out a difference signal ($S_{11d}-S_{11a}$) corresponding to the divisional areas 11*d* and 11*a* which are adjacent to each other in the direction of the area dividing line L1 and whose positions are different from the divisional areas 10*c* and 10*b* in the direction orthogonal to the area dividing line L1 for the output signals corresponding to the photo-detecting plane 11 from the photo-detector 9, and by carrying out a sum signal of those two difference signals ($S_{10c}-S_{10b}$) and ($S_{11d}-S_{11a}$).

As it is apparent, from the intensity distributions of the light beam among the photo-detecting planes 194, 195 and 196 shown in FIG. 27A, using the focus error signal F generated according to Equation (2) or Equation (3) can cancel the anomaly in the amount of the light beam on the photo-detector 9, and the fluctuation of the focus error signal F which has occurred noticeably in the conventional astigmatic method can be reduced.

Further, as it is apparent from the intensity distributions of the light beam among the photo-detecting planes 197, 198 and 199 shown in FIG. 28B, using the focus error signal F generated according to Equation (2) or Equation (3) can cancel the anomaly in the amount of the light beam on the photo-detector 9, and the fluctuation of the focus error signal F which has occurred noticeably in the conventional astigmatic method can be reduced.

Additionally, in the optical head apparatus of the present embodiment, a tracking error signal T, as well as the focusing error signal F, can be obtained simultaneously, by using the output signal from the photo-detector. For example, it can be realized by using a push-pull method to obtain the tracking error signal from the irregularity or the like representing continuous tracks such as grooves G on the optical disk 6, and by using a differential phase detection method to obtain a tracking error signal from a continuous pit arrays recorded on the optical disk 6.

In the push-pull method, although the calculation by using the photo-detector 9 is different, whether the dividing line of the diffractive optical element 8 extends in the tangential direction of the optical disk 6 or the radial direction thereof as shown in FIG. 5A, the calculation may be carried out by considering that the light beam is divided in the tangential direction of the optical disk 6.

For example, the tracking error signal T can be calculated according to any one of the following Equations (25), (26) and (27), when the direction of the dividing line extends in the radial direction of the optical disk 6:

$$T=(S_{10a}+S_{10d})-(S_{10b}+S_{10c}) \quad (25)$$

$$T=(S_{11b}+S_{11c})-(S_{11a}+S_{11d}) \quad (26)$$

$$T=(S_{10a}+S_{10d})-(S_{10b}+S_{10c})+(S_{11b}+S_{11c})-(S_{11a}+S_{11d}) \quad (27)$$

That is, the tracking error signal T based on the push-pull method can be carried out by using any one of these Equations (25), (26) and (27) as described above.

Meanwhile, in the differential phase detection method, the photo-detecting planes of the photo-detector 9 are disposed so that the beam spot of the light beam reflected from the optical disk 6 is divided by axes in the tangential direction and the radial directions of the optical disk 6. For example, the tracking error signal T based on the differential phase detection method can be derived by detecting a differential phase detection method between signals T1 and T2 obtained from the following Equations (7) and (8):

$$T1=S_{10a}+S_{10c} \quad (7)$$

$$T2=S_{10b}+S_{10d} \quad (8)$$

Similarly to that, another method of deriving the tracking error signal T based on the differential phase detection method is to detect a differential phase detection between signals T3 and T4 obtained from the following Equations (9) and (10):

$$T3=S_{11a}+S_{11c} \quad (9)$$

$$T4=S_{11b}+S_{11d} \quad (10)$$

Moreover, still other method of deriving the tracking error signal T based on the differential phase detection method is to detect a differential phase detection between signals T5 and T6 obtained from the following Equations (11) and (12):

$$T5=S_{10a}+S_{10c}+S_{11a}+S_{11c} \quad (11)$$

$$T6=S_{10b}+S_{10d}+S_{11b}+S_{11d} \quad (12)$$

The same result can be obtained by using any one of the above-mentioned three tracking error detecting methods in the present embodiment.

The principle for detecting the focus error in the present invention will be explained below in detail by referring to FIG. 13. It is noted that the principle will be explained based on the structure of the twelfth embodiment, and the principle is also applied to the following embodiments.

FIG. 13 is a diagram explaining the optical relationship between the diffractive optical element 8 and the photo-detector 9 as shown in FIG. 7. To make the following explanation easier, only elements such as a semi-circular reflected light beam 101 which is divided along the direction orthogonal to the tracks of the optical disk 6, the divided areas 10*a* and 10*b* of the first photo-detecting plane 10 and the divided areas 11*a* and 11*b* of the second photo-detecting plane 11 of the photo-detector 9 in which the diffracting light beam enters and is generated when the reflected light beam 101 is diffracted by the diffracting areas 8A (8A*a* and 8A*b*) of the diffractive optical element 8, are illustrated.

As shown in FIG. 13, the semi-circular reflected light beam 101 is diffracted by the diffracting areas 8A of the diffractive optical element 8 thereby generating +1st order diffracted light beams 103*a* and 104*a* and −1st order diffracted light beams 103*b* and 104*b*. Here, the diffracted light beams 103*a* and 103*b* are illustrated to explain diffracting light beams at about an intermediate position between the diffractive optical element 8 and the photo-detector 9. Diffracting light beams 104*a* and 104*b* are illustrated to explain diffracting light beams on the photo-detector 9, and the beam shapes thereof are illustrated based on when the focus position of the objective lens 5 coincides with the surface of the optical disk 6. Further, in order to detect the focus error signal in FIG. 13, the pattern of the grating of the diffractive optical element 8 is designed so that the +1st order diffracted light beam from diffracting areas 8Aa and 8Ab of the diffractive optical element 8 reaches on the divided areas 10b and 10a of the photo-detector 9, and the −1st order diffracted light beam from diffracting areas 8Aa and 8Ab of the diffractive optical element 8 reaches on the divided areas 11d and 11c of the photo-detector 9, respectively.

That is, the +1st order diffracted light beams and −1st order diffracted light beams of partial reflected light beams are generated from the reflected light beam 101 dividing into four beams by the lines parallel to the tracks on the optical disk 6 (Y-axis) and orthogonal thereto (X-axis). The diffracted light beam from the diffracting area 8Aa is one example of the partial reflected light beam. The +1st order diffracted light beams and −1st order diffracted light beams are received by partial areas of the photo-detecting planes of the photo-detector 9, which are disposed symmetrically with respect to the optical axis Z of the reflected light beams 101. The divided areas 10b and 11d of the photo-detector 9 are examples of the partial areas. Accordingly, the +Nth order diffracted light beam and −Nth order diffracted light beam of partial reflected light beams adjacent to each other with Y-axis are received by the partial areas adjacent to each other with the X-axis, such as the divided areas 10b and 10a or divided areas 11d and 11c. The diffractive optical element 8 is designed by the above-mentioned concept.

As seen from the sectional shapes of the reflected light beams 103a and 103b looking from the diffractive optical element 8 to the photo-detector 9, the pattern of the grating of the diffractive optical element 8 is designed so that the +1st order diffracted light beam in the X-Y plane goes forward along the Z-axis with a counterclockwise rotation, while the −1st order diffracted light beam in the X-Y plane goes forward along the Z-axis with a clockwise rotation.

Under the in-focus condition, the sectional beam shape of the +1st order diffracted light beam 104a on the divided areas 10a and 10b, and the sectional beam shape of the −1st order diffracted light beam 104b on the divided areas 10d and 10c, become symmetric to each other with respect to the X-axis.

On the other hand, when the focus misalignment of the objective lens 5 against the optical disk 6 occurs, the symmetricalness of the sectional beam shape with respect to the X-axis on the photo-detector 9 is lost, similar to as shown in FIGS. 8A to 8E. Therefore, the focus error signal F can be obtained by calculations in the arithmetic circuit 13 based on Equation (1), (2) or (3).

Even though misalignment exists on the photo-detector 9 or the diffractive optical element 8, as explained in above paragraphs (1) and (2), the fluctuation of the focus error signal caused by the misalignment can be decreased, because a diffracting image 202 of the groove G on the optical disk 6 appears on the partial areas arranged symmetrically with respect to the Z-axis on the photo-detector 9, as shown in FIG. 13.

That is, by detecting the focus error signal using the outputs of the photo-detector 9 concerning the +1st order diffracted light beam and −1st order diffracted light beam of the reflected light beam, it is possible to reduce the fluctuation of the focus error signal F influenced by the diffracted images from the grooves.

It is noted that the sectional shape of the light beam on the photo-detector 9 in FIG. 8 is different from that in FIG. 13.

The reason for this is that, although FIG. 8 shows a design of the diffractive optical element 8 so as to reduce the reflected light along the X-axis direction, which is independent of the focus error detection, FIG. 13 shows a case when the diffractive optical element 8 is not designed like that of FIG. 8 to simplify the explanation.

The pattern of the grating of the diffractive optical element 8 in FIG. 13 is designed so that the +1st order diffracted light beams from the diffracting areas 8Aa and 8Ab of the diffractive optical element 8 reach the divided areas 10b and 10a of the photo-detector 9, respectively. However, on the contrary, it is possible to design so that the +1st order diffracted light beams from the diffracting areas 8Aa and 8Ab reach the divided areas 10a and 10b of the photo-detector 9, respectively. In this case, because the −1st order diffracted light beams from the diffracting areas 8Aa and 8Ab of the diffractive optical element 8 are conjugate to the +1st order diffracted light beams, these diffracting light beams reach the divided areas 11c and 11d of the photo-detector 9, respectively, thereby bringing about the same effect as with the case described above.

In the case where the distance between the diffractive optical element 8 and the photo-detector 9 becomes short, and the pattern of the grating of the diffractive optical element 8 is designed so as to be optimized only to the +1st order diffracted light, the −1st order diffracted light beam is distorted and the effect of reducing the fluctuation of the focus error signal F influenced by the diffraction images of the grooves is weakened. Therefore, it is also desirable to design the pattern of the grating of the diffractive optical element 8 so as to be optimized to the ±1st order diffracted light beams. Specifically, it is preferable to design the pattern of the grating of the diffractive optical element 8 so that the +1st order diffracted light beams from the diffracting areas 8Aa and 8Ab of the diffractive optical element 8 reach the divided areas 10b and 10a of the photo-detector 9, respectively, and so that the −1st order diffracted light beams from the diffracting areas 8Aa and 8Ab of the diffractive optical element 8 reach the divided areas 11d and 11c of the photo-detector 9, respectively, for example.

The detection of tracking error may be performed, in the conventional differential phase detection method, by quadrisecting the reflected light beam from the optical disk 6. However, in the present invention, the reflected light beam is quadrisected by the diffractive optical element 8 and the photo-detector 9 at the in-focus condition, so that the point in the divided areas on the photo-detector 9, where the diffracted light beams reach, moves depending on the rotational direction of the diffracted light beams from the diffractive optical element 8. The tracking error signal based on the differential phase detection method may be obtained basically from the signals which are detected from diagonal light beams centering on the optical axis of the light beam quadrisected in the tangential and radial directions of the optical disk 6 as described before, and may be obtained, for example, by using Equations (7) to (12) in the present embodiment.

It is noted that the present embodiment shows only the case of using 1st order diffracted light beams, however, the present invention is not limited to that, and the same effect can be achieved also by using +Nth order diffracted light beams. (Here, N is 1 or an arbitrary integer more than 1.)

Thirteenth Embodiment

In a thirteenth embodiment, the diffractive optical element 8, having two diffracting areas 8A and 8B divided by the dividing line extends in the direction orthogonal to the track direction, is shown. Otherwise, the structure thereof is the same as of the second embodiment.

FIG. 14 is a diagram showing relationship of the optical system between the diffractive optical element 8 and the photo-detector 9 of the thirteenth embodiment of the present invention. Similarly to the twelfth embodiment, the diffractive optical element 8 has two diffracting areas 8C and 8D. These diffracting areas 8C and 8D are divided by a divisional line L1, which passes through the optical axis of the condenser lens 7 and is orthogonal to the tracks on the optical disk 6. The diffracting areas 8C and 8D can diffract the reflected light beam from the optical disk 6 into ±1st order diffracted light beams.

The photo-detector 9 has four photo-detecting planes 21, 22, 23 and 24 which are further bisected, respectively, and each bisected area 21a, 21b, 22a, 22b, 23a, 23b, 24a and 24b of the respective photo-detecting planes 21, 22, 23 and 24 is disposed so that the paired bisected areas are positioned at the point-symmetrical positions with respect to The Z-axis which is the optical axis of the reflected light beam. In other words, the photo-detector 9 is disposed so that the parting lines of the photo-detecting planes 21, 22, 23 and 24 are parallel to the X-axis and the two bisected photo-detecting planes 21 and 24 and 22 and 23 corresponding respectively to the ±1st order diffracted light beams are located at the point-symmetrical positions with respect to The Z-axis.

Basically, the pattern of the diffractive optical element 8 is designed, while the condenser lens 7 is in the in-focus condition, the diffracted light beam is rotated to reach specific area such as: the +1st order diffracted light beam from an area 8c1 of the diffractive optical element 8 reaches an area 21b of the photo-detector 9, and the −1st order diffracted light beam reaches an area 24a of the photo-detector 9, respectively; the +1st order diffracted light beam from an area 8c2 of the diffractive optical element 8 reaches an area 21a of the photo-detector 9, and the −1st order diffracted light beam reaches an area 24b of the photo-detector 9, respectively ; the +1st order diffracted light beam from an area 8d1 of the diffractive optical element 8 reaches area 22a of the photo-detector 9, and the −1st order diffracted light beam reaches an area 23b of the photo-detector 9, respectively ; and the +1st order diffracted light beam of an area 8d2 of the diffractive optical element 8 reaches an area 22b of the photo-detector 9, and the −1st order diffracted light beam reaches an area 23a of the photo-detector 9, respectively. Further, the pattern of the diffractive optical element 8 is designed so that a center axis, in which the intensity distributions of the light spot on the photo-detector 9 are symmetrical when the condenser lens 7 is in in-focus condition, coincides with the respective divided lines of the four photo-detecting planes 21, 22, 23 and 24.

By such an arrangement as described above, the photo-detecting plane 21 receives the +1st order diffracted light beam from the area 8C of the diffractive optical element 8, the photo-detecting plane 22 receives the +1st order diffracted light beam from the area 8D of the diffractive optical element 8, the photo-detecting plane 23 receives the −1st order diffracted light beam from the area 8D of the diffractive optical element 8, and the photo-detecting plane 24 receives the −1st order diffracted light beam from the area 8C of the diffractive optical element 8, respectively.

That is, in the twelfth embodiment, the divided areas 10a and 10b which receive the +1st order diffracted light beams from the area 8A of the diffractive optical element 8, and the divided areas 10c and 10d which receive the +1st order diffracted light beams from the area 8B of the diffractive optical element 8, are disposed along the X-axis direction, and the divided areas 11c and 11d which receive the −1st order diffracted light beams from the area 8A of the diffractive optical element 8, and the divided areas 10a and 10b which receive the −1st order diffracted light beams from the area 8B of the diffractive optical element 8, are disposed along the X-axis direction.

The present embodiment, however, is different from the twelfth embodiment in that the divided areas 21a and 21b which receive the +1st order diffracted light beam from the area 8C of the diffractive optical element 8, and the divided areas 22a and 22b which receive the +1st order diffracted light beam from the area 8D of the diffractive optical element 8, are disposed along the Y-axis direction, and the divided areas 23a and 23b which receive the −1st order diffracted light beam from the area 8D of the diffractive optical element 8, and the divided areas 24a and 24b which receive the −1st order diffracted light beam from the area 8E of the diffractive optical element 8, are disposed along the Y-axis direction.

Signal currents corresponding to the respective divided areas of the respective photo-detecting planes 21, 22, 23 and 24 of the photo-detector 9 are transformed into voltage signals by the current-voltage transforming amplifier array 12 as shown in FIG. 4. They are then input to the arithmetic circuit 13 after being amplified to an appropriate level. The arithmetic circuit 13 calculates the focus error signal F by calculating Equations (1a), (2a) or (3a) as explained below, similar to Equations (1), (2) or (3) of the twelfth embodiment, thereby reducing the influence of diffraction caused by the grooves G on the optical disk 6:

$$F=(S_{21a}+S_{22b})-(S_{21b}+S_{22a})+(S_{23b}+S_{24a})-(S_{23a}+S_{24b}) \quad (1a)$$

$$F=(S_{22a}-S_{21a})+(S_{24b}-S_{23b}) \quad (2a)$$

$$F=(S_{22b}-S_{21b})+(S_{24a}-S_{23a}) \quad (3a)$$

Here, the signals corresponding to $S_{10a}$, $S_{10b}$, $S_{10c}$, $S_{10d}$, $S_{11a}$, $S_{11b}$, $S_{11c}$ and $S_{11d}$ are replaced by signals $S_{21a}$, $S_{21b}$, $S_{22b}$, $S_{22a}$, $S_{23a}$, $S_{23b}$, $S_{24b}$ and $S_{24a}$ each corresponding to the respective divided areas 21a, 21b, 22a, 22b, 23a, 23b, 24b and 24a. That is, the arithmetic circuit 13 generates the focus error signal F by calculating the sum signals and different signals corresponding to the bisected areas which are line-symmetrical with respect to the X-axis, and further calculating a sum signals of those two difference signals for the output signals corresponding to the first and second photo-detecting planes 21 and 22 from the photo-detector 9 and for the output signals corresponding to the second photo-detecting planes 23 and 24.

The tracking error signal T can be also calculated, similarly to the twelfth embodiment, by any one of the following Equations (28), (29) and (30), or by detecting a differential phase detection between signals T1 and T2 obtained by the following Equations (7a) and (8a), or a differential phase detection between signals T3 and T4 obtained by the following Equations (9a) and (10a), or a differential phase detection between signals T5 and T6 obtained by the following Equations (11a) and (12a):

$$T=(S_{21a}+S_{21b})-(S_{22b}+S_{22a}) \quad (4a)$$

$$T=(S_{24b}+S_{24a})-(S_{23a}+S_{23b}) \quad (5a)$$

$$T=(S_{21a}+S_{21b})-(S_{22b}+S_{22a})+(S_{24a}+S_{24b})-(S_{23a}+S_{23b}) \quad (6a)$$

$$T1=S_{21a}+S_{22b} \quad (7a)$$

$$T2=S_{21b}+S_{22a} \quad (8a)$$

$$T3 = S_{23a} + S_{24b} \quad (9a)$$

$$T4 = S_{23b} + S_{24a} \quad (10a)$$

$$T5 = S_{21a} + S_{22b} + S_{23a} + S_{24b} \quad (11a)$$

$$T6 = S_{21b} + S_{22a} + S_{23b} + S_{24a} \quad (12a)$$

It is noted that the four bisected photo-detecting planes 21, 22, 23 and 24 of the present embodiment can be disposed at any position as long as the position is symmetrical with respect to the optical axis by two each. Further, although the two photo-detecting planes 21 and 22 and the photo-detecting planes 23 and 24 as shown in FIG. 14 are located in contact with each other above and below the X-axis, they may be separated from each other.

Fourteenth Embodiment

In a fourteenth embodiment, which is similar to the thirteenth embodiment, the diffractive optical element 8, having two diffracting areas 8A and 8B divided by the dividing line extends in the direction orthogonal to the track direction, is shown. Otherwise, the structure thereof is the same as of the third embodiment.

FIG. 15 is a diagram showing the relationship of the optical system between the diffractive optical element 8 and the photo-detector 9 of the fourteenth embodiment of the present invention, in which the photo-detector 9 in the thirteenth embodiment is modified so as to perform part of the arithmetic for calculating the focus error signal F on the photo-detector 9. In this case, new photo-detecting planes 25 and 26 are created by connecting the divided areas of the respective sides of the photo-detecting planes, for example, the photo-detecting planes 23 and 24 receiving the −1st order diffracted light beam, among the photo-detecting planes of the photo-detector 9 receiving either the +1st order diffracted light beam or the −1st order diffracted light beam from the areas 8C and 8D of the diffractive optical element 8 in FIG. 14, such as the divisional areas 23a and 24b, and 23b and 24a.

A sum of the output signals ($S_{23a} + S_{24b}$) corresponding to the divisional areas 23a and 24b in FIG. 14 can be obtained as an output signal corresponding to the photo-detecting plane 25, and a sum of the output signals ($S_{23b} + S_{24a}$) corresponding to the divisional areas 23b and 24a in FIG. 14 can be obtained as an output signal corresponding to the photo-detecting plane 26. That is, because the calculation of ($S_{23b} + S_{24a}$) and ($S_{23a} + S_{24b}$) in Equation (1a) is carried out in the photo-detector 9, the calculation is simplified and the number of photo-detecting planes can be reduced.

The respective ones of the divided areas of the photo-detecting planes 21 and 22 which receive the +1st order diffracted light beam from the areas 8C and 8D of the diffractive optical element 8 in FIG. 13, such as the divided areas 21a and 22b, and 21b and 22a, can be also connected. In this case, the calculation of ($S_{23b} + S_{24a}$) and ($S_{23a} + S_{24b}$) in Equation (1a) is carried out in the photo-detector 9.

In such a case, the tracking error signal T can be obtained by using only the output signals corresponding to the photo-detecting planes of the photo-detector 9 in which no calculation is carried out, for example, output signals $S_{21a}$, $S_{21b}$, $S_{22a}$ and $S_{22b}$ corresponding to the photo-detecting planes 21 and 22, according to Equation (4a), or by detecting the phase difference between the signals T1 and T2 obtained from Equation (7a) and (8a) in FIG. 15.

Further, in the case when it is arranged so as to calculate ($S_{21a} + S_{22b}$) and ($S_{21b} + S_{22a}$) in Equation (1a) on the photo-detector 9 by combining respective ones of the divided areas 21a and 22b, and 21b and 22a of the photo-detecting planes 21 and 22 which receive the +1st order diffracted light beams from the areas 8C and 8D of the diffractive optical element 8 in FIG. 14, the tracking error signal T can be obtained by using only the output signals $S_{23a}$, $S_{23b}$, $S_{24a}$ and $S_{24b}$ corresponding to the photo-detecting planes 23 and 24, according to Equation (5a), or by detecting the phase difference between the signals T3 and T4 obtained from Equations (9a) and (10a) for example.

Fifteenth Embodiment

In a fifteenth embodiment, that is similar to each of above embodiment, the diffractive optical element 8, having two diffracting areas 8A and 8B divided by the dividing line extends in the direction orthogonal to the track direction, is shown. Otherwise, the structure thereof is the same as of the fourth embodiment.

FIG. 16 is a diagram showing the relationship of the optical system between the diffractive optical element 8 and the photo-detector 9 of the fifteenth embodiment of the present invention. The present embodiment is arranged so as to generate the focus error signal F by detecting only one of the +1st order diffracted light beams, for example, the −1st order diffracted light beam, caused by the diffractive optical element 8. The diffractive optical element 8 having four diffracting areas 8E, 8F, 8G and 8H, and the photo-detector 9 having four bisected photo-detecting planes, are equipped in the present embodiment. Such structure is advantageous in detecting a tracking error by means of the differential phase detection method.

To detect tracking error signal, it is necessary to quadrisect the reflected light beam precisely. The conventional structure of detecting the focus error signal has a problem such that a small light beam on the photo-detector is quadrisected, and therefore, the center line of the intensity distribution of the light beam must be adjusted precisely with the divided line of the photo-detecting planes of the photo-detector, thereby taking much time and labor for the adjustment. In the present embodiment, on the contrary, the reflected light beam from the optical disk 6 is quadrisected by the large light beam on the diffractive optical element 8, so that the high accuracy of the adjustment is not required and the adjustment can be simplified.

In FIG. 16, the diffractive optical element 8 has four diffracting areas 8E, 8F, 8G and 8H, divided by the area dividing line L1 which is parallel to the tracks on the optical disk 6 and an area dividing line L2 which is orthogonal thereto. The patterns of the gratings of these diffracting areas 8E, 8F, 8G and 8H have spatial frequencies required for separating and detecting the zero order diffracted light beam, the +1st order diffracted light beam and the −1st order diffracted light beam in the vicinity of the focal plane of the condenser lens 7, and are given spatial changes for forming the +1st order diffracted light beam and the −1st order diffracted light beam into the spot shape necessary for detecting the focus error in the vicinity of the focal plane of the condenser lens 7.

In this case, the pattern of the diffractive optical element 8 is designed such that the −1st order diffracted light beam from the area 8E of the diffractive optical element 8 reaches the area 33a of the photo-detector 9, the −1st order diffracted light beam from the area 8F of the diffractive optical element 8 reaches the area 31 a of the photo-detector 9, the −1st order diffracted light beam from the area 8H of the diffractive optical element 8 reaches the area 33a of the photo-detector 9, and the −1st order diffracted light beam from the area 8G of the diffractive optical element 8 reaches the area 34b of the photo-detector 9, respectively, when the condenser lens 7 is in the in-focus condition. The present embodiment is designed such that the diffracted light beams from the areas of the diffractive optical element 8 adjacent along the direction parallel to the tracks on the optical disk 6 reach the divided areas positioned on the opposite side from each other about the X-axis.

The photo-detector 9 is disposed so as to detect the −1st order diffracted light beam from the diffractive optical element 8, and has four bisected photo-detecting planes 31, 32, 33 and 34, respectively. These photo-detecting planes 31, 32, 33 and 34 receive the −1st order diffracted light beams from the diffracting areas 8F, 8H, 8E and 8G of the diffractive optical element 8, respectively. When output signals of the photo-detector 9 corresponding to the respective two divided areas 31a, 31b, 32a, 32b, 33a, 33b, 34a and 34b of the photo-detecting planes 31, 32, 33 and 34 are denoted as $S_{31a}$, $S_{31b}$, $S_{32a}$, $S_{32b}$, $S_{33a}$, $S_{33b}$, $S_{34a}$ and $S_{34b}$, the arithmetic circuit 13 shown in FIG. 4 generates the focus error signal F by using following equation:

$$F = (S_{31a} + S_{32a} + S_{33b} + S_{34b}) - (S_{31b} + S_{32b} + S_{33a} + S_{34a}) \tag{13}$$

That is, in the present embodiment, the arithmetic circuit 13 generates the focus error signal F by carrying out a difference signal between a sum signal $(S_{31a}+S_{32a}+S_{33b}+S_{34b})$ of signals corresponding to either ones of the divided areas 31a, 32a, 33b and 34b, and a sum signal $(S_{31b}+S_{32b}+S_{33a}+S_{34a})$ of signals corresponding to the other divided areas 31b, 32b, 33a and 34a for the output signals corresponding to the first to fourth photo-detecting planes 31, 32, 33 and 34 from the photo-detector 9.

FIGS. 17A, 17B and 17C are spot diagrams showing changes in the sectional shape of the light beam diffracted by the diffractive optical element 8 on the photo-detecting planes of the photo-detector 9, when the relative position between the objective lens 5 and the optical disk 6 is changed.

FIG. 17A shows a condition where the objective lens 5 is close to the optical disk 6.

FIG. 17B shows the in-focus condition when the focal point of the objective lens 5 is located on the surface of the optical disk, and the spots of the light beam are located only on respective one areas of the bisected photo-detecting planes 31, 32, 33 and 34.

FIG. 17C shows a condition in which the objective lens 5 is apart from the optical disk 6, in contrary to the condition shown in FIG. 17A. The change of sectional shape of the light beam is also reversed of that shown in FIG. 17A.

Accordingly, the focus error signal F, which becomes zero in the in-focus condition shown in FIG. 17B and the magnitude and polarity thereof change corresponding to the amount and the direction of misalignment of the condenser lens 7 from the focal point, can be obtained by using Equation (11).

As for the tracking error signal T, the push-pull method for obtaining a tracking error signal from irregularity and the like indicative of continuous tracks such as grooves on an optical disk, and the differential phase detection method for obtaining the tracking error signal from continuous pit arrays recorded on an optical disk, are available to generate the tracking error signal T.

In the push-pull method, although the calculation on the photo-detector 9 is different depending on the dividing line in the X-axis direction of the diffractive optical element 8 shown in FIG. 16 extends in the tangential direction or in the radial direction of the optical disk 6, the calculation can be performed for the output signals corresponding to the respective photo-detecting planes in FIG. 16 so that the light beam is bisected basically in the tangential direction of the optical disk 6.

For example, the tracking error signal T is obtained by calculating the following Equation (14), when the dividing line in the X-axis direction of the diffractive optical element 8 extends in the radial direction of the optical disk 6:

$$T = (S_{31a} + S_{31b} + S_{33a} + S_{33b}) - (S_{32a} + S_{32b} + S_{34a} + S_{34b}) \tag{31}$$

The diffractive optical element 8 is disposed so that the light beam reflected by the optical disk 6 is divided by the axes in the tangential and radial directions of the optical disk 6, the tracking error signal T by means of the differential phase detection method can be obtained by detecting a differential phase detection signals obtained from the following two equations:

$$T7 = S_{31a} + S_{31b} + S_{34a} + S_{34b} \tag{15}$$

$$T8 = S_{32a} + S_{32b} + S_{33a} + S_{33b} \tag{16}$$

It is noted that only the −1st order diffracted light beam from the diffractive optical element 8 has been input to the photo-detector 9 in the present embodiment, it is possible to input only the +1st order diffracted light beam to the photo-detector 9, thereby generating the focus error signal F and the tracking error signal T by calculating in the same manner by the arithmetic circuit 13.

Sixteenth Embodiment

In a sixteenth embodiment, that is similar to each of above embodiment, the diffractive optical element 8, having two diffracting areas 8A and 8B divided by the dividing line extends in the direction orthogonal to the track direction, is shown. Otherwise, the structure thereof is the same as of the fifth embodiment.

FIG. 18 is a diagram showing the relationship of the optical system between the diffractive optical element 8 and the photo-detector 9 of the sixteenth embodiment of the present invention. Similar to the fifteenth embodiment shown in FIG. 16, the diffractive optical element 8 has the four diffracting areas 8E, 8F, 8G and 8H, and the patterns of the gratings thereof have spatial frequencies required for separating and detecting the zero order diffracted light beam, the +1st order diffracted light beam and the −1st order diffracted light beam in the vicinity of the focal plane of the condenser lens 7, and are given spatial changes for forming the +1st order diffracted light beam and the −1st order diffracted light beam into the spot shape necessary for detecting the focus error in the vicinity of the focal plane of the condenser lens 7.

Meanwhile, the photo-detector 9 having eight bisected photo-detecting planes 41 to 48 is disposed so that the dividing lines of these photo-detecting planes 41 to 48 coincide with the X-axis, and is disposed so that the eight photo-detecting planes 41 to 48 are positioned point-symmetrically by two each with respect to the Z-axis.

The method of detecting the focus error signal is partially similar to those of the fifteenth embodiment, however, detecting both the +1st order diffracted light beam and the −1st order diffracted light beam by the photo-detector 9, as explained in the twelfth embodiment, is different from the fifteenth embodiment. Therefore, in the present embodiment, the influence of the diffraction caused by the grooves G on the optical disk 6 can be reduced, because the focus error signal F is calculated from signals of the ±1st order diffracted light beams.

In this case, the pattern of the diffractive optical element 8 is designed such that the +1st order diffracted light beam and the −1st order diffracted light beam from the area 8E of the diffractive optical element 8 reach the area 47b and 43a of the photo-detector 9, the +1st order diffracted light beam and the −1st order diffracted light beam from the area 8F of the diffractive optical element 8 reach the area 45b and 41a of the photo-detector 9, the +1st order diffracted light beam and the −1st order diffracted light beam from the area 8H of the diffractive optical element 8 reach the area 46a and 42b of the photo-detector 9, and the +1st order diffracted light beam and the −1st order diffracted light beam from the area 8G of the diffractive optical element 8 reach the area 48a and 44b of the photo-detector 9, respectively, in the case when the condenser lens 7 is in in-focus condition. The present embodiment is designed such that the diffracted light beams from the areas of the diffractive optical element 8 adjacent along the direction parallel to the tracks on the optical disk 6 reach the divided areas positioned on the opposite side from each other about the X-axis.

When output signals of the photo-detector 9 corresponding to the respective divided areas 41a, 41b, 42a, 42b, 43a, 43b, 44a, 44b, 45a, 45b, 46a, 46b, 47a, 47b, 48a and 48b of the photo-detecting planes 41, 42, 43, 44, 45, 46, 47 and 48 are represented as $S_{41a}$, $S_{41b}$, $S_{42a}$, $S_{42b}$, $S_{43a}$, $S_{43b}$, $S_{44a}$, $S_{44b}$, $S_{45a}$, $S_{45b}$, $S_{46a}$, $S_{46b}$, $S_{47a}$, $S_{47b}$, $S_{48a}$ and $S_{48b}$, respectively, the arithmetic circuit 13 in FIG. 3 generates the focus error signal F by using the following equation in the present embodiment:

$$F=[(S_{41a}+S_{42a}+S_{43b}+S_{44b})-(S_{41b}+S_{42b}+S_{43a}+S_{44a})]+[(S_{45a}+S_{46a}+S_{47b}+S_{48b})-(S_{45b}+S_{46b}+S_{47a}+S_{48a})] \quad (17)$$

That is, in the present embodiment, the arithmetic circuit 13 generates the focus error signal F by carrying out a difference signal between a sum signal $(S_{41a}+S_{42a}+S_{43b}+S_{44b})$ of signals corresponding to either ones of the divided areas 41a, 42a, 43b and 44b, and a sum signal $(S_{41b}+S_{42b}+S_{43a}+S_{44a})$ of signals corresponding to the other divided areas 41b, 42b, 43a and 44a for the output signals corresponding to the first to fourth photo-detecting planes 41, 42, 43 and 44 from the photo-detector 9. Furthermore, the arithmetic circuit 13 generates the focus error signal F by carrying out a difference signal between a sum signal $(S_{45a}+S_{46a}+S_{47b}+S_{48b})$ of signals corresponding to either ones of the divided areas 45a, 46a, 47b and 48b, and a sum signal $(S_{45b}+S_{46b}+S_{47a}+S_{48a})$ of signals corresponding to the other divided areas 45b, 46b, 47a and 48a for the output signals corresponding to the first to fourth photo-detecting planes 45, 46, 47 and 48 from the photo-detector 9.

Similar to the fifteenth embodiment, in detecting the tracking error, it is possible to use the signals corresponding only to either one of the +1st order diffracted light beam and the −1st order diffracted light beam. However, it is also possible to use the signals corresponding to all of the ±1st order diffracted light beams similarly to the twelfth embodiment. At this time, the tracking error signal T obtained by means of the differential phase detection method can be derived by detecting a differential phase detection between signals T11 and T12 obtained by the following Equations (18) and (19):

$$T11=S_{41a}+S_{41b}+S_{44a}+S_{44b}+S_{45a}+S_{45b}+S_{48a}+S_{48b} \quad (18)$$

$$T12=S_{42a}+S_{42b}+S_{43a}+S_{43b}+S_{46a}+S_{46b}+S_{47a}+S_{47b} \quad (19)$$

Further, the tracking error signal T obtained by means of the push-pull method can be obtained by the following equation when the dividing line in the X-axis direction of the diffractive optical element 8 extends in the tangential direction of the optical disk 6:

$$T=(S_{41a}+S_{41b}+S_{42a}+S_{42b}+S_{45a}+S_{45b}+S_{48a}+S_{48b})-(S_{43a}+S_{43b}+S_{44a}+S_{44b}+S_{46a}+S_{46b}+S_{48a}+S_{48b}) \quad (32)$$

Seventeenth Embodiment

In a seventeenth embodiment, that is similar to each of above embodiments, the diffractive optical element 8, having two diffracting areas 8A and 8B divided by the dividing line extends in the direction orthogonal to the track direction, is shown. Otherwise, the structure thereof is the same as of the sixth embodiment.

FIG. 19 is a diagram showing the relationship of the optical system between the diffractive optical element 8 and the photo-detector 9 of the seventeenth embodiment of the present invention. It is arranged in this embodiment, by modifying the photo-detector 9 as shown in the sixteenth embodiment, such that a part of the arithmetic for calculating the focus error signal F is executed on the photo-detector 9. In this case, photo-detecting planes 51 and 52 are newly created by creating divided areas 51a, 51b, 52a and 52b, by combining the divided areas of the respective ones of the two adjacent photo-detecting planes 41 and 42, and 43 and 44, such as the divided areas 41a and 42a, 41b and 42b, 43a and 44a, and 43b and 44b, among the photo-detecting planes, such as the photo-detecting planes 41, 42, 43 and 44 which receive the −1st order diffracted light beam, among the photo-detecting planes of the photo-detector 9 which receive either the +1st order diffracted light beam or the −1st order diffracted light beam from the areas 8E, 8F, 8G and 8H of the diffractive optical element 8 in FIG. 18.

Accordingly, a sum of signals $(S_{41a}+S_{42a})$ corresponding to the divided areas 41a and 42a in FIG. 18 and a sum of signals $(S_{41b}+S_{42b})$ corresponding to the divided areas 41b and 42b are obtained respectively as signals corresponding to the divided areas 51a and 51b of the photo-detecting plane 51. Further, a sum of signals $(S_{43a}+S_{44a})$ corresponding to the divided areas 43a and 44a in FIG. 18 and a sum of signals $(S_{43b}+S_{44b})$ corresponding to the divided areas 43b and 44b are obtained respectively as signals corresponding to the divided areas 52a and 52b of the photo-detecting plane 52, so that part of the calculation of Equation (17) is performed on the photo-detector 9, thereby simplifying the calculation and reducing the number of the photo-detecting planes.

Two photo-detecting planes can be newly created by combining the respective ones of the divided areas of the adjacent two photo-detecting planes 45 and 46, and 47 and 48 among the photo-detecting planes 45, 46, 47 and 48 which receive the +1st order diffracted light beam from the areas 8E, 8F, 8G and 8H of the diffractive optical element 8 in FIG. 17, such as the divided areas 45a and 46a, 45b and 46b, 47a and 48a, and 47b and 48b. The part of the calculation of Equation (17) is also carried out on the photo-detector 9.

In such a case, the tracking error signal T can be obtained by using only the output signals corresponding to the photo-detecting planes of the photo-detector 9 in which no calculation is carried out, such as output signals $S_{45a}$, $S_{45b}$, $S_{46a}$, $S_{46b}$, $S_{47a}$, $S_{47b}$, $S_{48a}$ and $S_{48b}$ of the photo-detector 9 corresponding to the divided areas 45a, 45b, 46a, 46b, 47a, 47b, 48a and 48b of the photo-detecting planes 45, 46, 47 and 48 in the example of FIG. 19, by detecting the phase difference between the signals T11 and T12 obtained by Equations (18) and (19), or by calculating Equation (20) for example.

Eighteenth Embodiment

In an eighteenth embodiment, that is similar to each of above embodiments, the diffractive optical element 8, having two diffracting areas 8A and 8B divided by the dividing line extends in the direction orthogonal to the track direction, is shown. Otherwise, the structure thereof is the same as of the seventh embodiment.

FIG. 20 is a diagram showing the relationship of the optical system between the diffractive optical element 8 and the photo-detector 9 of the eighteenth embodiment of the present invention. The diffractive optical element 8 has the same structure as those in the fifteenth to seventeenth embodiments shown in FIGS. 16 to 19, and has the four diffracting areas 8E, 8F, 8G and 8H. The patterns of the gratings thereof have the spatial frequencies necessary for separating and detecting the zero order diffracted light beam, the +1st order diffracted light beam and the −1st order diffracted light beam in the vicinity of the focal plane of the condenser lens 7, and are given the spatial changes for forming the +1st order diffracted light beam and the −1st order diffracted light beam into the spot shape necessary for detecting the focus error in the vicinity of the focal plane of the condenser lens 7.

Meanwhile, the photo-detector 9 for detecting the diffracted light beam from the diffractive optical element 8 has eight bisected photo-detecting planes 61, 62, 63, 64, 65, 66, 67 and 68, however, different from the fifth embodiment, respective dividing lines of these photo-detecting planes 61, 62, 63, 64, 65, 66, 67 and 68 are not extended in the X-axis and are disposed at the point-symmetrical positions with respect to the Z-axis by a pair of two each. It is noted that each photo-detecting plane is disposed so that the dividing line thereof is parallel with the X-axis.

The focus error detecting method of the present embodiment is basically same as that of the sixteenth embodiment, and because the focus error signal F is also carried out by calculating from the signals caused by the ±1st order diffracted light beams in this case, the influence of diffraction of the grooves G on the optical disk 6 can be reduced.

In the present embodiment, when the output signals of the photo-detector 9 corresponding to the respective divided areas 61a, 61b, 62a, 62b, 63a, 63b, 64a, 64b, 65a, 65b, 66a, 66b, 67a, 67b, 68a and 68b of the photo-detecting planes 61, 62, 63, 64, 65, 66, 67 and 68 are represented to $S_{61a}, S_{61b}, S_{62a}, S_{62b}, S_{63a}, S_{63b}, S_{64a}, S_{64b}, S_{65a}, S_{65b}, S_{66a}, S_{66b}, S_{67a}, S_{67b}, S_{68a}$ and $S_{68b}$, respectively, the arithmetic circuit 13 in FIG. 4 generates the focus error signal F by using the following equation:

$$F=[(S_{61a}+S_{62a})-(S_{65b}+S_{66b})]+[(S_{63b}+S_{64b})-(S_{67a}+S_{68a})]-[(S_{61b}+S_{62b})-(S_{65a}+S_{66a})]-[(S_{63a}+S_{64a})-(S_{67b}+S_{68b})] \quad (21)$$

The tracking error can be detected in the same manner as those of the sixteenth embodiment. That is, although it is possible to use the signal corresponding only to either one of the +1st order diffracted light beam and the −1st order diffracted light beam similarly to the fifteenth embodiment in detecting the tracking error, it is also possible to use the signals corresponding to all of the ±1st order diffracted light beams similarly to the first embodiment. The tracking error signal T obtained by means of the differential phase detection method at this time can be obtained by detecting a differential phase detection between signals T21 and T22 obtained by the following Equations (22) and (23):

$$T21=S_{61a}+S_{61b}+S_{63a}+S_{63b}+S_{65a}+S_{65b}+S_{67a}+S_{67b} \quad (22)$$

$$T22=S_{62a}+S_{62b}+S_{64a}+S_{64b}+S_{66a}+S_{66b}+S_{68a}+S_{68b} \quad (23)$$

The present embodiment is suitable particularly in detecting the tracking error by means of the differential phase detection method.

The tracking error signal T by means of the push-pull method can be obtained by calculating the following equation, in the case when the dividing line in X-axis direction of the diffractive optical element 8 extends in the radial direction of the optical disk 6.

$$T=(S_{61a}+S_{61b}+S_{64a}+S_{64b}+S_{66a}+S_{66b}+S_{67a}+S_{67b})-(S_{62a}+S_{62b}+S_{63a}+S_{63b}+S_{65a}+S_{65b}+S_{68a}+S_{68b}) \quad (33)$$

Nineteenth Embodiment

In a nineteenth embodiment, that is similar to each of above embodiment, the diffractive optical element 8, having two diffracting areas 8A and 8B divided by the dividing line extends in the direction orthogonal to the track direction, is shown. Otherwise, the structure thereof is the same as of the eighth embodiment.

FIG. 21 is a diagram showing the relationship of the optical system between the diffractive optical element 8 and the photo-detector 9 of the nineteenth embodiment of the present invention. It is arranged in this embodiment, by modifying the photo-detector 9 as shown in the eighteenth embodiment, such that a part of the arithmetic for calculating the focus error signal F is executed in the photo-detector 9. In this case, photo-detecting planes 71 and 72 are newly created by creating divided areas 71a, 71b, 72a and 72b, by combining the divided areas of the respective ones of the two adjacent photo-detecting planes 61 and 62, and 63 and 64, such as the divided areas 61a and 62a, 61b and 62b, 63a and 64a, and 63b and 64b, among the photo-detecting planes, such as the photo-detecting planes 61, 62, 63 and 64 which receive the −1st order diffracted light beam, receiving either one of the +1st order diffracted light beam and the −1st order diffracted light beam from the areas 8E, 8F, 8G and 8H of the diffractive optical element 8 in FIG. 20.

Accordingly, a sum of signals ($S_{61a}+S_{62a}$) corresponding to the divided areas 61a and 62a in FIG. 20 and a sum of signals ($S_{61b}+S_{62b}$) corresponding to the divided areas 61b and 62b are obtained respectively as signals corresponding to the divided areas 71a and 71b of the photo-detecting plane 71. Further, a sum of signals ($S_{63a}+S_{64a}$) corresponding to the divided areas 63a and 64a in FIG. 20 and a sum of signals ($S_{63b}+S_{64b}$) corresponding to the divided areas 63b and 64b are obtained respectively as signals corresponding to the divided areas 72a and 72b of the photo-detecting plane 72, so that part of the calculation of Equation (21) is performed on the photo-detector 9, thereby simplifying the calculation and reducing the number of the photo-detecting planes.

Two photo-detecting planes can be newly created by combining the respective ones of the divided areas of the adjacent two photo-detecting planes 65 and 66, and 67 and 68 among the photo-detecting planes 65, 66, 67 and 68 which receive the +1st order diffracted light beam from the areas 8E, 8F, 8G and 8H of the diffractive optical element 8 in FIG. 20, such as the divided areas 65a and 66a, 65b and 66b, 67a and 68a, and 67b and 68b. The part of the calculation of Equation (21) is also carried out in the photo-detector 9.

In such a case, the tracking error signal T can be obtained by using only the output signals corresponding to the photo-detecting planes of the photo-detector 9 in which no calculation is carried out, such as output signals $S_{65a}$, $S_{65b}$, $S_{66a}$, $S_{66b}$, $S_{67a}$, $S_{67b}$, $S_{68a}$ and $S_{68b}$ of the photo-detector 9 corresponding to the divided areas 65a, 65b, 66a, 66b, 67a, 67b, 68a and 68b of the photo-detecting planes 65, 66, 67 and 68 in the example of FIG. 21, by detecting the phase difference between the signals T21 and T22 obtained by Equations (22) and (23), or by calculating Equation (24) for example.

Twentieth Embodiment

In a twentieth embodiment, that is similar to each of above embodiment, the diffractive optical element 8, having two diffracting areas 8A and 8B divided by the dividing line extends in the direction orthogonal to the track direction, is shown. Otherwise, the structure thereof is the same as of the ninth embodiment.

FIG. 22 is a diagram showing the relationship of the optical system between the diffractive optical element 8 and the photo-detector 9 of the twentieth embodiment of the present invention. It is arranged in this embodiment, by modifying the photo-detector 9 as shown in the nineteenth embodiment, such that a part of the arithmetic for calculating the focus error signal F is executed in the photo-detector 9. In this case, photo-detecting planes 73 and 74 are newly created by combining the respective ones of the divided areas of the photo-detecting planes 71 and 72 in FIG. 21, such as the divided areas 71a and 72b, and 71b and 72a, respectively.

Accordingly, a sum of signals $(S_{61a}+S_{62a}+S_{63b}+S_{64b})$ corresponding to the divided areas 61a, 62a, 63b and 64a in FIG. 20 are obtained respectively as signals corresponding to the photo-detecting plane 73. Further, a sum of signals $(S_{61b}+S_{62b}+S_{63a}+S_{64a})$ corresponding to the divided areas 61b, 62b, 63a and 64a in FIG. 20 are obtained respectively as signals corresponding to the photo-detecting plane 74, so that part of the calculation of Equation (21) is performed in the photo-detector 9, thereby simplifying the calculation and reducing the number of the photo-detecting planes.

The tracking error signal T can be obtained, as well as those of the nineteenth embodiment, by using only the output signals corresponding to the photo-detecting planes of the photo-detector 9 in which no calculation is carried out, such as output signals $S_{65a}$, $S_{65b}$, $S_{66a}$, $S_{66b}$, $S_{67a}$, $S_{67b}$, $S_{68a}$ and $S_{68b}$ of the photo-detector 9 corresponding to the divided areas 65a, 65b, 66a, 66b, 67a, 67b, 68a and 68b of the photo-detecting planes 65, 66, 67 and 68 in the example of FIG. 22, by detecting the phase difference between the signals T21 and T22 obtained by Equations (22) and (23), or by calculating Equation (24), for example.

Twenty-first Embodiment

In a twenty-first embodiment, that is similar to each of above embodiments, the diffractive optical element 8, having two diffracting areas 8A and 8B divided by the dividing line extends in the direction orthogonal to the track direction, is shown. Otherwise, the structure thereof is the same as of the tenth embodiment.

FIG. 23 is a schematic perspective view showing a structure of an optical system of the optical head apparatus of the twenty-first embodiment of the present invention. The optical head apparatus includes the light source 1, the collimator lens 2, the beam shaping prism 3, the beam splitter 4, the objective lens 5, the diffractive optical element 8 and the photo-detector 9, a mirror 17 and a wavelength plate 18. It further includes the amplifier array (not shown) having a function of current-voltage transformation and the arithmetic circuit (not shown) similar to those shown in FIG. 4. The position where the diffractive optical element 8 is inserted is different from those shown in FIG. 4.

Light beam irradiated from the light source 1 is transformed into parallel optical flux by the collimator lens 2. The light beam output from the collimator lens 2 is shaped by the beam shaping prism 3, and is then input to the beam splitter 4. The light beam that has passed through the beam splitter 4 is changed its direction by reflection of the mirror 17. The light beam further passes through the diffractive optical element 8, an is focused and condensed onto the optical disk (not shown) as a minute spot by the objective lens 5 via the wavelength plate 18.

The reflected light beam from the optical disk then passes through the objective lens 5, and is diffracted by the diffractive optical element 8. This diffracted light beam is condensed on the photo-detector 9 by the condenser lens 7 via the mirror 17 and the beam splitter 4.

Differing from the optical system as shown in FIG. 4, the beam splitter 4 and the condenser lens 7 are disposed between the diffractive optical element 8 and the photo-detector 9 in the optical path of the optical system of the present embodiment. In this case, the same effect with the embodiments described above can be obtained by designing the pattern of the grating of the diffractive optical element 8 taking the beam splitter 4 and the condenser lens 7 into consideration, so that the condition of the light beam on the diffractive optical element 8 and the photo-detector 9 is realized similarly to the first to ninth embodiments. Although only the beam splitter 4 and the condenser lens 7 are disposed between the diffractive optical element 8 and the photo-detector 9 in the optical path, another optical element can be disposed to add another function, by designing the pattern of the diffractive optical element 8 taking the characteristics of such optical element into consideration.

When assuming a mechanical system which drives the objective lens for moving the light beam on the optical disk by using tracking control, there is a case when an offset on the tracking error signal is hardly generated, particularly it is obtained by the push-pull method, when the diffractive optical element 8 and wavelength plate 18 are moved together with the objective lens 5. That is, in an optical system, when the diffractive optical element 8 is fixed, moving the objective lens 5 for the tracking control causes the light beam to move more on the photo-detector 9. Therefore, the offset occurs in the tracking error signal, particularly by means of push-pull, and the objective lens 5 cannot be moved so much for the tracking control.

In contrary to that, the objective lens 5 is hardly moved when the diffractive optical element 8 and the wavelength plate 18 are moved together with the objective lens 5. Therefore, the accurate push-pull signals can be obtained even though the objective lens 5 moves largely in the tracking direction.

Here, the mechanical system for driving the objective lens 5 can be an electromagnetic driving system composed of a magnet and a coil, or any system basically as long as it can drive the diffractive optical element 8 and the wavelength plate 18 simultaneously in parallel with the radial direction of the optical disk 6.

The utilization efficiency of the light of the light source 1 can be enhanced when a polarized type is selected as the diffractive optical element 8, because the light beam irradiated initially from the light source 1 is not diffracted by the diffractive optical element 8 and only the reflected light beam from the optical disk is diffracted, by the function of the wavelength plate 18. The similar effect can be expected by using any type of diffracting optical element in detecting the focus error or the tracking error.

Although the ±1st order diffracted light beams of the diffractive optical element 8 have been utilized to explain the embodiments described above, the present invention is not limited only to that, and the focus error can be detected by using ±Nth order diffracted light beams.

As explained above, it is possible to realize the optical head apparatus in which the focus error signals can be accurately obtained and the amount of tracking deviation of the objective lens in the push-pull method can be reduced, by moving the objective lens 5 together with the diffractive optical element 8 so as to utilize +Nth order diffracted light beams.

Twenty-second Embodiment

In a twenty-second embodiment, which is similar to each of above embodiments, the diffractive optical element 8, having two diffracting areas 8A and 8B divided by the dividing line extends in the direction orthogonal to the track direction, is shown. Otherwise, the structure thereof is the same as of the eleventh embodiment.

FIG. 24 is a diagram showing a main part of an optical head apparatus according to the twenty-second embodiment. The structure thereof is the same as those in the embodiments described above except a finite system lens being used as the objective lens 5. In this case, the collimator lens 2, the beam shaping prism 3 and the condenser lens 7 in FIG. 4 are not required.

The foregoing discussion describes merely a number of exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting, of the scope of the invention, which is set forth in the following claims.

The entire contents of Japanese Patent Application H10-154505, filed Jun. 03, 1998, are incorporated herein by reference.

As described above, the present invention provides an optical head apparatus in which the focus error signal thereof involves less influence of diffraction caused by the pits, the recorded marks or the grooves on the recording surface of the optical recording medium, even though the optical elements have misalignment.

What is claimed is:

1. An optical head apparatus for reproducing information from an optical recording medium, comprising:
    an objective lens that receives a light beam from a light source and condenses the light beam onto the optical recording medium;
    a photo-detector that has plurality of photo-detecting planes disposed orthogonal to an optical axis of the reflected light beam and symmetrical with respect to the optical axis, and detects the light beam reflected by the optical recording medium, wherein each of the photo-detecting planes is divided into a plurality of divided areas by a plurality of dividing lines which symmetrically divide the photo-detecting planes with respect to the optical axis;
    a diffractive optical element that is disposed upstream to the photo-detector for diffracting the reflected light beam, wherein the diffracting optical element diffracts the reflected light beam such that the reflected light beam is divided at least in a direction parallel to a track of the optical recording medium, and only a +Nth order diffracted light beam and a −Nth order diffracted light beam (N is an integer greater than or equal to 1) in the photo-detecting plane are independently received by the divided areas which are disposed in positions symmetrically opposite with respect to the optical axis respectively;
    an arithmetic circuit that calculates an error signal with respect to a position of the objective lens along the optical axis, by using outputs from the photo-detector of both the +Nth order diffracted light beam and the −Nth order diffracted light beam; and
    a driver that generates a signal for controlling the position of the objective lens based on an output from the arithmetic circuit; and
    wherein the diffractive optical element diffracts the reflected light beam such that the reflected light beam is further divided in a direction orthogonal to a track of the optical recording medium.

2. An optical head apparatus according to claim 1, wherein the dividing lines of the photo-detecting plane include at least one dividing line which extends in a direction parallel to a track of the optical recording medium.

3. An optical head apparatus according to claim 2, wherein the dividing lines of the photo-detecting plane further include another dividing line which extends in a direction parallel to the track of the optical recording medium.

4. An optical head apparatus according to claim 2, wherein the dividing lines of the photo-detecting plane further include another dividing line which extends in a direction orthogonal to the track of the optical recording medium.

5. An optical head apparatus according to claim 1, wherein a track of the optical recording medium includes a plurality of pits.

6. An optical head apparatus for reproducing information from an optical recording medium, comprising:
    an objective lens that receives a light beam from a light source and condenses the light beam onto the optical recording medium;
    a photo-detector that has plurality of photo-detecting planes disposed orthogonal to an optical axis of the reflective light beam and symmetrical with respect to the optical axis, and detects the light beam reflected by the optical recording medium, wherein each of the photo-detecting planes is divided into a plurality of divided areas by a plurality of dividing lines which symmetrically divide the photo-detecting planes with respect to the optical axis;
    a diffractive optical element that is disposed upstream to the photo-detector for diffracting the reflected light beam, wherein the diffractive optical element diffracts the reflected light beam such that the reflected light beam is divided at least in a direction orthogonal to a track of the optical recording medium, and only a +Nth order diffracted light beam and a −Nth order diffractive light beam (N is an integer greater than or equal to 1) in the photo-detecting plane are independently received by the divided areas which are disposed in positions symmetrically opposite with respect to the optical axis respectively;
    an arithmetic circuit that calculates an error signal with respect to a position of the objective lens along the optical axis, by using outputs from the photo-detector of both the +Nth order diffractive light beam and the −Nth order diffracted light beam; and a driver that generates a signal for controlling the position of the objective lens based on an output from the arithmetic circuit; and wherein the diffractive optical element diffracts the reflected light beam such that the reflected light beam is further divided in a direction orthogonal to a track of the optical recording medium.

7. An optical head apparatus according to claim 6, wherein the dividing lines of the photo-detecting plane include at least one dividing line which extends in a direction orthogonal to a track of the optical recording medium.

8. An optical head apparatus according to claim 7, wherein the dividing lines of the photo-detecting plane further include another dividing line which extends in a direction orthogonal to the track of the optical recording medium.

9. An optical head apparatus according to claim 7, wherein the dividing lines of the photo-detecting plane further include another dividing line which extends in a direction parallel to the track of the optical recording medium.

10. An optical head apparatus according to claim 6, wherein a track of the optical recording medium includes a groove.

11. An optical head apparatus for reproducing information from an optical recording medium, comprising:

an objective lens that receives a light beam from a light source and condenses the light beam onto the optical recording medium;

a photo-detector that has plurality of photo-detecting planes disposed orthogonal to an optical axis of the reflected light beam and symmetrical with respect to the optical axis, and detects the light beam reflected by the optical recording medium, wherein each of the photo-detecting planes is divided into a plurality of divided areas by a plurality of dividing lines which symmetrically divide the photo-detecting planes with respect to the optical axis;

a diffractive optical element that is disposed upstream to the photo-detector for diffracting the reflected light beam, wherein the diffracting optical element diffracts the reflected light beam such that the reflected light beam is divided at least in a direction parallel to a track of the optical recording medium, and only a +Nth order diffracted light beam and a −Nth order diffracted light beam (N is an integer greater than or equal to 1) in the photo-detecting plane are independently received by the divided areas which are disposed in positions symmetrically opposite with respect to the optical axis respectively;

an arithmetic circuit that calculates an error signal with respect to a position of the, objective lens along the optical axis, by using outputs from the photo-detector of both the +Nth order diffracted light beam and the −Nth order diffracted light beam;

a driver that generates a signal for controlling the position of the objective lens based on an output from the arithmetic circuit; and a beam splitter that guides the light beam to the objective lens when the light beam enters from the light source through a first optical path, and guides the light beam to the photo-detector when the light beam enters from the objective lens through a second optical path; and wherein the diffractive optical element diffracts the reflected light beam such that the reflected light beam is further divided in a direction orthogonal to a track of the optical recording medium.

12. The optical head apparatus according to claim 11, further comprising:

a beam shaping prism that is disposed in one of the first and second optical paths, for modifying the sectional shape of the light beam.

13. An optical head apparatus for reproducing information from an optical recording medium, comprising:

an objective lens that receives a light beam from a light source and condenses the light beam onto the optical recording medium;

a photo-detector that has plurality of photo-detecting planes disposed orthogonal to an optical axis of the reflective light beam and symmetrical with respect to the optical axis, and detects the light beam reflected by the optical recording medium, wherein each of the photo-detecting planes is divided into a plurality of divided areas by a plurality of dividing lines which symmetrically divide the photo-detecting planes with respect to the optical axis;

a diffractive optical element that is disposed upstream to the photo-detector for diffracting the reflected light beam, wherein the diffractive optical element diffracts the reflected light beam such that the reflected light beam is divided at least in a direction orthogonal to a track of the optical recording medium, and only a +Nth order diffracted light beam and a −Nth order diffractive light beam (N is an integer greater than or equal to 1) in the photo-detecting plane are independently received by the divided areas which are disposed in positions symmetrically opposite with respect to the optical axis respectively;

an arithmetic circuit that calculates an error signal with respect to a position of the objective lens along the optical axis, by using outputs from the photo-detector of both the +Nth order diffractive light beam and the −Nth order diffracted light beam;

a driver that generates a signal for controlling the position of the objective lens based on an output from the arithmetic circuit; and a beam splitter that guides the light beam to the objective lens when the light beam enters from the light source through a first optical path, and guides the light beam to the photo-detector when the light beam enters from the objective lens through a second optical path; and wherein the diffractive optical element diffracts the reflected light beam such that the reflected light beam is further divided in a direction orthogonal to a track of the optical recording medium.

14. An optical head apparatus according to claim 13, further comprising:

a beam shaping prism that is disposed one of the first and the second optical paths, for modifying the sectional shape of the light beam.

* * * * *